(12) United States Patent
Samadani

(10) Patent No.: US 11,227,105 B1
(45) Date of Patent: Jan. 18, 2022

(54) METHOD AND APPARATUS FOR STRUCTURED DOCUMENTS

(71) Applicant: Mehrdad Samadani, San Jose, CA (US)

(72) Inventor: Mehrdad Samadani, San Jose, CA (US)

(*) Notice: Subject to any disclaimer, the term of this patent is extended or adjusted under 35 U.S.C. 154(b) by 106 days.

(21) Appl. No.: 16/136,103

(22) Filed: Sep. 19, 2018

Related U.S. Application Data

(63) Continuation-in-part of application No. 15/981,620, filed on May 16, 2018, which is a continuation of application No. 14/492,034, filed on Sep. 21, 2014, now Pat. No. 9,977,772.

(60) Provisional application No. 62/562,424, filed on Sep. 23, 2017, provisional application No. 61/919,688, filed on Dec. 20, 2013, provisional application No. 61/881,450, filed on Sep. 24, 2013.

(51) Int. Cl.

| | |
|---|---|
| *G06F 3/0481* | (2013.01) |
| *G06F 3/0486* | (2013.01) |
| *G06F 40/18* | (2020.01) |
| *G06F 3/0488* | (2013.01) |
| *G06F 40/10* | (2020.01) |
| *G06F 40/103* | (2020.01) |
| *G06F 40/137* | (2020.01) |
| *G06F 40/151* | (2020.01) |
| *G06F 40/166* | (2020.01) |
| *G06F 40/189* | (2020.01) |

(52) U.S. Cl.
CPC ............ *G06F 40/18* (2020.01); *G06F 3/0481* (2013.01); *G06F 3/0486* (2013.01); *G06F 3/04883* (2013.01); *G06F 40/10* (2020.01); *G06F 40/103* (2020.01); *G06F 40/137* (2020.01); *G06F 40/151* (2020.01); *G06F 40/166* (2020.01); *G06F 40/189* (2020.01)

(58) Field of Classification Search
CPC .. G06F 3/0481; G06F 3/0486; G06F 3/04833; G06F 3/0489; G06F 17/21; G06F 17/211; G06F 17/24; G06F 17/246; G06F 17/2241; G06F 17/2229; G06F 40/18; G06F 40/103; G06F 40/137; G06F 40/166; G06F 40/10; G06F 40/189; G06F 40/151

See application file for complete search history.

(56) References Cited

U.S. PATENT DOCUMENTS

| | | | | |
|---|---|---|---|---|
| 6,057,837 A | * | 5/2000 | Hatakeda ................ | G06F 40/18 715/765 |
| 6,292,810 B1 | * | 9/2001 | Richards ................ | G06F 40/18 715/201 |
| 6,606,105 B1 | * | 8/2003 | Quartetti ............... | G06F 3/0481 715/203 |

(Continued)

*Primary Examiner* — Thu V Huynh

(57) ABSTRACT

Methods and systems for organizing information in a grid. Aspects of this grid may be easily manipulated via user interface operations. This grid may be easily manipulated to create or edit a hierarchy. Grid elements may be expanded or collapsed alternatively to show or hide hidden elements. A block of textual information may contain elements that may be expanded or collapsed alternatively to show or hide hidden elements. Aspects of this block of text may be easily manipulated via user interface operations. This block of text may be easily manipulated to create or edit a hierarchy. A canvas may contain objects that may be easily moved and/or repositioned via user interface operations.

20 Claims, 60 Drawing Sheets

(56) References Cited

U.S. PATENT DOCUMENTS

| | | | | |
|---|---|---|---|---|
| 7,127,672 B1* | 10/2006 | Patterson | | G06F 40/18 |
| | | | | 715/220 |
| 7,997,772 B2* | 8/2011 | Avtzon | | H04R 1/028 |
| | | | | 362/392 |
| 9,148,613 B1* | 9/2015 | Goldberg | | H04N 5/44591 |
| 9,158,743 B1* | 10/2015 | Kraemer | | G06F 8/38 |
| 2002/0091728 A1* | 7/2002 | Kjaer | | G06F 40/18 |
| | | | | 715/212 |
| 2002/0138512 A1* | 9/2002 | Buresh | | G16H 40/63 |
| | | | | 715/214 |
| 2004/0199539 A1* | 10/2004 | Richardson | | G06F 16/13 |
| 2005/0022111 A1* | 1/2005 | Collet | | G06F 40/18 |
| | | | | 715/205 |
| 2006/0107196 A1* | 5/2006 | Thanu | | G06F 40/18 |
| | | | | 715/217 |
| 2006/0200779 A1* | 9/2006 | Taylor | | G09G 5/14 |
| | | | | 715/781 |
| 2007/0203920 A1* | 8/2007 | Bertram | | G06F 16/168 |
| 2009/0024942 A1* | 1/2009 | Pendergast | | G06F 3/1204 |
| | | | | 715/764 |
| 2009/0049372 A1* | 2/2009 | Goldberg | | G06F 40/18 |
| | | | | 715/227 |
| 2011/0072340 A1* | 3/2011 | Miller | | G06Q 40/02 |
| | | | | 715/220 |
| 2011/0320927 A1* | 12/2011 | Jones | | G06F 40/131 |
| | | | | 715/234 |
| 2012/0173963 A1* | 7/2012 | Hoke | | G06F 16/9577 |
| | | | | 715/234 |
| 2012/0185761 A1* | 7/2012 | Adepalli | | G06F 3/04883 |
| | | | | 715/227 |
| 2012/0221979 A1* | 8/2012 | Farn | | G06F 16/9027 |
| | | | | 715/854 |
| 2013/0239049 A1* | 9/2013 | Perrodin | | G06F 3/0481 |
| | | | | 715/800 |
| 2015/0186352 A1* | 7/2015 | Greenwood | | G06F 40/137 |
| | | | | 715/217 |

* cited by examiner

Last year, XYZ Corp. launched XYZ Tool Shed 2.0 to enable developers on both desktop and mobile platforms to make the most of the next generation of web technologies when developing projects. Today, XYZ Corp. has announced new tools and resources to help developers test their software on multiple platforms at once.

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

If you're a developer looking to get your hands on XYZ Corp.'s new tools and resources, visit XYZ Tool Shed 2.0 for more info and to sign up.

FIG. 1

| | |
|---|---|
| + Last year | XYZ Corp. launched XYZ Tool Shed 2.0 |
| − Today | XYZ Corp. announced new tools and resources |
|   + For | Developers |
|   − Developer's Toolkit | |
|     + Free | Limited supply − will go fast |
|     Delivered | Via USB stick |
|   + XYZ Tool Shed 2.0 | New features |
|   More info and to sign up | XYZ Tool Shed 2.0 |
| + UPDATE | Sold out around 11:30 AM EST |

FIG. 2C

| | |
|---|---|
| + Last year | XYZ Corp. launched XYZ Tool Shed 2.0 |
| − Today | XYZ Corp. announced new tools and resources |
|   + For | Developers |
|   + Developer's Toolkit | |
|   − XYZ Tool Shed 2.0 | New features |
|     − Ability | upload new storefronts |
|       For | Small- and medium-sized businesses |
|     + Ability | Run stress tests on backend data servers |
|   More info and to sign up | XYZ Tool Shed 2.0 |
| + UPDATE | Sold out around 11:30 AM EST |

| | | | | |
|---|---|---|---|---|
| | spanning con | neighbor A | | |
| | neighbor B | neighbor C | | |
| | neighbor D | neighbor E | | |
| | | | | |
| | | | | |

| | | | | |
|---|---|---|---|---|
| | spanning content | | A | |
| | | | C | |
| | 1706 | | | |
| | neighbor D | neighbor | E | |
| | | | | |
| | | | | |

FIG. 17B

1708 spanning content

FIG. 17C

1710 spanning content neighbor D | neighbor E

FIG. 17D

1712 spanning content A
C
neighbor D  neighbor E

|  |  | 2102 |  | 2104 |  |
|---|---|---|---|---|---|
|  | cell A | cell B | cell C |  |  |
|  | cell D | cell E | cell F |  |  |
|  | cell G | cell H | cell I |  |  |

FIG. 21A

|  |  | 2106 |  | 2108 |  |
|---|---|---|---|---|---|
|  | cell C | cell B | cell A |  |  |
|  | cell F | cell E | cell D |  |  |
|  | cell I | cell H | cell G |  |  |

FIG. 21B

|  | cell A | cell B | cell C |  |
|---|---|---|---|---|
|  | cell D | cell E | cell F | ← 2202 |
|  | cell G | cell H | cell I |  |
|  |  |  |  | ← 2204 |
|  |  |  |  |  |

FIG. 22A

|  | cell G | cell H | cell I |  |
|---|---|---|---|---|
|  | cell D | cell E | cell F | ← 2206 |
|  | cell A | cell B | cell C |  |
|  |  |  |  | ← 2208 |
|  |  |  |  |  |

|   | cell A | cell B | cell C |   |
|---|---|---|---|---|
|   | cell D | cell E | cell F | ← 2502 |
|   | cell G | cell H | cell I |   |
|   | cell J | cell K | cell L | ← 2504 |

FIG. 25A

|   | cell J | cell K | cell L |   |
|---|---|---|---|---|
|   | cell D | cell E | cell F | ← 2506 |
|   | cell G | cell H | cell I |   |
|   | cell A | cell B | cell C | ← 2508 |

FIG. 25B

| | |
|---|---|
| + Last year | XYZ Corp. launched XYZ Tool Shed 2.0 |
| + Today | XYZ Corp. announced new tools and resources |
|   More info and to sign up | XYZ Tool Shed 2.0 |
| + UPDATE | Sold out around 11:30 AM EST |

FIG. 26A

| | |
|---|---|
| − Last year | XYZ Corp. launched XYZ Tool Shed 2.0 |
|   − For developers | Make the most of next generation web technologies |
|     On | Desktop and mobile platforms |
|   − Full text | Last year, XYZ Corp. launched XYZ Tool Shed ... |
| | ☐ Announcement |
| + Today | XYZ Corp. announced new tools and resources |
|   More info and to sign up | XYZ Tool Shed 2.0 |
| + UPDATE | Sold out around 11:30 AM EST |

To help developers make the most of XYZ Tool Shed 2.0, XYZ Corp. is offering the new tools and resources for free, as long as developers sign up on the company website. (This "Developer's Toolkit" will be delivered via a USB stick.) Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

To help developers make the most of XYZ Tool Shed 2.0, XYZ Corp. is offering the new tools and resources ✛ the kits sold out around 11:30am EST, noting "we'll try to make similar offers available in the near future."

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

3424

3428

XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

To help developers make the most of XYZ Tool Shed 2.0, XYZ Corp. is offering the new tools and resources ✚ ↖
     3432

✚ the kits sold out around 11:30am EST, noting "we'll try to make similar offers available in the near future."

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

− XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

+ XYZ Corp. notes that there is a "limited supply" of the Developer's Toolkit USB sticks...

3512                              FIG. 35B                              3514

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

– XYZ Corp. notes that there is a "limited supply" of the Developer's Toolkit USB sticks that provide the free tools and resources. As company is aware that "there's a big demand from startups looking to save on costs to purchase software and licensing," these kits will likely go fast. UPDATE: And they did go fast. XYZ Corp. just tweeted that the kits sold out around 11:30am EST, noting "we'll try to make similar offers available in the near future."

To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

+ XYZ Corp. notes that there is a "limited supply" of the Developer's Toolkit USB sticks...
  UPDATE: ... the kits sold out

— To help developers make the most of XYZ Tool Shed 2.0, XYZ Corp. is offering the new tools and resources for free, as long as developers sign up on the company website. (This "Developer's Toolkit" will be delivered via a USB stick). Additionally, XYZ Corp. is also offering new features with XYZ Tool Shed 2.0 including the ability to upload new storefronts for small- and medium-sized businesses, as well as the ability to run stress tests on backend data servers – even for sites located behind a firewall.

+ XYZ Corp. notes that there is a "limited supply" of the Developer's Toolkit USB sticks...

+ To help developers make the most of XYZ Tool Shed 2.0, XYZ Corp. is offering the new...

FIG. 35F

METHOD AND APPARATUS FOR STRUCTURED DOCUMENTS

CROSS-REFERENCE TO RELATED APPLICATION

This application is a continuation-in-part of U.S. application Ser. No. 15/981,620 filed on May 16, 2018 entitled "Method and Apparatus for Structured Documents", which is a continuation application of U.S. application Ser. No. 14/492,034 filed on 21 Sep. 2014 entitled "Method and Apparatus for Structured Documents", which claims priority to U.S. provisional application No. 61/881,450 filed on 24 Sep. 2013 entitled "Method and Apparatus for Structured Documents" and U.S. provisional application No. 61/919,688 filed on 20 Dec. 2013 entitled "Method and Apparatus for Structured Documents", and claims priority to U.S. provisional application No. 62/562,424 filed on 23 Sep. 2017 entitled "Method and Apparatus for Structured Documents", the entire disclosures of all of which are hereby incorporated by reference.

TECHNICAL FIELD

This subject matter relates generally to apparatus, processes, and systems for implementing structured documents.

BACKGROUND

A text document is a flat, sequential structure. It requires that ideas, with all their parts and interrelationships, be woven into a linear thread and packed onto the flat surface of the medium. The author has to lay out scraps of information in a sequential mosaic, while the reader must parse the structure out of the page and visualize in his own mind the author's meaning. The connection between the author and the reader is through a wall of text with little transparency as to any structure or relationship among the ideas.

Prior art systems have employed various means to represent and organize unstructured textual information. Conventional text editors may provide bullet points and indentation to segment a block of text for easier readability. Certain note-taking applications blend long-form text with the ability to spatially arrange snippets of text on a two-dimensional canvas. Others group snippets of text into categories which can be searched in various ways. Concept- and cognitive-mapping tools typically eschew long-form text in favor of a graphical representation of information; they model knowledge as a web of simple concepts connected via links. Outliners are a class of note-taking applications that enable the organization of information in hierarchies.

Some outliners allow items to have typed attributes, displayed in columns, giving the effect of a hierarchical table. Spreadsheets may provide means to group rows and columns to form quasi-hierarchical structures that may be collapsed/expanded to hide/show the rows and columns. Certain word processing applications provide tables or grids that may be used to organize textual information.

Text editors in certain programming tools provide auto-indentation and syntax highlighting to better visualize the elements of a program text. Some provide means to hide/show various elements of a program text based on the hierarchical structure of programming constructs. Certain text editors provide pop up views similar to the familiar tool tips in response to a mouse pointer hovering over program text. A pop up view may display documentation associated with a program element underneath the mouse pointer at the time of the hover.

Certain web pages provide means to expand/collapse a portion of the text on the page to show/hide additional information respectively. Certain web pages, in response to a mouse pointer hovering over a link, display a pop up view containing some information about the link, such as a summary of the content of the link's target page. These effects may not be easy to achieve and may require non-trivial knowledge of the technologies used behind the scenes to generate and format web pages.

BRIEF SUMMARY

In accordance with one embodiment, the present invention comprises methods and systems for organizing information in a grid. Aspects of this grid may be easily manipulated via user interface operations. In accordance with one embodiment, the present invention comprises methods and systems for organizing information in a block of text. Aspects of this block of text may be easily manipulated via user interface operations. The block of text may contain elements that may be expanded or collapsed alternatively to show or hide hidden elements. In accordance with one embodiment, the present invention comprises methods and systems for organizing information on a canvas. Aspects of this canvas may be easily manipulated via user interface operations.

In accordance with one embodiment, the present invention comprises methods and systems for restructuring a hierarchy such that a parent row and a plurality, but not all, of its child rows are moved from one position to another on a grid, wherein the restructuring is in response to a drag operation.

In accordance with one embodiment, the present invention comprises methods and systems for displaying a parent row and its child rows in such a way that a plurality of the child rows of the parent row are visible and a plurality of the child rows of the parent row are hidden.

In accordance with one embodiment, the present invention comprises methods and systems for changing the size of a visual representation of a single cell in a grid, wherein the changing is in response to a drag operation.

Various additional embodiments, including additions and modifications to the above embodiments, are described herein.

BRIEF DESCRIPTION OF THE DRAWINGS

The accompanying drawings, which are incorporated into this specification, illustrate one or more example embodiments of the inventions disclosed herein, together with the detailed description. The drawings are illustrative only, and that what is depicted therein may be adapted, based on this disclosure, in view of the common knowledge within this field.

In the drawings:

FIG. 1 is an exemplary article.

FIG. 2B-FIG. 2D show the document with various rows expanded.

FIG. 17A-FIG. 17E illustrate scenarios wherein a cell's span may be modified via user interface operations.

FIG. 18A-FIG. 18D illustrate scenarios wherein the span of multiple cells in the same column may be adjusted via user interface operations.

FIG. 21A and FIG. 21B illustrate a scenario wherein multiple cells in two columns are swapped.

FIG. 22A and FIG. 22B illustrate a scenario wherein multiple cells in two rows are swapped.

FIG. 23A and FIG. 23B illustrate a scenario wherein there is a mismatch between two selected groups of cells that are to be swapped.

FIG. 25A and FIG. 25B illustrate a scenario wherein multiple cells in two rows are swapped using a single contiguous selection.

FIG. 26A-FIG. 26E illustrate pop up views.

FIG. 34A and FIG. 34B illustrate a scenario wherein a range structural element includes text from two paragraphs. FIG. 34C and FIG. 34D illustrate an alternative scenario wherein range structural elements respect paragraph boundaries.

FIG. 35A and FIG. 35B illustrate a scenario wherein a block structural element is added to a conventional block of textual information. FIG. 35C and FIG. 35D illustrate a scenario wherein portions of text have been specially designated to provide more detailed information when their associated block structural element is collapsed. FIG. 35E and FIG. 35F illustrate a scenario involving a block structural hierarchy.

DETAILED DESCRIPTION

The following detailed description is illustrative only and is not intended to be in any way limiting. Other embodiments of the present inventions will readily suggest themselves to such skilled persons having the benefit of this disclosure, in light of what is known in the relevant arts.

In the interest of clarity, not all of the routine features of the embodiments described herein are shown and described. In the implementation of any such actual embodiments, numerous implementation-specific decisions must be made in order to achieve the specific goals of the developer, such as compliance with regulatory, safety, social, environmental, health, and business-related constraints, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as appropriate.

Figure 2A:
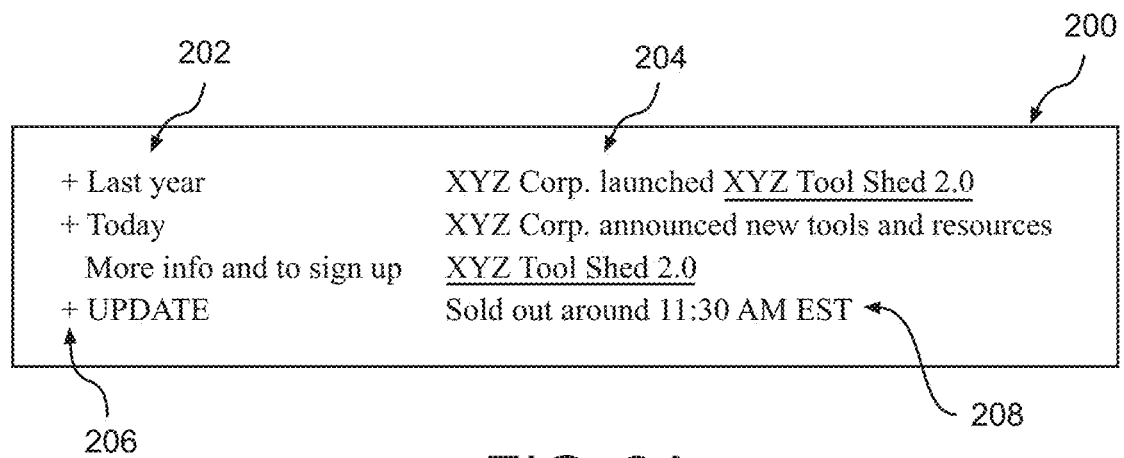
FIG. 2A shows the article of FIG. 1 written in a hierarchical format.
Figure 2B:
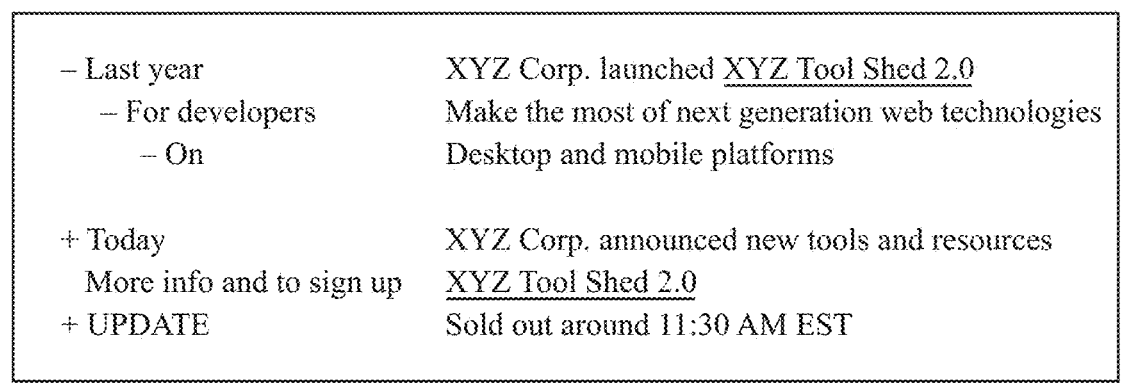
Figure 3:
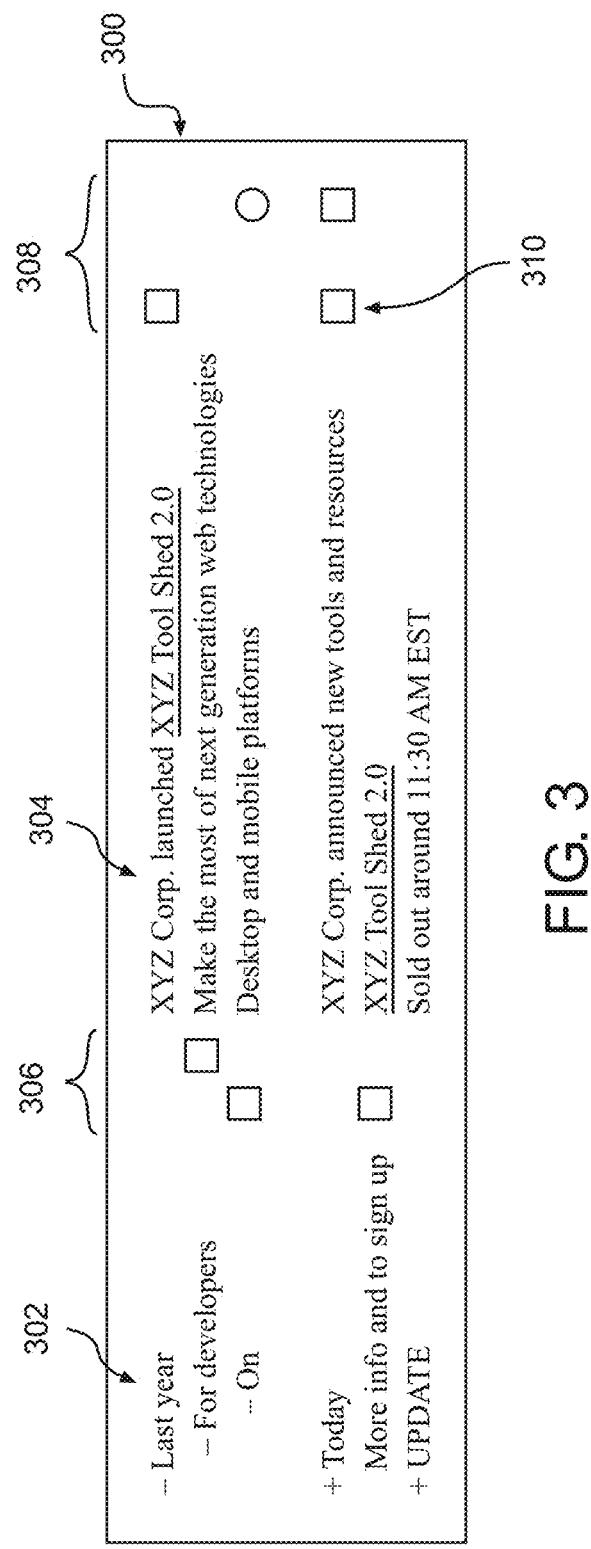
FIG. 3 shows a structured document containing textual and non-textual information.

Structured Text—FIGS. 1-3

FIG. 1 is an exemplary article. It consists of a wall of text with little transparency as to the information contained inside. FIGS. 2A-2D show the same information organized in a two-column hierarchy in accordance with one embodiment.

FIG. 2A—Structured text: article in a snapshot
FIG. 2B—Background, first line fully expanded
FIG. 2C—Today's announcement at a glance
FIG. 2D—Today's announcement, technical details In the exemplary embodiment of FIGS. 2A-2D, the display area 200 contains two text columns 202, 204. An icon 206 on an item, node, line, or row 208 denotes whether the row has any children. Clicking on the icon 206 with a mouse or other pointing device would alternately expand and collapse the row to show or hide its children respectively.

Traditional text weaves the various bits of information into a linear thread that must be parsed to extract its meaning. Structured text helps keep the various units of information separate and relies on a cellular, or grid, structure and hierarchical layering to organize its content. The hierarchy enables a stratification of information, while the grid structure enables a further breaking up of information for easier visual identification.

FIG. 3 illustrates an exemplary embodiment where the document in FIGS. 2A-2D is annotated with non-textual items. The display area 300 contains two text columns 302, 304 and two non-textual columns 306 sandwiched between them. Three more columns 308 are placed to the right. A non-textual item 310 in the document may be represented by an icon and may be moved, copied, or otherwise manipulated in a manner similar to textual information described below. In one embodiment, columns are typed and the placement of information is restricted to the columns of the appropriate type. In another embodiment, information may be placed in any column regardless of type.

In various embodiments, an icon 310 in a non-textual column 306, 308 may represent an object such as a text block, image, diagram, file, structured document, grid, date, annotation, link, or other types of information. In the exemplary embodiment of FIG. 3, an icon 310 may represent a block of conventional text, such as the full article presented in FIG. 1. The user may view and edit the content represented by an icon 310 by issuing the appropriate command such as a double click from the user interface.

Figure 4:
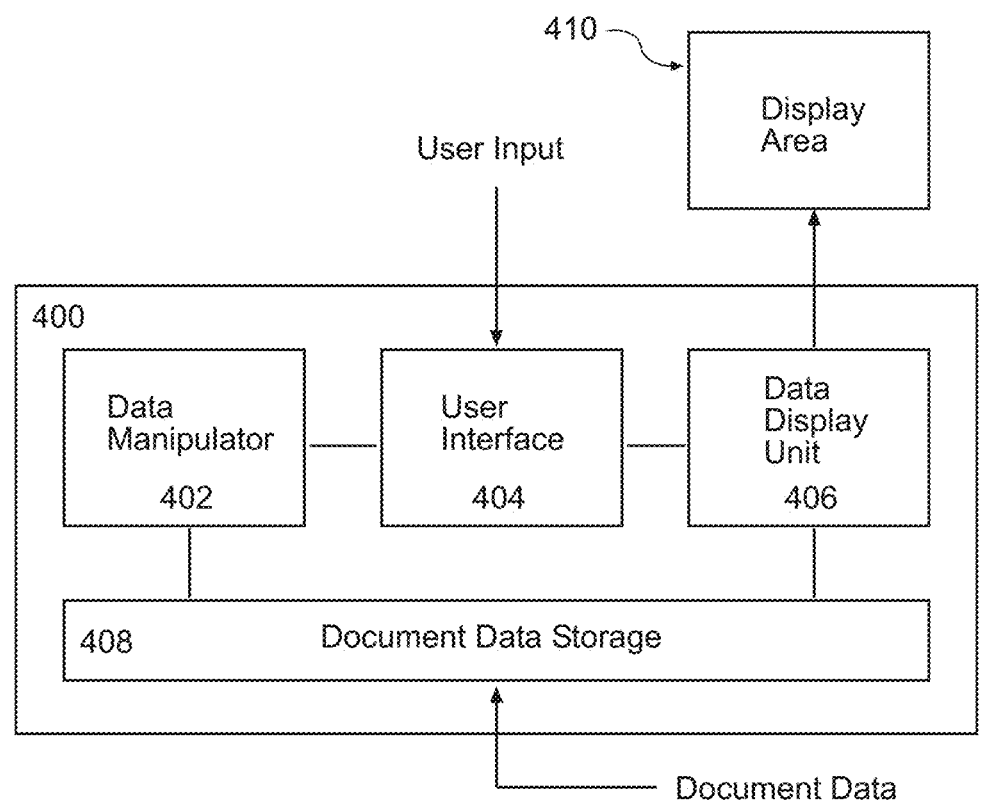
FIG. 4 is a block diagram of a data processing system, which can process a document such as the structured document shown in FIG. 2 and FIG. 3.

Data Processing System—FIG. 4

FIG. 4 is a functional block diagram of a data processing system 400 which can process a document such as the structured document 200 shown in FIGS. 2A-2D. In the illustrated embodiment of FIG. 4, the data processing system 400 includes a data manipulator 402, a user interface 404, and a data display unit 406.

The user interface 404 receives input from a user and sends the input either to the data display unit 406 to be processed and displayed and/or to the data manipulator 402 to manipulate the data. The user input can be a command, content (e.g., text), or other related input. The data manipulator 402 receives document data (e.g., data from document 200), which may include text content, document structure data, and other related data such as metadata, from a document data storage 408, and manipulates the received document data according to the user input. The manipulated document data is then stored in the document data storage 408. The data display unit 406 receives the user input from the user interface 404 and the document data from the storage 408, and processes the user input and the document data to generate a visual representation of the document data. The data display unit 406 displays various components of the processed user input and the document data on a display area 410 in a manner that will be described in more detail below.

Figure 5:
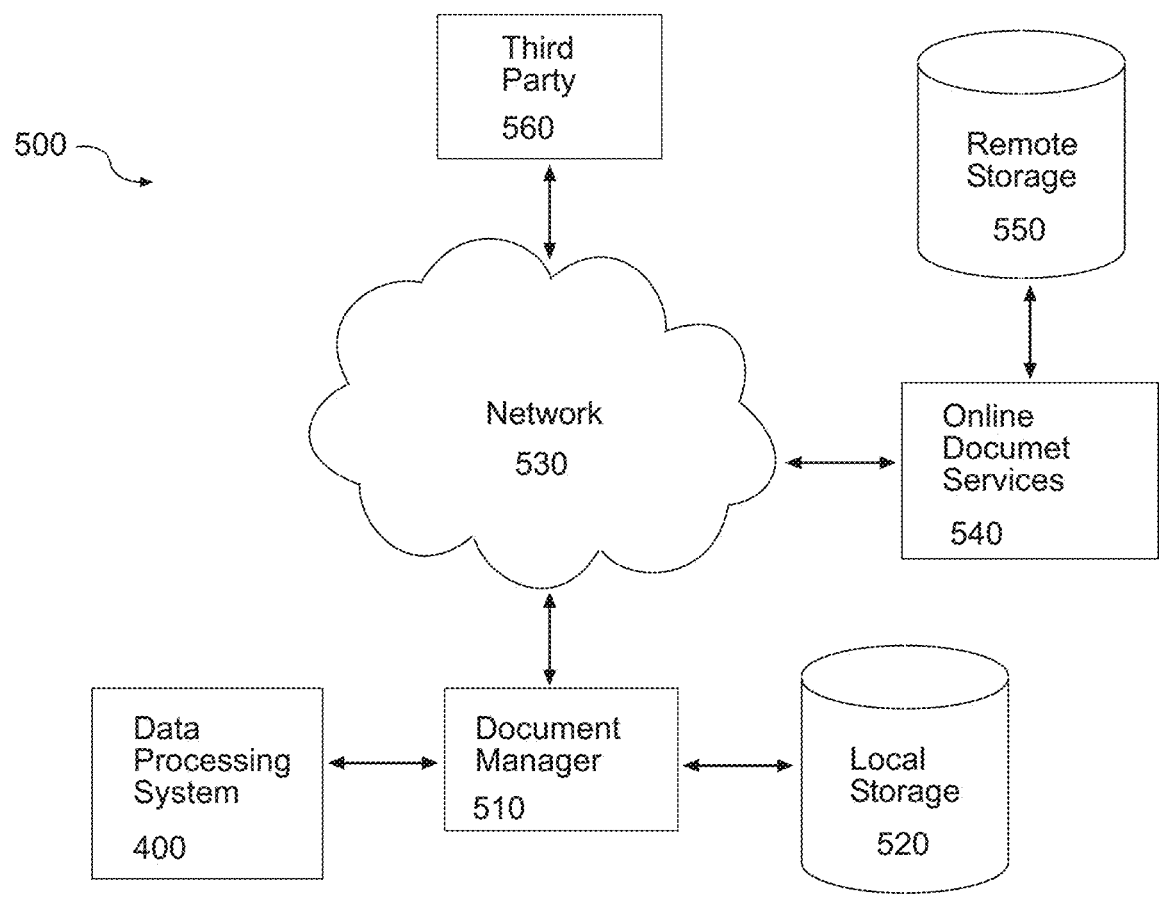
FIG. 5 illustrates a document management system in accordance with one embodiment.

Document Management System—FIG. 5

FIG. 5 is functional block diagram of a document management system that may be used to manage a collection of documents such as the exemplary structured document 200 shown in FIGS. 2A-2D. In the illustrated embodiment of FIG. 5, the data processing system 400 described in connection with FIG. 4 interacts with a document manager 510 to fetch and load documents and related data.

In various embodiments, a structured document may contain references to objects that exist independently of it, such as records in a common system calendar, annotation definitions referenced by a plurality of structured documents, and links to other structured documents or to resources such as image, video and text files. The document manager 510 resolves these references as needed to locate the required data.

For example, in one embodiment, a structured document being displayed on the display area 410 may contain a link to another structured document. The user may issue a command to the user interface 404 to fetch and open the document referred to by that link. In response, the data processing unit 400 forwards the request to the document manager 510 depicted in FIG. 5, which in turn tries to locate the requested resource. If the requested document is not available in the local storage 520, the document manager 510 sends a request to the external server 540 for the requested document. Once the requested document is located in the local storage 520, or received from the external server 540, the document manager 510 passes the document to the data processing system 400, which in turn displays the document in the display area 410.

Although one local data store 520 and one remote data store 550 are shown in FIG. 5, it is to be understood that structured documents and other content and related data may be stored in a plurality of data stores and locations, including locally, remotely, or a combination thereof.

In various embodiments, the location from which to find and retrieve desired content may be specified by the user, or resolved automatically by the document manager 510. Whether stored locally or in a remote repository, the structured document and any referenced content may be stored as one or more files, or as one or more records in a database, or a combination of the two.

In one embodiment, the entirety of the information in a database may be represented as a single structured document. In that embodiment, the database is queried and various parts of the database are retrieved and displayed in response to user action.

In various embodiments, the document manager 510 may be a standalone configuration without a connection to a network 530, or a thin client delegating most operations to a remote server 540, or something in between.

In one embodiment, the remote storage 550 is managed by an online document service 540 running on a server computer having a server application for communicating with the document manager 510. The document manager 510 may include a client application operable to communicate with the online document service 540 via a network 530, such as the Internet.

The online document service 540 may include a plurality of services, such as user accounts, access control, online structured document editors, collaboration and management tools, and others. Additional client and/or server applications 560 may be in communication with the online document service 540 and/or the document manager 510 via the network 530.

Operation

FIGS. 2, 3, 6-9, 11-35 illustrate graphical user interfaces (GUIs) for use in manipulating structured documents in accordance with one or more embodiments. The GUIs may be employed in a structured document editing system, such as that shown in FIG. 4. In general, a user can create, edit, store and otherwise manipulate parts of a structured document through the GUIs.

The operation of the data processing unit 400, and in particular, the operation of the data display unit 406 and its associated units with respect to the display area 410, is described below in detail in connection with FIGS. 2, 3, 6-9, 11-35. Though the operation is described with reference to what is displayed to a user, it is to be understood that the display is generated by the units of the data processing 400 and document management 500 systems responding to user input and document data.

References are made below to specific keys on a keyboard, such as carriage return or CR, DELETE, CTRL, ALT, SHIFT and others. Furthermore, references are made below to combinations of keys on the keyboard, such as pressing the carriage return while simultaneously holding down the control key, or CTRL+CR. It is to be understood that such references are for clarity of exposition only and embodiments are not restricted to using those keys or combinations thereof. Furthermore, different computer systems may be equipped with keyboards comprising different sets of keys, or keys with different labels. It is to be understood that embodiments are not restricted to any specific computer architecture or manufacturer.

Though the operations are described with reference to specific user actions and editing outcomes, it is to be understood, however, that the operations are not limited to the specific details provided, and numerous other variations may be provided by embodiments.

In the interest of clarity, the operations described herein may refer to moving one or more rows, columns, cells and/or their contents. It is to be understood that the operations are not limited to the specific details of moving rows, columns, cells and/or their contents, and that embodiments may provide analogous operations for copying or deleting one or more rows, columns, cells and/or their contents.

Structured Text Editor

In various embodiments, a structured document is organized around cellular units of information. Means may be provided to transform textual information into cellular units that may be manipulated as objects. The cellular units or cells may be organized in grids or tables, or positioned on a canvas, or organized in other ways. The grid or canvas may be flat or hierarchical. In various embodiments, structural elements may be added to an otherwise conventional block of textual information.

In the following, operations and features are discussed in reference to embodiments that organize information in grids. However, the operations also apply to other forms of organization, including canvases.

Rows

In various embodiments, rows may be selected, moved, copied, and otherwise manipulated. Rows may be manipulated by clicking on, or dragging, a specially designated region on the display, such as a row header area or a row handle icon. In one embodiment, rows may be manipulated by selecting them, and then dragging the selected region on the display. In one embodiment, multiple rows may be selected so that they can be manipulated simultaneously.

Rows—Reorder and Restructure—FIGS. 6, 7

Figure 6A:
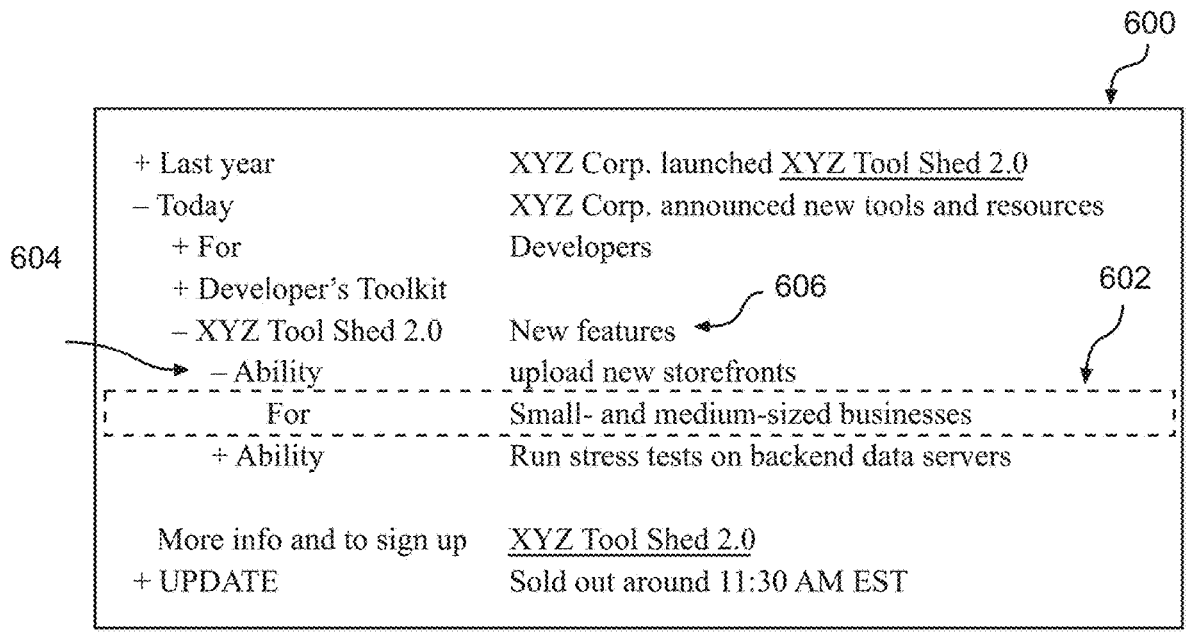
FIG. 6A and FIG. 6B illustrate a scenario wherein a row is dragged to another location.

FIG. 6A is an exemplary embodiment where one row has been selected 602. In the illustrative embodiment of FIG. 6A, the selection shading 602 spans the width of the display area 600 to indicate that a row has been selected. Various other means may be used to distinguish row selection from cell selection. For example, in one embodiment, selected rows are shaded in a different color from selected cells.

Figure 6B:
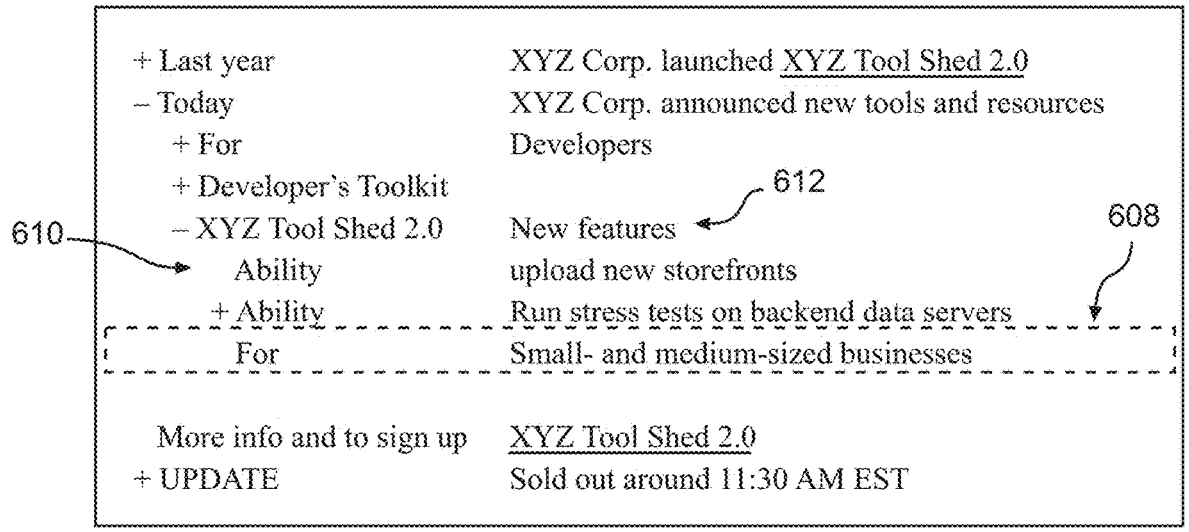

In various embodiments, rows may be manipulated via drag and drop. The user may drag rows to reorder them or drop them on other rows to restructure the hierarchical, or parent-child, relationships among them. For example, in FIG. 6A the user may drag the selection 602 and drop it on another row 606. As a result, the row is removed from its current parent 604 and is added as a new child of the target row 606. The result is illustrated in FIG. 6B. The selected row has been removed from its old parent 610, which now does not have any children. The selected row has been added as the last child of the target row 612. The selected row remains selected 608 to provide continuing visual feedback to the user.

Figure 7A:
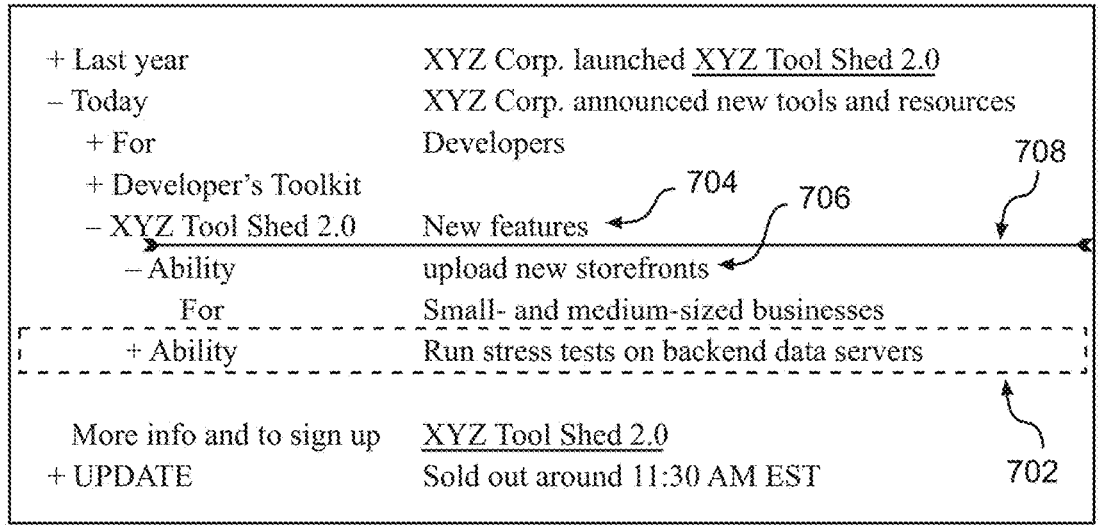
FIG. 7A and FIG. 7B illustrate another example of dragging a row to a new location.
Figure 7B:
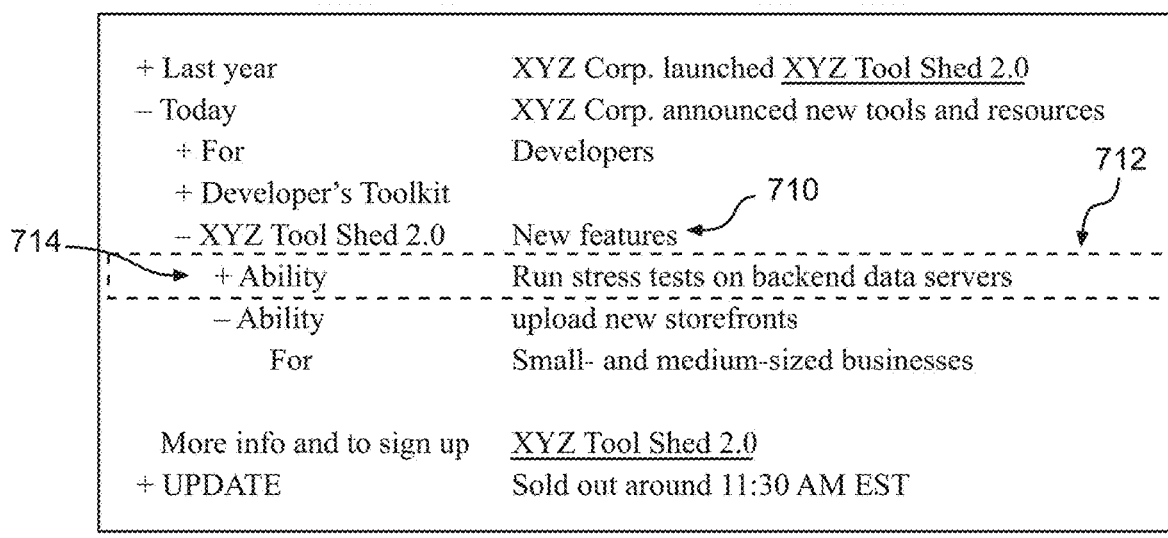

In one embodiment, if the mouse pointer is on a target row, and within a certain threshold distance from the top or the bottom of the target row at the time of the drop, the dragged rows are inserted above or below the target row, respectively. In the exemplary embodiment of FIG. 7A, a row has been selected 702 and dragged to the lower threshold region of another row 704, or the upper threshold region of the row 706 immediately below it 704. As a result, a line 708 is displayed on the boundary between the two rows 704,706 to provide visual feedback to the user. FIG. 7B illustrates what happens if the user initiates a drop operation at this point, for example by releasing the left mouse button. The row indicated by the selection 702 is removed from its current parent 704 and inserted as a child of its new parent 710. In the illustrative example of FIGS. 7A and 7B, the new parent 710 is the same as the old parent 704. The row indicated by the selection 702 is added as the first child of the new parent 710 and is selected 712 to provide continuing visual feedback to the user. In the exemplary embodiment of FIGS. 7A and 7B, moving a parent row 714 does not affect its relationship with its children. The hierarchical structure below the dragged row 714 remains unchanged.

Rows—Reorder and Restructure—FIGS. 8, 9

In various embodiments, means may be provided for a finer control over which rows are moved, copied or deleted in response to a manipulation of a parent row. In one embodiment, in response to dragging a parent row from one location to another, only a subset of its child rows are moved along with the parent row.

Figure 8A:
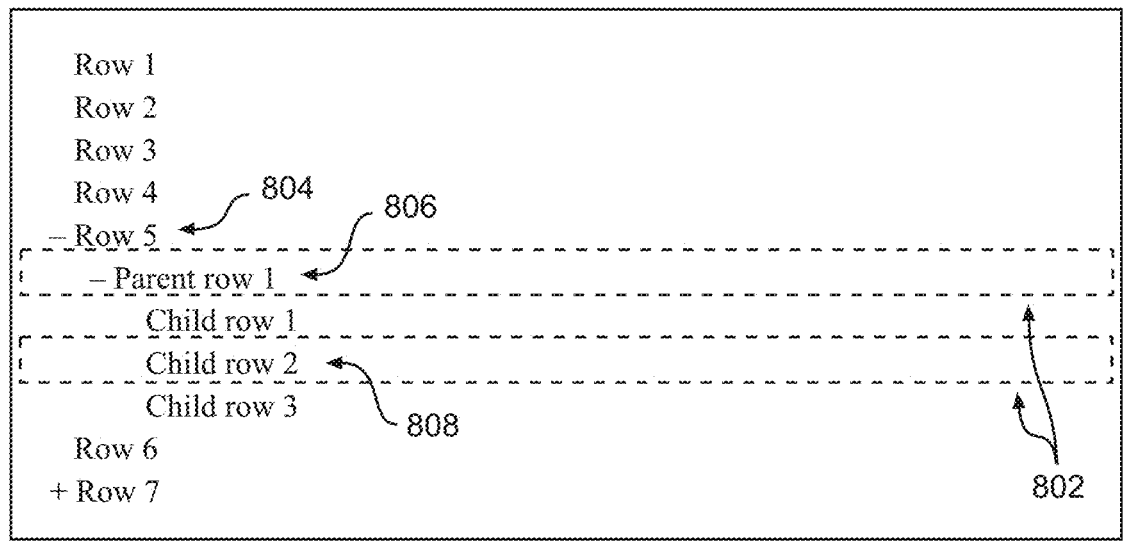
FIG. 8A and FIG. 8B illustrate a scenario wherein multiple rows are dragged to another location.

FIG. 8A illustrates an exemplary embodiment wherein a row 804 has a single child row 806, and the child row 806 has three children of its own. Both the row 804 and its child row 806 are in expanded state, and the child row 806 and one of its children 808 have been selected 802.

Figure 8B:
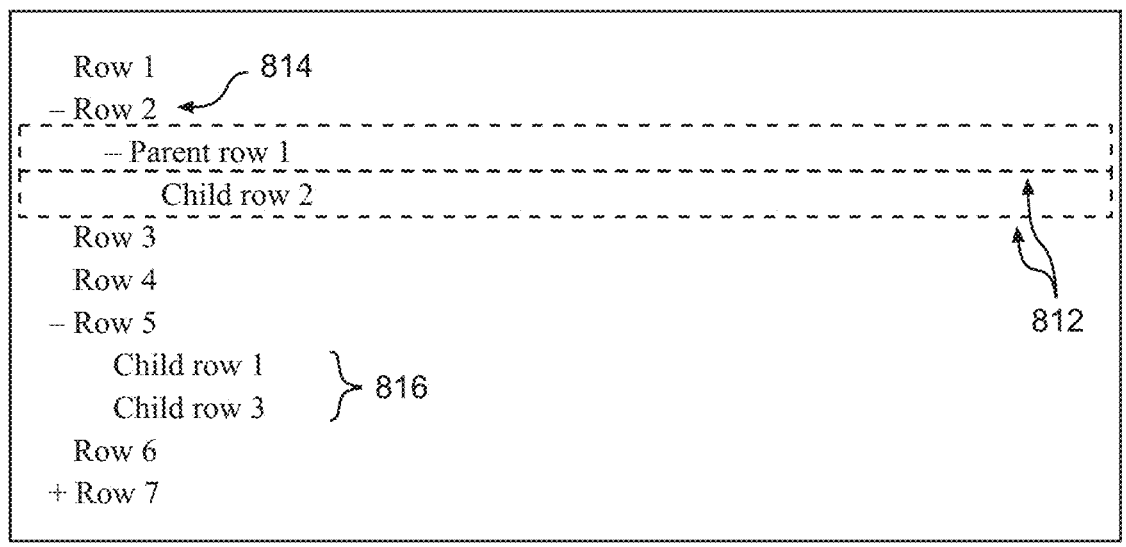

In the exemplary scenario of FIG. 8A, a user drags the selection 802 and drops it on another row 814 (FIG. 8B). In response, the selected row 806 and its selected child row 808 are added as children of the target row 814. The parent-child relationship between the rows 806 and 808 remains unchanged: after the operation, the child row 808 remains a child of the same parent row 806. In the exemplary embodiment of FIG. 8B, the rows that were moved 806, 808 remain selected 812 after the operation.

In the exemplary scenario of FIG. 8B, the unselected children of the parent row 806 (FIG. 8A) are left behind 816 and are now children of the row 804 (FIG. 8A) that, prior to the operation, was their grandparent row. In this exemplary scenario, the children left behind 816 are at the same level in the hierarchy after the modification that their parent row 806 was prior to the operation (FIG. 8A).

Figure 9A:
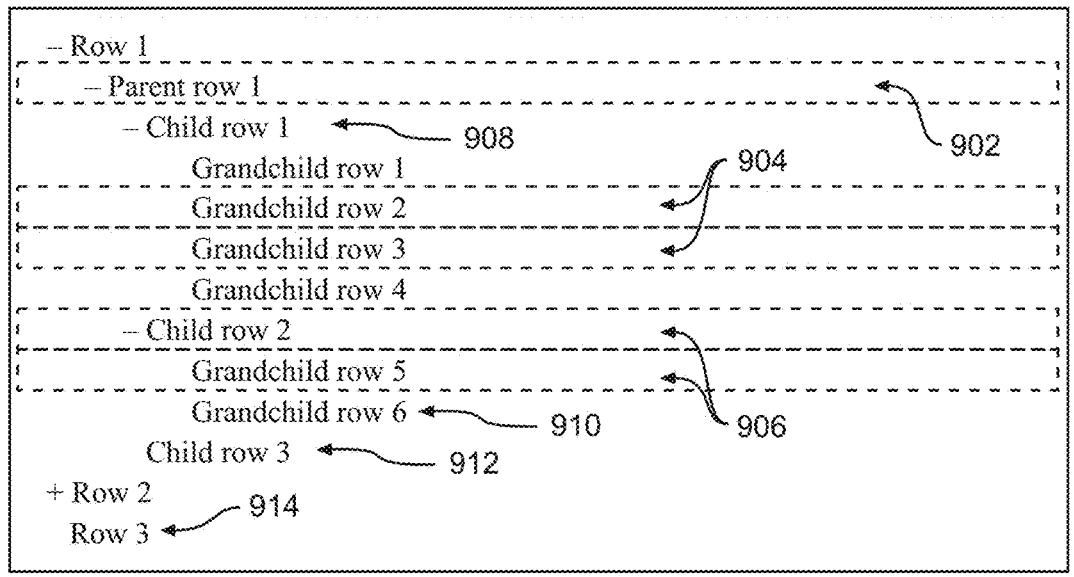
FIG. 9A and FIG. 9B illustrate another example wherein several rows are dragged to another location.

In various embodiments a user may select rows at various levels in the hierarchy and move or copy the selected rows to a new location. FIG. 9A illustrates an exemplary scenario in connection with one embodiment, wherein several rows at different levels in the hierarchy have been selected, including a parent row 902, two of its grandchildren 904, one of the parent row's 902 children 906 together with one of the child row's children 906.

Figure 9B:
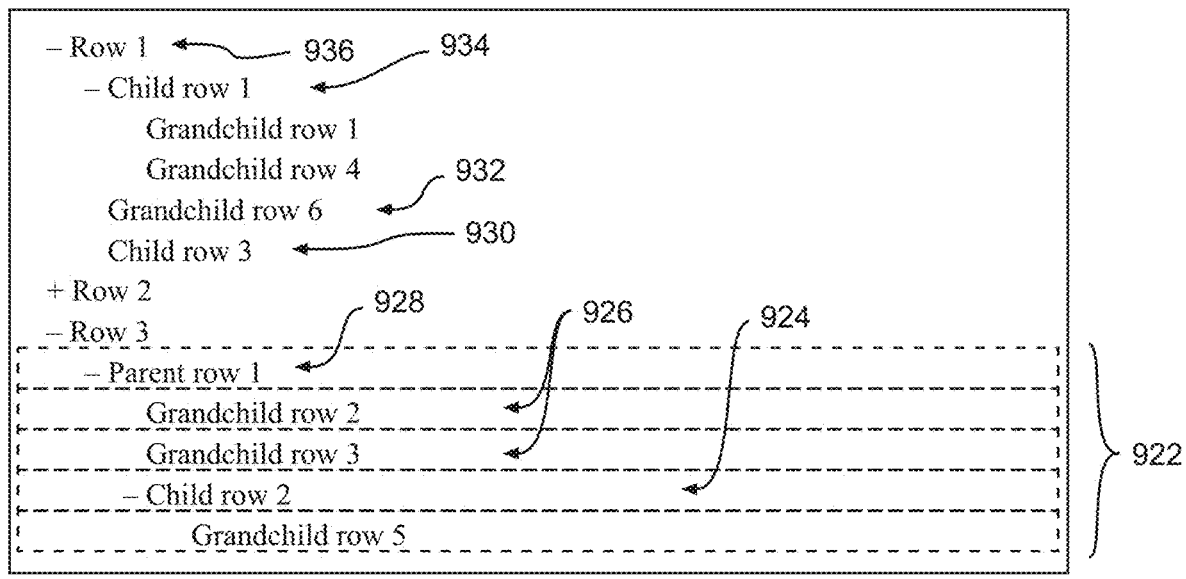

In the exemplary scenario of FIG. 9A, the selected rows are dragged and dropped on another row 914. FIG. 9B illustrates the result in accordance with one embodiment. The selected rows 902, 904, 906 (FIG. 9A) have been added 922 as descendants of the row 914 that was the target of the drop operation. Note that since "Child row 1" 908 was not selected (FIG. 9A), it is not moved with the selected rows, even though its parent row 902 and two of its children 904 have been moved 928, 926 (Fig. B). In the exemplary embodiment of FIG. 9B, as a result of the edit operation, the two selected children 904 of "Child row 1" 908 prior to the operation have become direct children 926 of "Parent row 1" 928 after the operation, and siblings of "Child row 2" 924. Since "Grandchild Row 2" and "Grandchild row 3" 926 do not have children, they are displayed without a +/–icon. In the exemplary embodiment of FIGS. 9A, B, the rows 902, 904, 906 that were selected prior to the operation remain selected after the operation 922.

In the exemplary embodiment of FIGS. 9A, B, rows that were not selected prior to the operation are left behind. In particular, "Child row 1" 908 and "Grandchild row 6" 910 (FIG. 9A) have become, after the operation, siblings 934, 932 of "Child row 3" 930, and direct children of "Row 1" 936 (FIG. 9B).

Figure 9C:
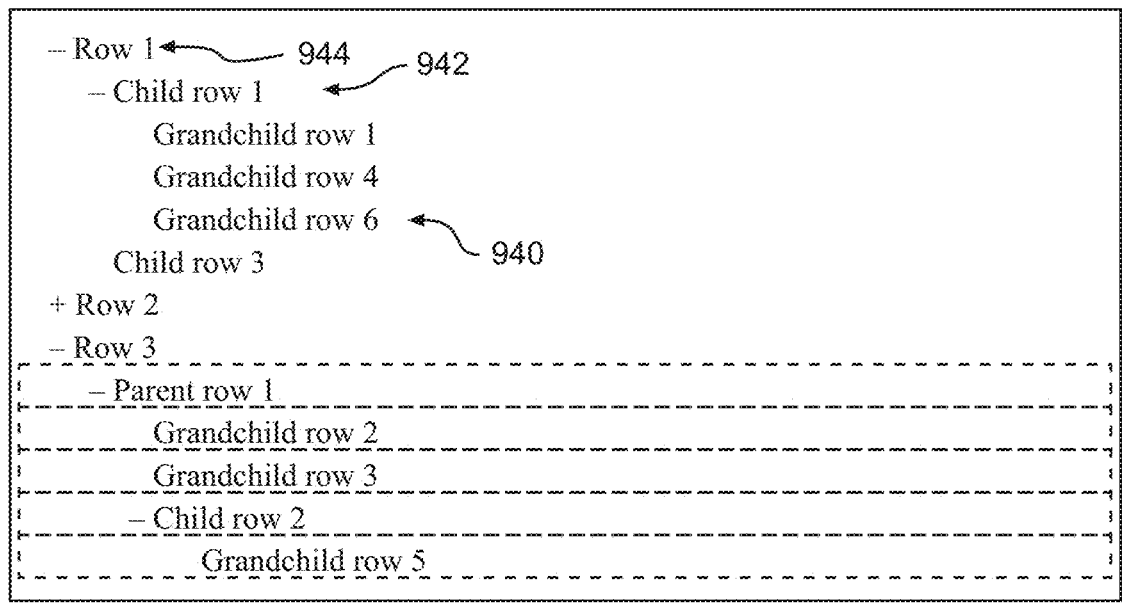
FIG. 9C shows an alternate policy in restructuring a hierarchy.

FIG. 9C illustrates an alternate embodiment wherein, in response to the drop operation, "Grandchild row 6" 940 has been added as the last child of "Child row 1" 942, rather than as a child of "Row 1" 944.

In various embodiments, when a parent row is in a collapsed state, its child rows are not displayed on the graphical user interface. Therefore, it may not be possible to select one or more of the child rows of the parent row without expanding the parent row.

In one embodiment, selection of a collapsed parent row may mean that the parent row and all its child rows are selected or otherwise designated for a move, copy, or delete operation. Moving a collapsed parent row may cause all its child rows to be moved as well, leaving all the parent-child relationships between the parent row and its child rows intact.

In the interest of clarity, the operations described in connection with FIGS. 8, 9 referred to moving rows. It is to be understood that the operations are not limited to the specific details of moving rows, and that embodiments may provide analogous operations for copying or deleting rows. In particular, deleting a parent row may not result in the deletion of all the parent row's children as well. A plurality of child rows or grandchildren at various depths in the hierarchy may be left behind.

The operations described in connection with FIGS. 8, 9 involved dragging one or more rows and dropping them on a target row. In various embodiments, one or more rows may be dragged and dropped within a threshold distance of the boundary between two target rows in a manner similar to the exemplary scenario of FIG. 7. As a result, the dragged rows may be inserted between the target rows.

In the interest of clarity, FIGS. 8, 9 do not explicitly show cells on any of the rows. It is to be understood that this is for illustration purposes only and is not to be construed as limiting in any way. In various embodiments, a row may have a plurality of cells. In various other embodiments, a row may not include a concept of a cell at all, and may be considered simply as one contiguous area where information or data may be displayed.

Though the operations are described with reference to specific outcomes including the hierarchical structures, after the operations, of rows that are moved and rows that are left behind, it is to be understood, however, that the operations are not limited to the specific details provided, including how, or what, hierarchies are constructed or maintained. Numerous other variations may be provided by embodiments.

Rows—Reorder and Restructure—FIG. 10

In the exemplary scenario of FIGS. 8A, B, the selected rows 806, 808 have to be extracted so that they can be moved to another location 814 in the hierarchy. The non-selected child rows 816 have to be extracted so that they can be inserted into the hierarchy at the position that, before the operation, was occupied by the highest-level selected row 806 in the hierarchy.

Figure 10A:
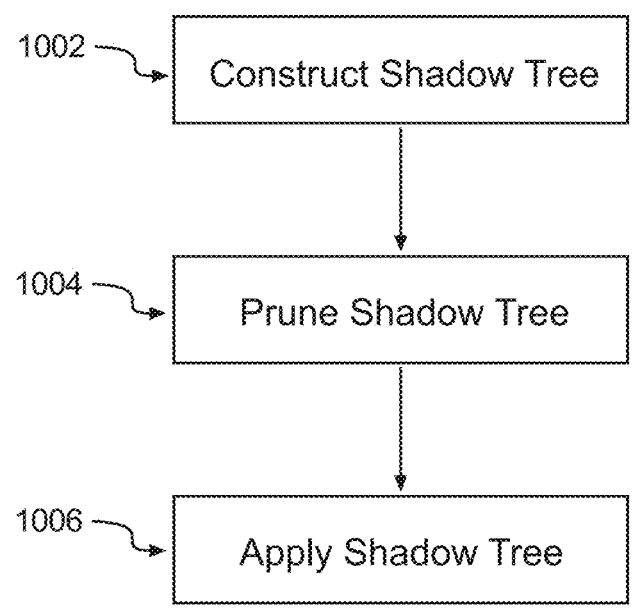
FIG. 10A and FIG. 10B are block diagrams of an algorithm for restructuring a hierarchy.

FIG. 10A is a block diagram of an extraction algorithm in accordance with one embodiment. The input to the algorithm comprises (a) a subtree whose root is the highest-level selected row 806 (FIG. 8A) in the hierarchy, (b) a list of the selected rows 806, 808 in the subtree, and (c) for each row in the subtree, whether the row is expanded or collapsed.

In the first block 1002, a shadow tree is constructed with the same hierarchical structure as the input subtree. Each node in the shadow tree corresponds to a row in the input subtree. In the exemplary embodiment of FIGS. 8, 9, the shadow tree is constructed to represent visible rows only, and does not include nodes corresponding to rows that are not visible. A row is visible if all of its ancestors are in an expanded state.

In the second block 1004, the shadow tree is pruned so that only the nodes corresponding to selected rows remain. To accomplish this, the nodes in the shadow tree are traversed in any order and for each node, if the row corresponding to the node is not selected, the node in the shadow tree is replaced by its children, i.e., the node is removed and all its child nodes are inserted into the shadow tree in order, starting in the same position in the shadow tree as the node prior to its removal. In the exemplary scenario of FIG. 8A, the pruning of the shadow tree corresponding to the subtree rooted at row 806 results in the nodes corresponding to the rows for "Child row 1" and "Child row 3" to be removed. Since the rows for "Child row 1" and "Child row 3" do not have any child rows, there are no corresponding child nodes to be inserted back into the shadow tree.

The processing at the second block 1004 changes the structure of the shadow tree, but leaves the structure of the input subtree intact. In the third block 1006, the input subtree is modified to reflect the updated structure of the shadow tree. The nodes in the shadow tree are traversed in any order and for each node, parent-child relationships are established in the input subtree that correspond to the parent-child relationships between the node and its child nodes in the shadow tree. In the exemplary scenario of FIGS. 8A, 8B, the subtree rooted at node 806 is thus modified to form the subtree that is to be inserted in the new location 814.

An algorithm similar to the extraction algorithm of FIG. 10A may be used to obtain the rows 816 that are to be left behind. In the first block 1002 a shadow tree is constructed as before. In the second block 1004, the shadow tree is pruned so that this time, the nodes corresponding to the selected rows are removed and only the nodes corresponding to the non-selected rows remain. The algorithm of the second block 1004 proceeds as before, except for the decision as to which nodes to remove and which to keep. The resulting data structure or shadow tree may not be a tree at all, since the root node of the shadow tree constructed in step 1 was selected and is therefore removed.

The processing at the third block 1006 proceeds as before. However now, the input subtree pruned of its selected rows may not be a subtree any more since the root 806 of the subtree was selected and is therefore not included in the result. In the exemplary scenario of FIG. 8B, two rows 816 remain from the subtree rooted at row 806.

Figure 10B:
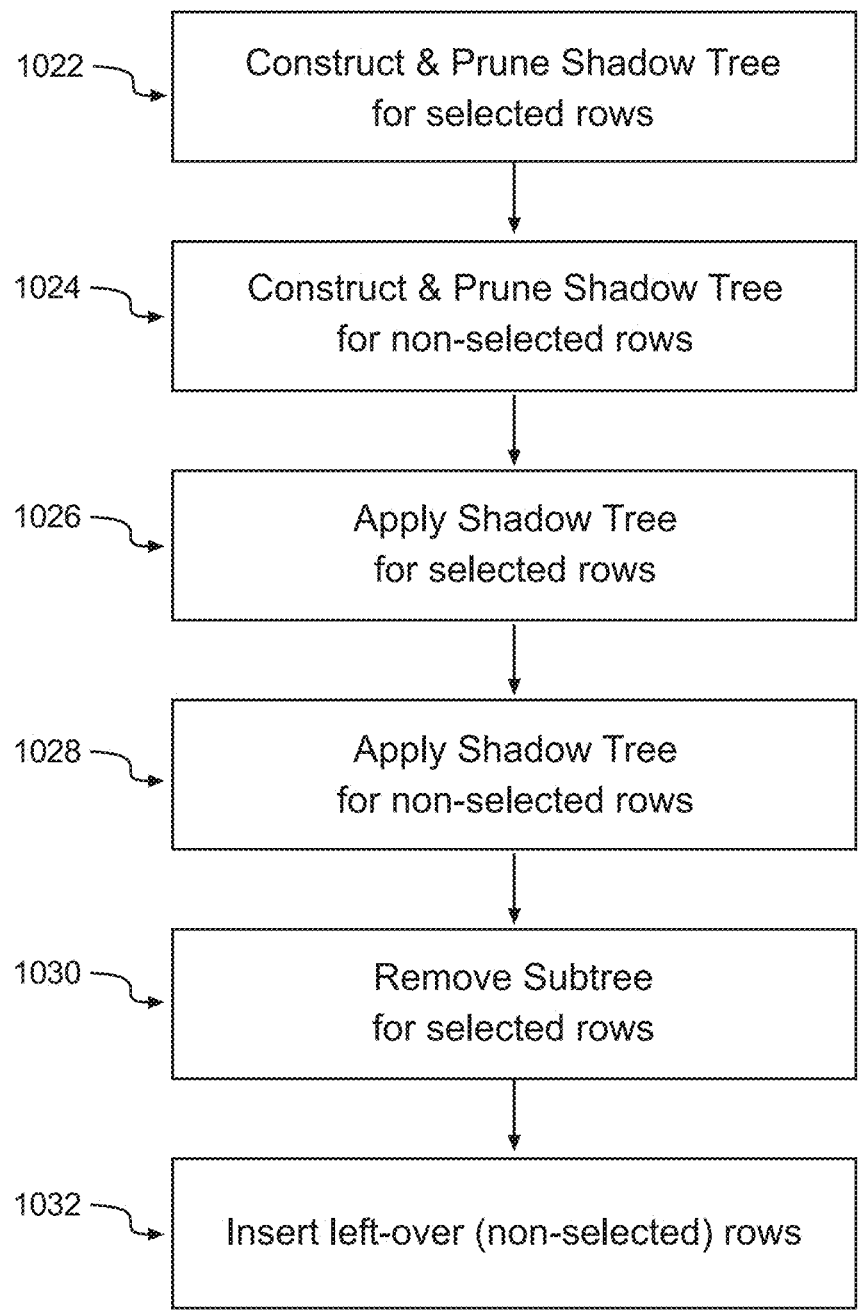

FIG. 10B is a block diagram of the extraction process at a higher level of abstraction. To move the subtree rooted at row 806 (FIG. 8A), the algorithm computes the pruned shadow tree for the selected nodes 1022 as well as the pruned shadow tree for the non-selected rows 1024 as described in connection with FIG. 10A. Next, the algorithm uses the pruned shadow trees to restructure rows of the input subtree 1026, 1028. In the exemplary scenario of FIG. 8A, once this stage is completed, the subtree rooted at row 806 only has two rows, i.e., the root 806 of the subtree and one of its children 808. The non-selected children of the subtree rooted at 806 have been removed from the subtree, but references to those rows are kept in the pruned shadow tree for the non-selected rows 1024.

In the next step 1030, what remains of the subtree rooted at row 806 is removed from its parent row 804 and in its place the non-selected rows 816 are inserted in order 1032, as children of the parent row 804. The subtree rooted at row 806 that has thus been removed can now be inserted at the target location.

In the discussion in connection with FIGS. 10A, B, references are made to removing a node from a shadow tree and inserting back the children of the removed node in its place. It is to be understood that when a node is removed, multiple children may have to be inserted back in its place. The children that are to be inserted back are inserted at positions starting with the position of the removed node. For example, if the node to be removed is the third child of a parent node, after the removal of the node, the children of the removed node are added back in order, as children of the parent node, immediately after the first two existing children of the parent node. Insertion of multiple descendant rows at the position of a removed ancestor row is handled in an analogous manner.

The algorithms described in connection with FIGS. 10A, B require that the selected rows belong to one subtree whose root is also selected. In various embodiments, scenarios where this is not the case may be handled by partitioning the selected nodes into a plurality of non-overlapping subtrees each satisfying the input requirements of the algorithm (e.g., each having a root that is selected), and then processing each subtree in turn.

The discussion in connection with FIGS. 10A, B includes references to FIGS. 8, 9. It is to be understood that such references are illustrative only and are not to be construed as limiting in any way. It is to be understood that the operations described herein are not limited to the specific details provided, and numerous other variations may be provided by embodiments.

In the discussion in connection with FIGS. 8-10, operations are described with reference to specific outcomes including the hierarchical structures, after the operations, of rows that are moved and rows that are left behind. It is to be understood, however, that the operations are not limited to the specific details provided, including what hierarchies are to be constructed of rows that are to be moved and rows that are to be left behind, and how those hierarchies are to be constructed. Numerous other variations may be provided by embodiments.

Rows—Reorder and Restructure—Miscellaneous

The above description is illustrative only and is not intended to be in any way limiting. Various other embodiments are possible. For example, the representation of the hierarchical structure of the rows in memory, the ability to show/hide rows on the graphical user interface, and/or the restructuring behavior of the hierarchy in response to a row being dragged may vary across embodiments.

Standard editing operations such as cut, copy and paste may be performed on rows to edit the hierarchical structure. In one embodiment, cut, copy and paste operations, whether performed via a keyboard, a mouse, or user interface menus, only apply to selected rows in a manner analogous to the exemplary scenarios described in connection with FIGS. 8-10 above.

Rows—Hide/Show—FIGS. 11, 12

Various embodiments may provide means for expanding and collapsing a parent row whereby when expanded, the parent row and its child rows are displayed on a graphical user interface, and when collapsed, only the parent row is displayed on the graphical user interface and any child rows associated with the parent row are hidden.

In one embodiment of the present invention, one or more of the child rows associated with a parent row may be specially designated so that (a) when the parent row is in an expanded state, the parent row and all its children are displayed on the graphical user interface, and (b) when the parent row is in a collapsed state, the parent row and its specially designated children are visible on the graphical user interface, while any non-specially designated child rows of the parent row are hidden.

Figure 11A:
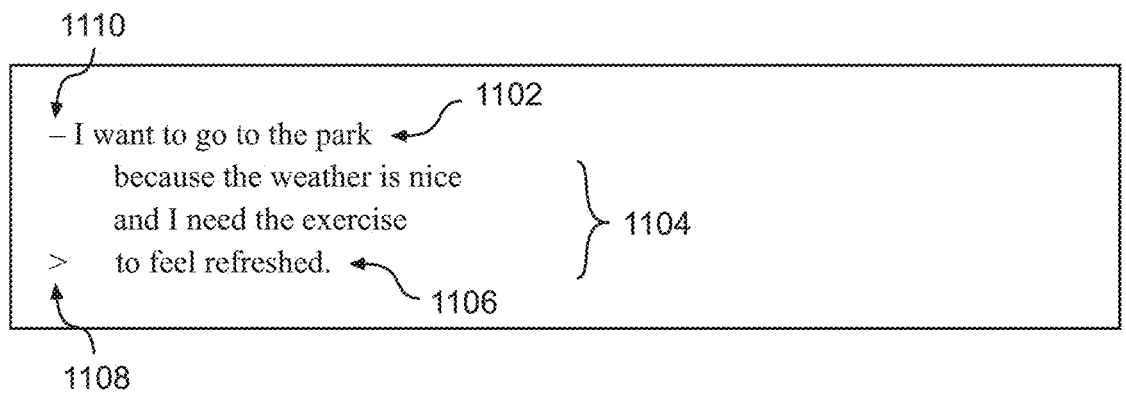
FIG. 11A-FIG. 11C illustrate a scenario wherein a child row remains visible on the graphical user interface even when its parent row is collapsed.

FIG. 11A illustrates an exemplary scenario in accordance with one embodiment. The parent row 1102 is in an expanded state, so that all its child rows 1104 are displayed on the graphical user interface. An icon 1110 to the left of the parent row 1102 indicates that the parent row is currently in the expanded state. One of the child rows 1106 of the parent row 1102 has been specially designated and an icon 1108 to the left of the specially designated child row 1106 indicates the row's special status.

Figure 11B:
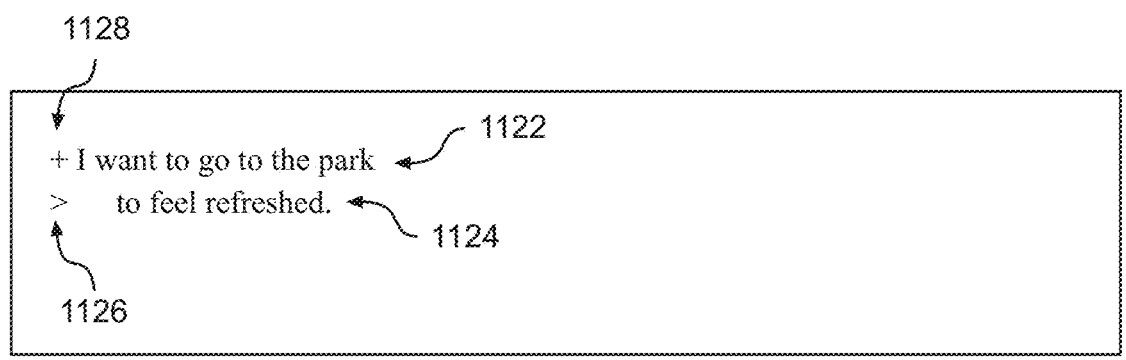

FIG. 11B is a continuation of the exemplary scenario of FIG. 11A. The parent row 1122 has been placed in a collapsed state. The icon 1128 to the left of the parent row 1122 is changed to indicate that the row 1122 is now in a collapsed state. Two of the child rows of the parent row are hidden, while the specially designated child row 1124 is still visible.

In the exemplary scenario of FIG. 11B, the last child row 1124 is displayed even when the parent row 1122 is in a collapsed state. The parent row 1122 may be expanded (e.g., by selecting the icon 1128 to its left) to show all the child rows 1104 (FIG. 11A) including any previously hidden ones.

In various embodiments, a plurality of child rows may be specially designated so that they remain visible even when their parent row is placed in a collapsed state. In one embodiment, any specially designated child rows need not be next to each other, or at the beginning or end of the list of child rows, or even at the same level in the hierarchy. In particular, in the exemplary scenario of FIGS. 11A, the specially designated child row 1106 does not have to be the last child of the parent row 1102.

In one embodiment, an algorithm for showing/hiding rows may proceed as follows: (1) mark the top-level rows (i.e., rows that do not have a parent on the graphical user interface) as visible; all the other rows are marked as not visible by default; (2) traverse the subtrees rooted at the top-level rows in turn, using a pre-order traversal for each subtree, and for each row in each traversal, do one of the following: (i) if the row is not marked as visible, do not show the row or any of its children; all its children will remain not visible by default; or (ii) if the row is marked as visible and is in an expanded state, show the row and all its children on the display (mark all its children as visible); or (iii) if the row is marked as visible and is in a collapsed state, show the row and any of its child rows that are specially designated (mark any specially designated child rows as visible).

Figure 11C:
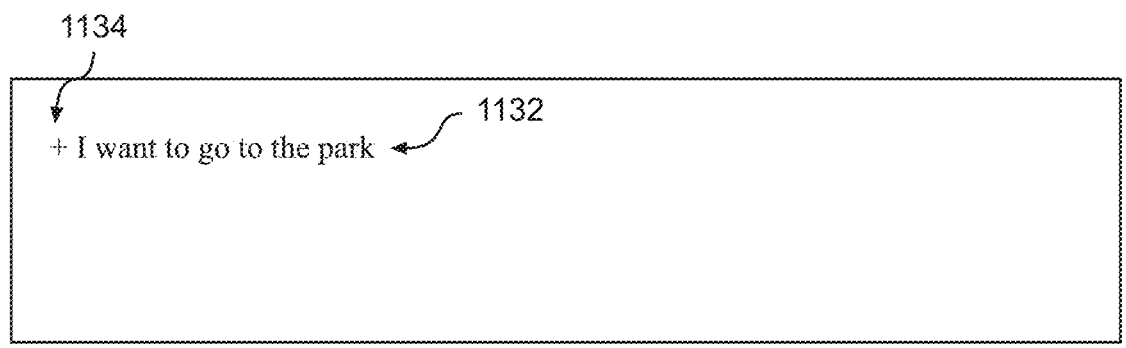

In various embodiments a parent row may have additional states other than the conventional expanded and collapsed states. In one embodiment, a parent row may be in any one of three states: (a) expanded, (b) semi-expanded or semi-collapsed, or (c) collapsed. When in expanded state, the parent row and all its child rows are displayed (FIG. 11A); when in semi-expanded state, the parent row and one or more of its child rows are displayed (FIG. 11B); when collapsed, the parent row is displayed, while all its child rows are hidden (FIG. 11C).

A user interface button or other means may be provided to enable a user to cycle through the various states of expansion of a parent row to show or hide its child rows as desired. In the exemplary embodiment of FIG. 11C, the user interface button for the states "collapsed" 1134 (FIG. 11C) and "semi-expanded" 1128 (FIG. 11B) are the same. In various embodiments, the icons corresponding to different expansion states may be similar or different. For example, in one embodiment, the icon for the collapsed state may be a "*", while the icon for a semi-expanded state may be a "+".

Various other embodiments are possible. The child rows associated with a parent row may be grouped so that a different subset of the child rows may be displayed, depending on the expansion state of the parent row. The parent row may be displayed in any one of several states rather than the two (i.e., expanded, collapsed) or three (i.e., expanded, semi-expanded, collapsed) states described above. In one embodiment various expansion states may be defined (e.g., by an end user or explicitly in program code), each corresponding to a different subset of the children of a parent row. When the parent row is in one of the defined states, the child rows in the corresponding subset are visible on the graphical user interface, and all of the other children of the parent row are hidden. The different subsets may or may not be overlapping. A child row may belong to a plurality of such groupings or subsets and may be displayed when the parent row is in any of the plurality of the corresponding states. The rows in each subset may be at various levels in the hierarchy in the subtree rooted at the parent row, so that when the parent row is collapsed, one or more of its descendants may still be visible.

Figure 12A:
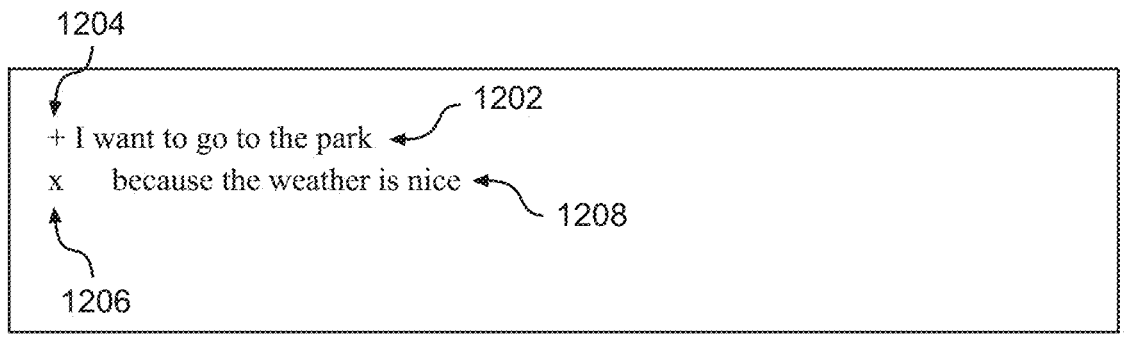
FIG. 12A-FIG. 12C illustrate a scenario wherein a plurality of expansion states are defined for a parent row, and one of a plurality of subsets of child rows is visible depending on the expansion state of the parent row.

FIG. 12 illustrates an exemplary scenario in accordance with one embodiment. The child rows 1104 (FIG. 11A) of the parent row 1102 are grouped into different subsets. In FIG. 12A, the parent row 1202 is in one of a plurality of defined collapsed states. The icon 1204 on the left of the parent row 1202 indicates that the parent row 1202 is in one of a plurality of defined collapsed states. Of the child rows 1104 (FIG. 11A) of the parent row 1102, only the first one is visible 1208. An icon 1206 to the left of the child row 1208 indicates the expansion group or subset to which the child row belongs.

Figure 12B:
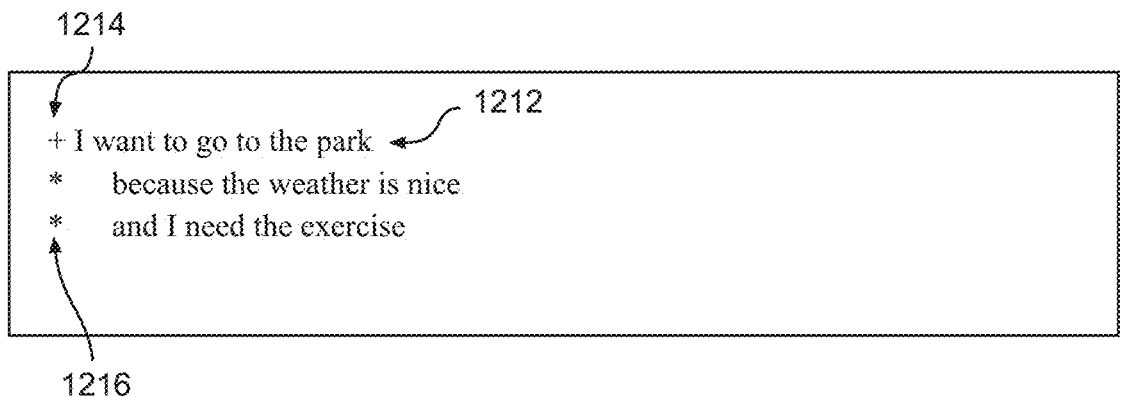

FIG. 12B illustrates another of the plurality of defined collapsed states in accordance with one embodiment. In FIG. 12B, the parent row 1212 is in one of the plurality of defined collapsed states, with the icon 1214 to the left of the parent row 1212 indicating the state accordingly. Two of the child rows 1104 (FIG. 11A) of the parent row 1102 are visible. Icons 1216 to the left of the visible child rows indicate the expansion group or subset to which the visible child rows belong.

Figure 12C:
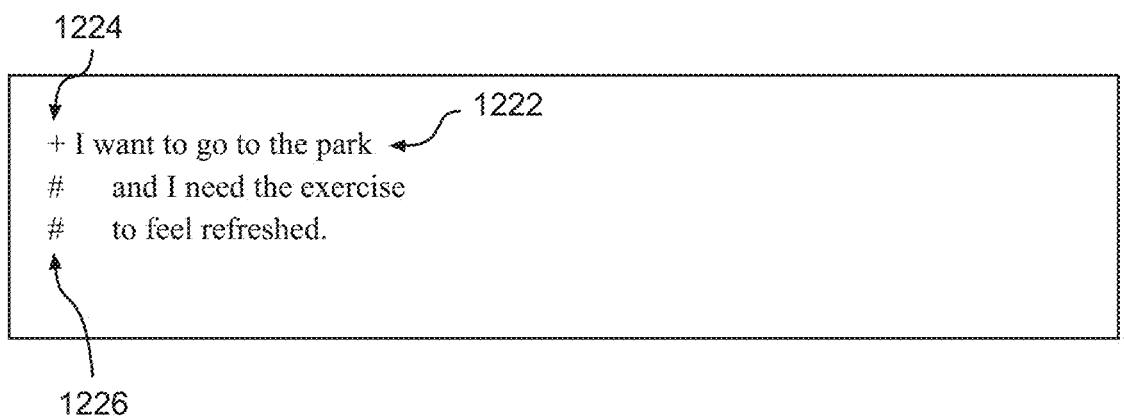

FIG. 12C illustrates another of the plurality of defined collapsed states in accordance with one embodiment. In FIG. 12C, the parent row 1222 is in a collapsed state 1224, and two of its children are still visible on the display. Icons 1226 to the left of the visible child rows indicate the group or subset to which the visible child rows belong.

In various embodiments, rows may be specially designated via user interface operations such as selecting an appropriate menu button, or pressing a plurality of appropriate keys on a keyboard. In one embodiment, multiple rows may be selected (e.g., via a drag operation), and then specially designated (e.g., via the selection of an appropriate menu button). Additional parameters, such as the cycling order of groups of specially designated rows, may be specified via appropriate dialog boxes. It is to be understood that these are only a few exemplary approaches, and are not to be construed as limiting the scope of the present inventions in any way. Many other approaches are possible and readily suggest themselves to such skilled persons having the benefit of this disclosure, in light of what is known in the relevant arts.

In various embodiments, a specially designated child row may be a parent row in its own right. When a specially designated child row is visible (e.g., when its parent row is in a semi-expanded state), an expand/collapse icon associated with the specially designated child row may be operable to show/hide the specially designated child row's children, respectively. In one embodiment, a specially designated child row may be expanded to show its children regardless of whether or not its parent row is fully expanded. In another embodiment, a specially designated child row may be expanded only when its parent row is fully expanded.

As can be seen in FIGS. 11, 12, the ability to have certain specially designated child rows visible when their parent row is collapsed, may provide a useful means of displaying various kinds of summary views of the content under a parent row (i.e., the content of the subtree rooted at the parent row).

In the interest of clarity, FIGS. 11, 12 do not explicitly show cells on any of the rows. It is to be understood that this is for illustration purposes only and is not to be construed as limiting in any way. In various embodiments, a row may have a plurality of cells. In various other embodiments, a row may not include a concept of a cell at all, and may be considered simply as one contiguous area where information or data may be displayed.

Columns—FIG. 13

In the interest of clarity, the operations described above and elsewhere in this disclosure are presented in terms of operations performed on rows. This is not to be construed as limiting in any way as to the scope of the inventions presented herein. Analogous operations are possible with respect to columns and readily suggest themselves to such skilled persons having the benefit of this disclosure, in light of what is known in the relevant arts. In particular, embodiments may provide analogous operations for moving, copying or deleting one or more columns.

Figure 13A:
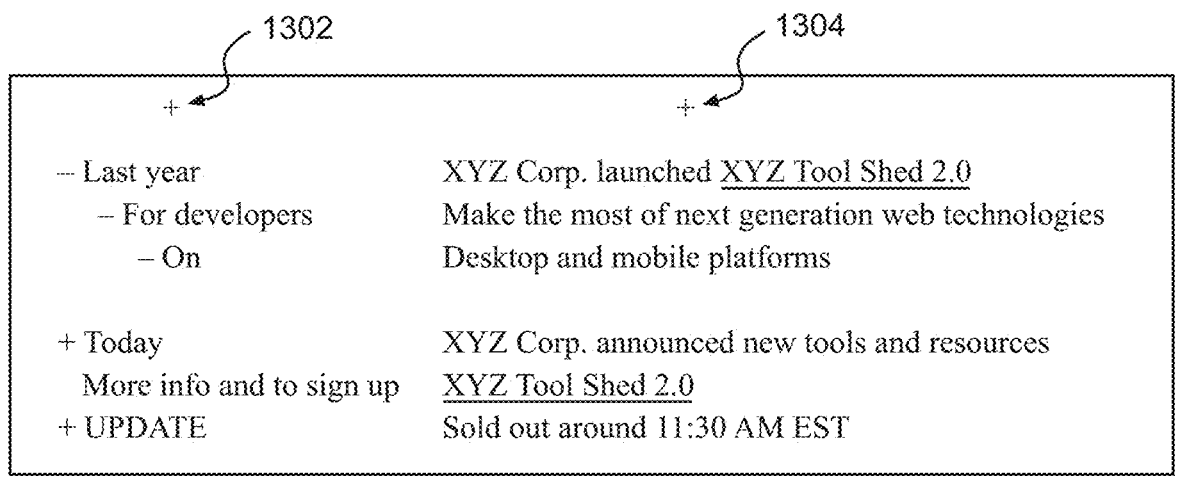
FIG. 13A and FIG. 13B illustrate a scenario wherein columns in a grid form a hierarchy.

In various embodiments, columns may be organized hierarchically. FIG. 13A illustrates an exemplary scenario in accordance with one embodiment. A structured document is displayed on a graphical user interface with two columns and multiple rows, wherein the rows and the columns are organized hierarchically. An icon 1302, 1304 associated with each of the columns indicates that the columns have children that are currently hidden.

In a manner analogous to showing/hiding of rows, child columns of a parent column may be shown/hidden on a graphical user interface in response to appropriate user commands (e.g., clicking on a designated icon such as the +/−icons in FIG. 13A).

Figure 13B:
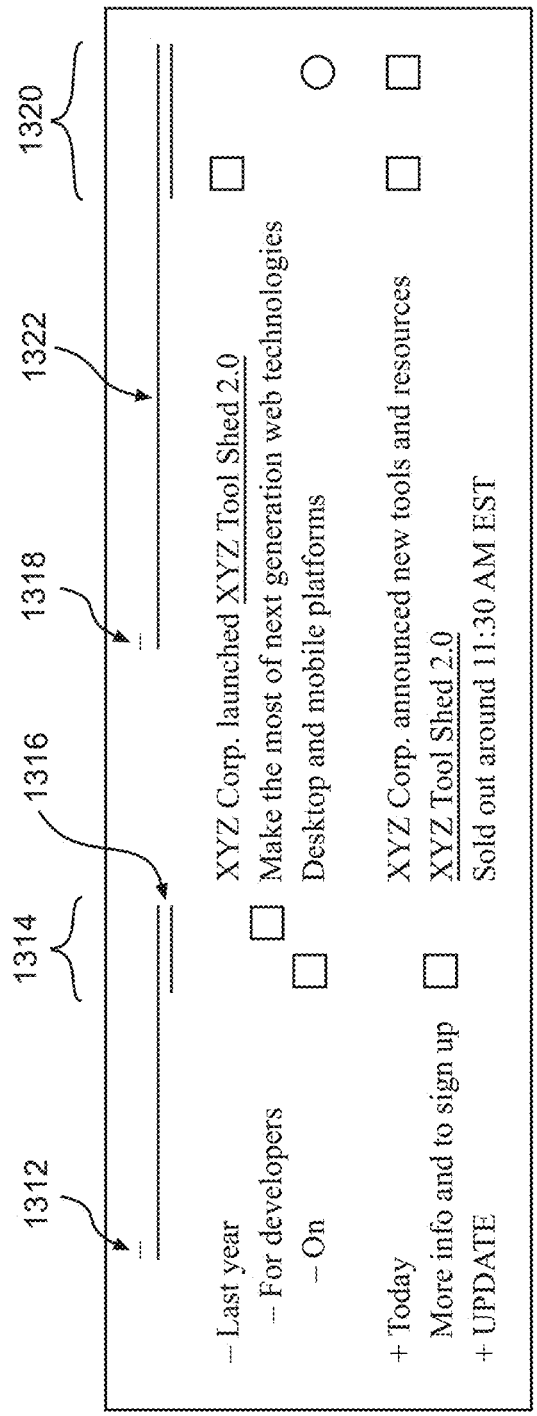

FIG. 13B illustrates an exemplary scenario in accordance with one embodiment wherein both parent columns in FIG. 13A have been expanded to show their child columns. The icons 1302, 1304 (FIG. 13A) associated with the columns have changed 1312, 1318 to indicate that the columns are in expanded state. The child columns 1314, 1320 are now visible on the graphical user interface. Additional icons, graphics, or objects 1316, 1322 are displayed to provide visual indication of the hierarchical relationships among the columns. In the exemplary embodiment of FIG. 13B, the visual indicators of hierarchy among columns 1316, 1322 are different from the visual indicators of hierarchy among rows. In particular, simple indentation is used as a visual indicator of hierarchy among rows, but not among columns.

In one embodiment, one or more child columns may be specially designated in a manner analogous to the row designations described in connection with FIGS. 11, 12. Collapsing a parent column would result in the specially designated child columns to remain visible, and the other child columns to be hidden, on the graphical user interface.

In one embodiment, columns may be selected and moved in a manner analogous to the row operations described in connection with FIGS. 6-10. In response, the parent-child relationships among columns may be modified in a manner analogous to the exemplary scenarios described above in connection with row operations.

The column operations described above are analogous to row operations described herein and in the patent application Ser. No. 14/492,034, and readily suggest themselves to such skilled persons having the benefit of these disclosures, in light of what is known in the relevant arts. Embodiments may provide for columns any combination of operations analogous to those described with respect to rows in the disclosures of these applications.

In various embodiments, the present invention comprises a combination of the above-described methods, apparatus and means, together with none, or a plurality of other methods, apparatus and means described elsewhere in the present disclosure and in the patent application Ser. No. 14/492,034. Many other combinations are possible and readily suggest themselves to such skilled persons having the benefit of this disclosure, in light of what is known in the relevant arts.

Span—FIG. 14

An embodiment containing a grid, table or tree widget may provide a means for a cell to span a plurality of columns and/or rows on a graphical user interface. A cell having a span greater than 1 column×1 row may be referred to as a spanning cell. A cell that spans one column by one row may be referred to as a regular cell.

Figure 14A:
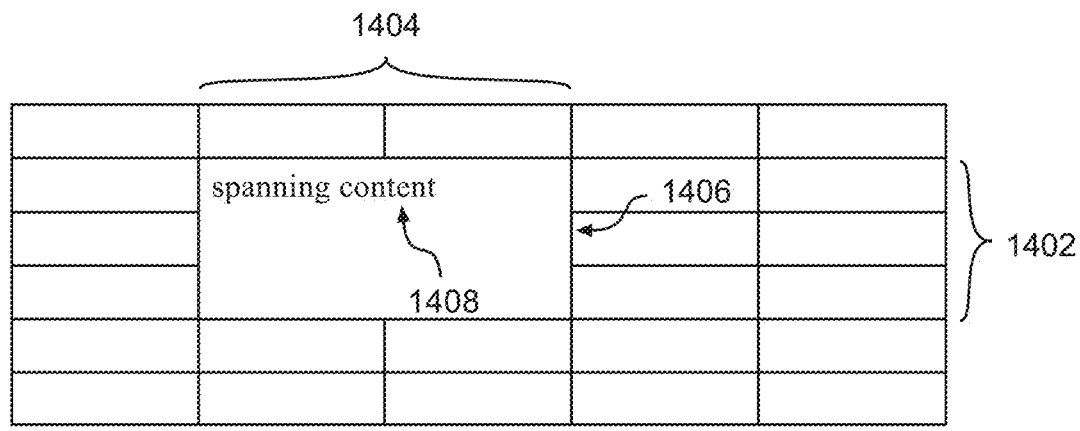
FIG. 14A-FIG. 14C illustrate a scenario wherein a spanning cell is moved to another location on a grid.

FIG. 14A illustrates an exemplary scenario in accordance with one embodiment wherein a cell 1406 spans two columns 1404 and three rows 1402, thereby covering an area that would otherwise display 6 regular cells (2 columns×3 rows). In the exemplary scenario of FIG. 14A, the spanning cell 1406 contains a sequence of characters 1408 that is too long to be displayed fully in a regular cell.

In various embodiments, assigning a span larger than 1 column×1 row may result in the cell being visually expanded to the right and downward as necessary. In one embodiment, the neighboring cells that are hidden by the spanning cell extending to the right and below, essentially go out of existence, and are replaced by the spanning cell taking their place on the graphical user interface.

In various embodiments, assigning a span to a regular cell does not result in one or more of its neighboring cells being eliminated. Rather, any neighboring cells covered by the spanning cell remain in existence, and are simply hidden from view.

In various embodiments, a spanning cell 1406 may be collapsed to expose the cells hidden underneath it. In one embodiment, the cells underneath an expanded spanning cell 1406 may hold information and may be edited. In the exemplary scenario of FIG. 14B, the spanning cell 1406 (FIG. 14A) has been collapsed to take up an area of the display corresponding to a single regular cell 1424, thereby exposing its neighboring cells that would otherwise be hidden underneath it. The text of the collapsed cell 1424 is clipped at the cell boundary.

In the exemplary embodiment of FIGS. 14A, B, collapsing and expanding a spanning cell 1406, 1424 may be accomplished by means of selecting the cell and then selecting an appropriate menu or button on the display. The operation may be initiated in other ways, including keyboard shortcuts or via clicking on a designated icon or area on or near the cell. The latter is analogous to the conventional approach of providing an icon next to a parent row in a tree widget to enable a user to expand/collapse the parent row to show/hide its children.

Span—Move—FIG. 14

Figure 14B:
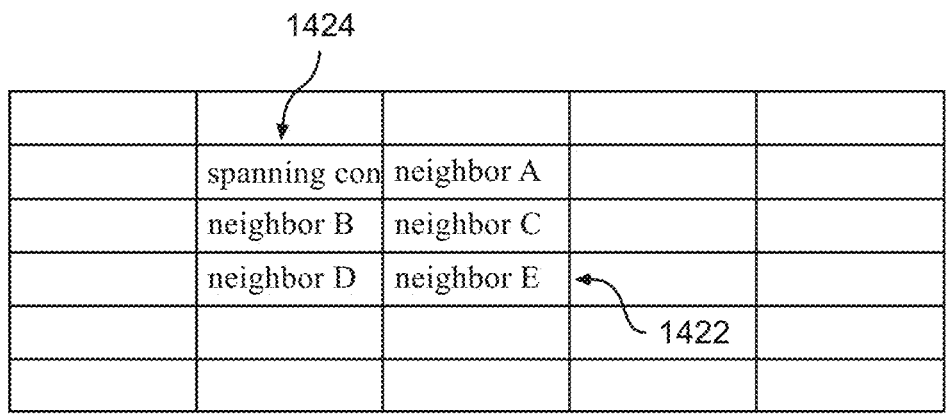
Figure 14C:
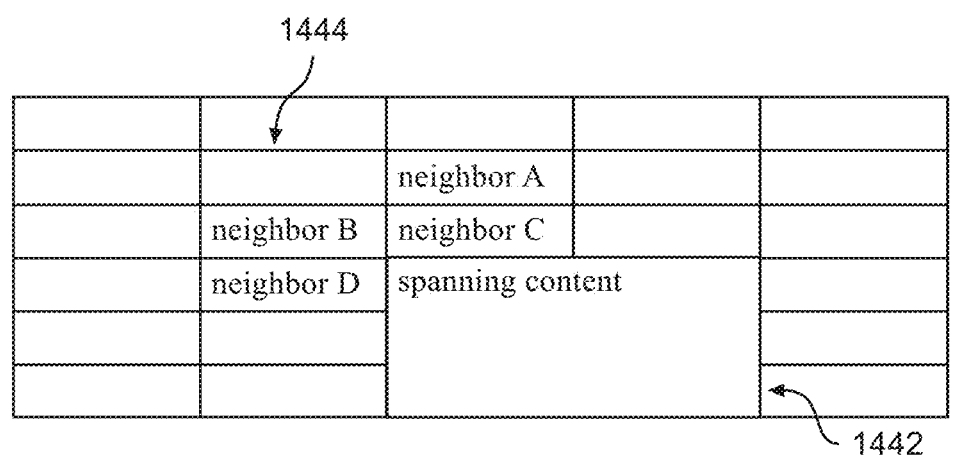

In one embodiment, moving a spanning cell 1406 from one location to another would also move the span information along with the cell's data. FIG. 14C illustrates an exemplary scenario whereby a spanning cell 1406 (FIG. 14A) has been dragged and dropped on another cell 1422 (FIG. 14B). In response, the spanning cell 1406 has been moved 1442 and has replaced the target cell 1422. As a result of the move, the cells that, prior to the operation, were hidden underneath the spanning cell 1406 have become exposed, and a plurality of cells to the right and below the new location of the spanning cell 1422 are now hidden underneath it 1442.

In the exemplary scenario of FIG. 14C, the cell 1444 at the location of the spanning cell 1442 prior to the operation, has a regular or default span (i.e., 1 column×1 row) after the operation. The cell 1422 (FIG. 14B) that was the target of the drop and had a regular or default span prior to the operation, now has the span of the dragged cell 1406 (FIG. 14A).

In various embodiments, a cell that is being dragged may be in expanded or collapsed state. Once dropped on a target area, the cell may be shown in expanded or collapsed state to match its original state prior to the drag operation. Alternatively, the cell may be expanded upon drop to provide visual feedback of its span.

Span—z-order—FIG. 14

In various embodiments, a spanning cell, i.e., a cell with a span larger than 1 column by 1 row, may overlap one or more of its neighboring cells. In various scenarios, a plurality of cells may have spans larger than 1 column×1 row, raising the possibility of spanning cells partially obscuring one another. To determine which cell obscures another, embodiments may implement various strategies for organizing the z-order of the cells in a grid.

In one exemplary embodiment, the z-order is based on a row-major traversal of the non-empty cells in a grid. FIG. 14B illustrates an exemplary scenario in such an embodiment. Of the six non-empty cells, the first cell 1424 in a row-major traversal has a span that is greater than 1 column×1 row. However, due to the existence of non-empty neighboring cells, the spanning cell 1424 is displayed as taking up the area of a single regular cell. In a row-major traversal of non-empty cells, the spanning cell 1424 is the first, and therefore the lowest, cell in the z-order. The spanning cell 1424 therefore appears underneath the other cells, i.e., the non-empty neighbors of the cell 1424 occlude portions of the cell 1424 that extend beyond the area of a regular cell.

Continuing with the discussion of z-order, FIG. 14C illustrates a scenario wherein the spanning cell 1424 has been moved to another location 1422. As a result, the old location of the spanning cell is now empty 1444, and the spanning cell 1442 appears in its new location. Since the cells to the right and below the target cell 1422 (FIG. 14B) are empty, after the move operation, the spanning cell 1442 is displayed as taking up an area specified by its span. In the illustrative scenario of FIG. 14C, the spanning cell 1442 is at the top of the z-order, i.e., it is the last of the non-empty cells in a row-major traversal. As a result, no other cell hides any area of the spanning cell 1442 from view.

Returning to the scenario of FIG. 14B, the spanning cell 1424 is displayed so as to not overlap any of its neighboring cells to the right and/or below it. In one embodiment, a user may issue a command to bring the spanning cell 1424 to the top of the z-order to make the cell 1424 fully visible 1406 (FIG. 14A) on the display. The command may be in the form of expanding the spanning cell 1424, 1406 as described above. Alternatively, in one embodiment the act of selecting a cell 1424 (e.g., by clicking on it) may serve to bring it to the top 1406. The cell 1406 may be returned to its proper position in the z-order 1424 by collapsing the cell, or by unselecting it (e.g., by selecting another cell).

It is to be understood that the use of row-major traversal for determining the z-order of cells in connection with FIGS. 14A-C is for illustrative purposes and not to be construed as limiting. Many other approaches are possible. In one embodiment, the z-order is determined based on a column-major traversal of the cells. In one embodiment, the z-order is determined by the order in which the cells are edited, with the most recently edited cell appearing above the rest. In one embodiment, means are provided for a user to change the z-order of individual cells, such as bringing a cell to the top or sending it to the bottom of the z-order, or making one cell to appear specifically above another in the z-order. These and many other variations are possible individually, or in combination, and readily suggest themselves to those practiced in the relevant arts.

Span—Specification—FIG. 15

In various embodiments a cell's span may be specified by the number of columns and rows that constitute the extent of the span; for example, a span of two columns and three rows may mean that the cell covers an area consisting of the intersection of two columns and three rows, covering six regular cells (i.e., 2 columns×3 rows). Such spans may be referred to as basic spans.

In various embodiments, a cell's span may be specified with respect to another quantity, e.g., the number of columns from the right edge of the grid that should not be included in the span. Such spans may be referred to as relative spans. In one embodiment, the column extent of a span may be specified as −1, meaning that the spanning cell extends all the way to the last column of the grid, excluding the very last column. A column span of −n may mean that the spanning cell extends all the way to the right edge of the grid minus n columns from the right.

Figure 15A:
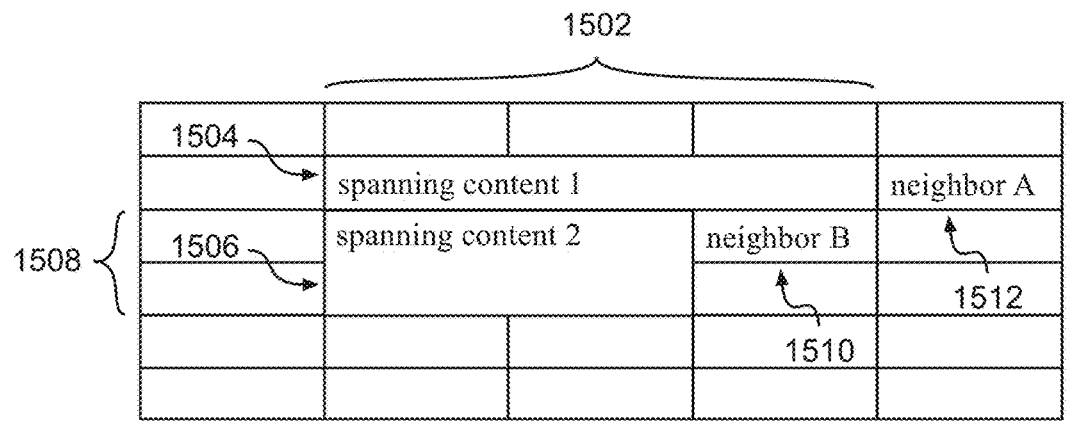
FIG. 15A-FIG. 15D illustrate the behavior of different types of span in response to edit operations.

FIG. 15A illustrates an exemplary scenario in accordance with one embodiment. A cell 1504 is located at the second column of the second row and has a row span of 1 and a column span of 3 1502; i.e., the cell 1504 has a span of 3 columns×1 row. Another cell 1506 is located at the second column of the third row and has a row span of 2 1508 and a column span of −2, i.e., the cell 1506 extends all the way to the right edge of the grid, minus 2 columns. In the exemplary scenario of FIG. 15A, the cell 1506 spans the second and third columns of the grid. Two cells 1512, 1510 adjacent to the spanning cells 1504, 1506 contain some data.

Figure 15B:
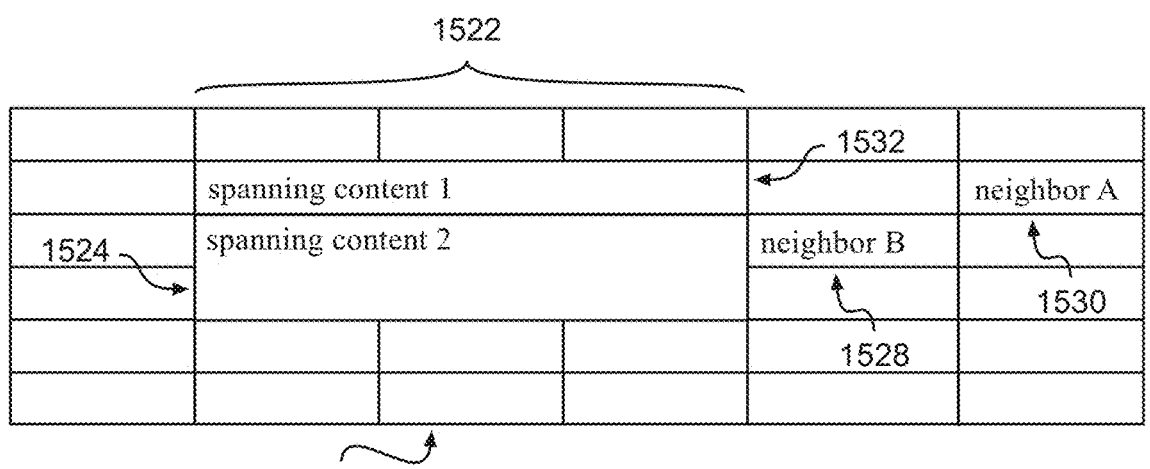

FIG. 15B illustrates a continuation of the above scenario. In response to a user command, a new column 1526 has been inserted into the grid. The two cells 1510, 1512 (FIG. 15A) that were to the right of where the new column 1526 has been inserted, have been shifted to the right by one column 1528, 1530. The two spanning cells 1504, 1506 that, prior to the operation, were to the left of where the new column 1526 has been inserted, i.e., their top-left corners were in the second column, have not shifted to the right after the operation 1532, 1524.

In the exemplary embodiment of FIG. 15B, the insertion of a column 1526 has not changed the span parameters of the cells. The spanning cell 1504 had a span of 3 columns×1 row prior to the operation, and still has the same span 1522 after the operation 1532. After the operation, the cell 1532 spans the second, third and fourth columns. However since its previous neighbor 1512 has been shifted to the right 1530, the two cells 1532, 1530 are no longer adjacent.

The spanning cell 1506 had a span of −2 columns×2 rows before the operation. After the operation, the cell 1506 still extends to the right edge of the grid minus two columns 1524, which means that, after the insertion operation, the cell 1524 spans the second, third and fourth columns. As a result, the cell 1524 is still adjacent to its previous neighbor 1528 even though its previous neighbor 1510 has been shifted to the right 1528 by one column.

Figure 15C:
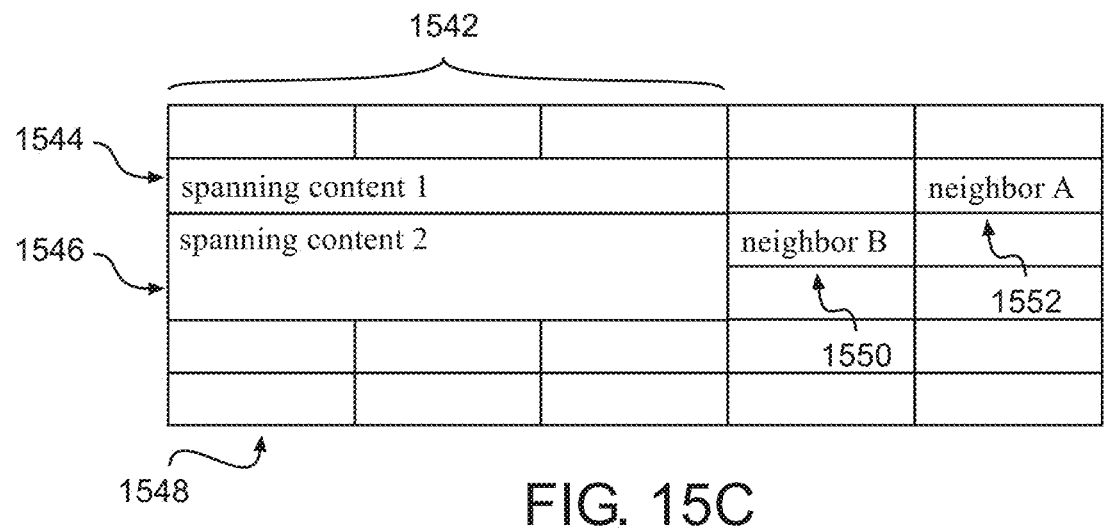

Returning to the exemplary embodiment of FIG. 15A, in another exemplary scenario, the cells 1504, 1506 may be moved to another column 1548 (FIG. 15C). In one embodiment, a user may initiate the move operation by dragging the cells 1504, 1506 and dropping them on another column, e.g., on the first column 1548.

FIG. 15C illustrates the result in accordance with one embodiment. The cells 1504, 1506 have been moved 1544, 1546 to the first column. The cell 1504 continues to have a column span of three 1544, and now spans the first, second and third columns 1542. The cell 1506 continues to have a column span that extends all the way to the right edge of the grid minus 2 columns 1546. As a result of the move operation, the cell 1504 has been shifted one column to the left 1544 and is no longer adjacent to its former neighbor 1552. The cell 1546 however remains adjacent to its neighbor 1550 despite having been moved to the left.

Figure 15D:
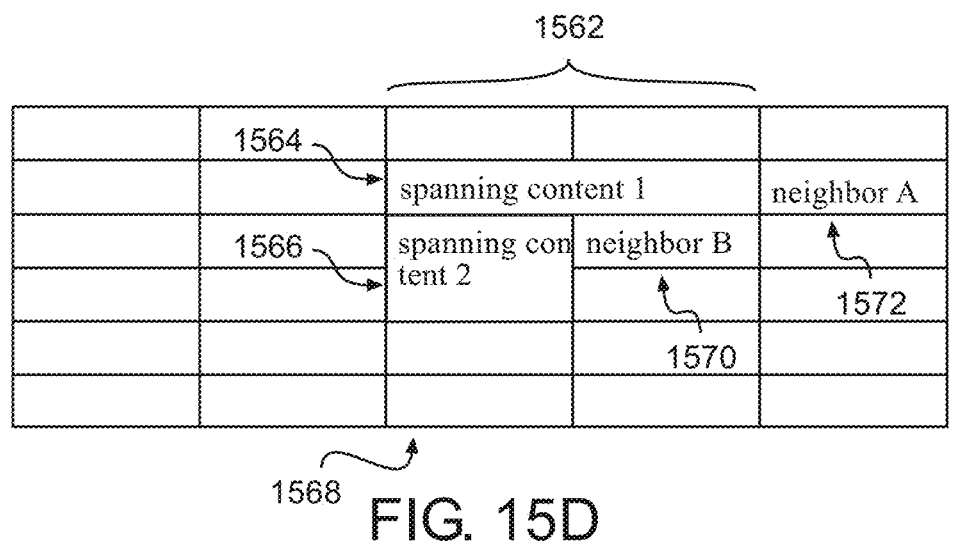

In another exemplary scenario, the cells 1504, 1506 (FIG. 15A) are moved to the right 1568 (FIG. 15D). In the illustrative embodiment of FIG. 15D, the cell 1504 continues to have a column span of three, but is visually represented as taking up two columns only 1562 since its neighbor 1572 has a higher z-order in a row-major traversal. The cell 1506 continues to have a column span that extends to the right edge of the grid minus 2 columns 1566, and hence is displayed as taking up only one column on the display. The content of the cell 1566 has been wrapped at the visible boundary of the cell. In the exemplary embodiment of FIG. 15D, the cell 1566 is not blocked by its neighbor 1570 due to any z-order consideration. Rather, the cell 1566 is being displayed as specified by its column span.

In one embodiment, an algorithm for the computation of cell dimensions for display on a graphical user interface may proceed as follows: (1) For each non-empty cell in the grid compute the dimensions of the cell based on its span. (2) Traverse the non-empty cells in the grid according to a row-major traversal and compute the z-order of the cells. (3) Use the z-order to compute the portion of each cell that should be visible on the display in a manner common in graphical user interface systems.

In a grid where rows may form hierarchies, the above algorithm may be modified to consider only those rows that are visible on the graphical user interface. In a grid where columns may form hierarchies, the above algorithm may be modified in an analogous manner to exclude hidden columns from consideration. In a grid where both rows and columns form hierarchies, the above algorithm may be modified in an analogous manner.

In one embodiment, if a row is not visible due to a plurality of its ancestors being in a collapsed state, the row is not included in the processing in the above algorithm, and all the cells of the row are hidden, regardless of span.

Embodiments may implement variations of the above algorithm. In one embodiment, step 1 of the above algorithm may consider cells that are either non-empty, or empty but with a span other than 1 column×1 row. In one embodiment, step 2 of the algorithm traverses the cells in a column-major, or other, order. Many other variations are possible and readily suggest themselves to such skilled persons having the benefit of this disclosure, in light of what is known in the relevant arts.

The discussion in connection with FIGS. 15A-D involved relative spans defined in terms of the right edge of the grid, e.g., a column span of −n, where n is the number of columns from the right edge of the grid that are to be excluded. It is to be understood that this is not the only way to express relative spans with respect to the grid. Many other approaches are possible. In one embodiment, a relative span may be specified with respect to a plurality of specific rows and/or columns. For example, a relative span may be specified as having a specific column as its rightmost column, or a specific row as its bottommost row.

A relative span defined with respect to a grid (e.g., a column span extending to the second-to-last column of the grid) may provide a structured document with a more uniform visual organization. Such a span can be used to provide a somewhat uniform line length stretching to the right edge of the page similar to a conventional text document. A relative span may also be used to provide a uniform right margin on a structured page.

Relative spans may reduce the need to readjust spans subsequent to edit operations such as moving a cell, in order to maintain a desired layout on the page. In the exemplary scenarios of FIGS. 15A-D editing a cell with a basic type of span 1504 may move the cell 1544 away from its neighbor 1552, which would necessitate adjusting the span in order to make the cell 1544 be adjacent to its previous neighbor 1552 once again. A relative type of span 1506 may alleviate much of the need for such adjustments since moving a cell 1546 may not result in moving it away from its neighbor 1550. Editing cells with relative spans (e.g., drag and drop operations on such cells) may alleviate the need to adjust the span of the cell subsequent to every edit operation in order to maintain a desired layout on the page.

Span—Inheritance—FIG. 16

Figure 16A:
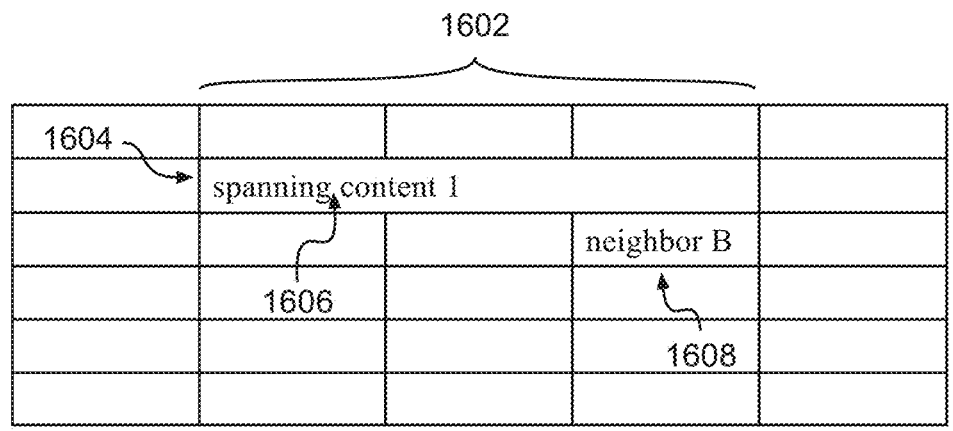
FIG. 16A-FIG. 16C illustrate scenarios wherein editing operations result in a cell inheriting the span of another cell.

In various embodiments a cell may acquire or inherit or be assigned a span that is the same as, or derived from, the span of another cell. FIG. 16A illustrates an exemplary scenario in accordance with one embodiment. A cell 1604 spans three columns 1602. A user places a cursor somewhere 1606 on the content of the cell 1604 and issues a command to split the content of the cell 1604 at that point 1606. The command may be issued by pressing one or more keys on a keyboard (e.g., by simultaneously pressing CTRL and ENTER), or may be issues via other means such as a menu or user interface button.

Figure 16B:
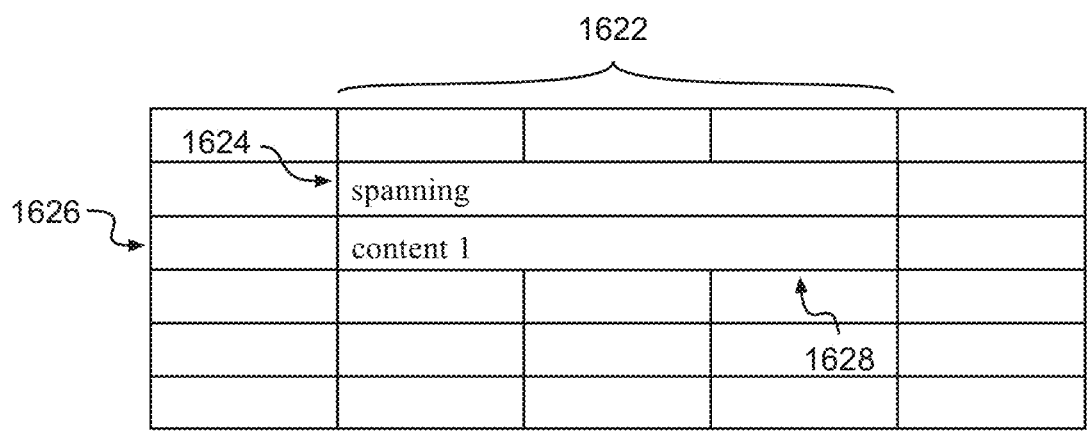

FIG. 16B illustrates the result in accordance with one embodiment. On the row 1626 below the source cell 1604, a target cell 1628 now has a span similar to that of the source cell 1624. The content of the source cell 1604 has been split at the location of the cursor 1606 prior to the operation and the text to the right of the cursor 1606 has been placed in the target cell 1628. The source cell 1604 contains, after the operation 1624, the part of the text that was to the left of the cursor 1606. The target cell 1628 is assigned the same span 1622 as the source cell 1624.

Figure 16C:
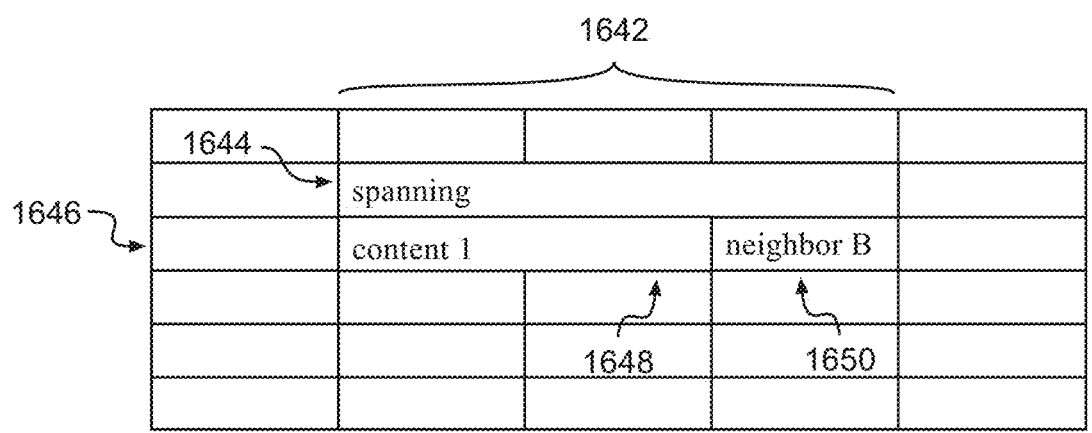

In the exemplary embodiment of FIG. 16B, the spanning cell 1628 hides other cells occupying the same region of the grid 1608 as the spanning cell 1628. Other embodiments may adopt different policies. FIG. 16C illustrates the result of the edit operation described in connection with FIG. 16A in accordance with one embodiment. In the exemplary embodiment of FIG. 16C, the target cell 1648 has the same span as the source cell 1644. However, the target cell 1648 is displayed covering a smaller area than its span of three columns 1642 would suggest, so as to not hide a neighboring cell 1650 that contains data. Alternatively, in one embodiment, the target cell 1648 may not inherit the same span as the source cell 1644, but may be assigned a span that is based on the span of the source cell 1644, but modified according to the conditions on the grid, such as the existence of a non-empty cell 1650 to its right. Other approaches or rules for assigning spans are possible. Other embodiments of the present inventions will readily suggest themselves to such skilled persons having the benefit of this disclosure, in light of what is known in the relevant arts.

The exemplary embodiments discussed in connection with FIGS. 16A-16C describe scenarios wherein as a result of a user command, the content of a cell is split between the cell and another cell immediately below it. Many other scenarios are possible, including those described in the patent application Ser. No. 14/492,034. In various embodiments, as a result of a command, a plurality of rows may be inserted below or above the cell 1604, or a plurality of columns may be inserted next to the cell 1604, or no row or column may be inserted. The content of the cell 1604 may be split between the cell 1604 and one or more cells immediately below it, or to its left or right, or above it, or at the beginning of the row below it, etc. In each of those scenarios, embodiments may provide means wherein the span of a cell 1604 prior to an operation may affect the span of one or more cells after the operation.

Span—Resize—FIG. 17

In various embodiments, a cell's span may be modified via user interface operations such as drag and drop. FIG. 17A illustrates an exemplary scenario in accordance with one embodiment. Initially every cell is displayed on the graphical user interface with the default span of one column by one row. To change the span of one of the cells, a user drags the bottom right corner of the cell 1702, e.g., with a mouse or other pointing device.

FIG. 17B illustrates the drag operation in progress. While the bottom right corner of the cell is being dragged, the cell 1704 is displayed above the other cells, occluding some of its neighbors. As a result, more of the cell's content is visible 1706. In the illustrative embodiment of FIG. 17B, the cell's boundary is displayed with a special border, to provide visual feedback to the user.

Figures 17C, 17D:
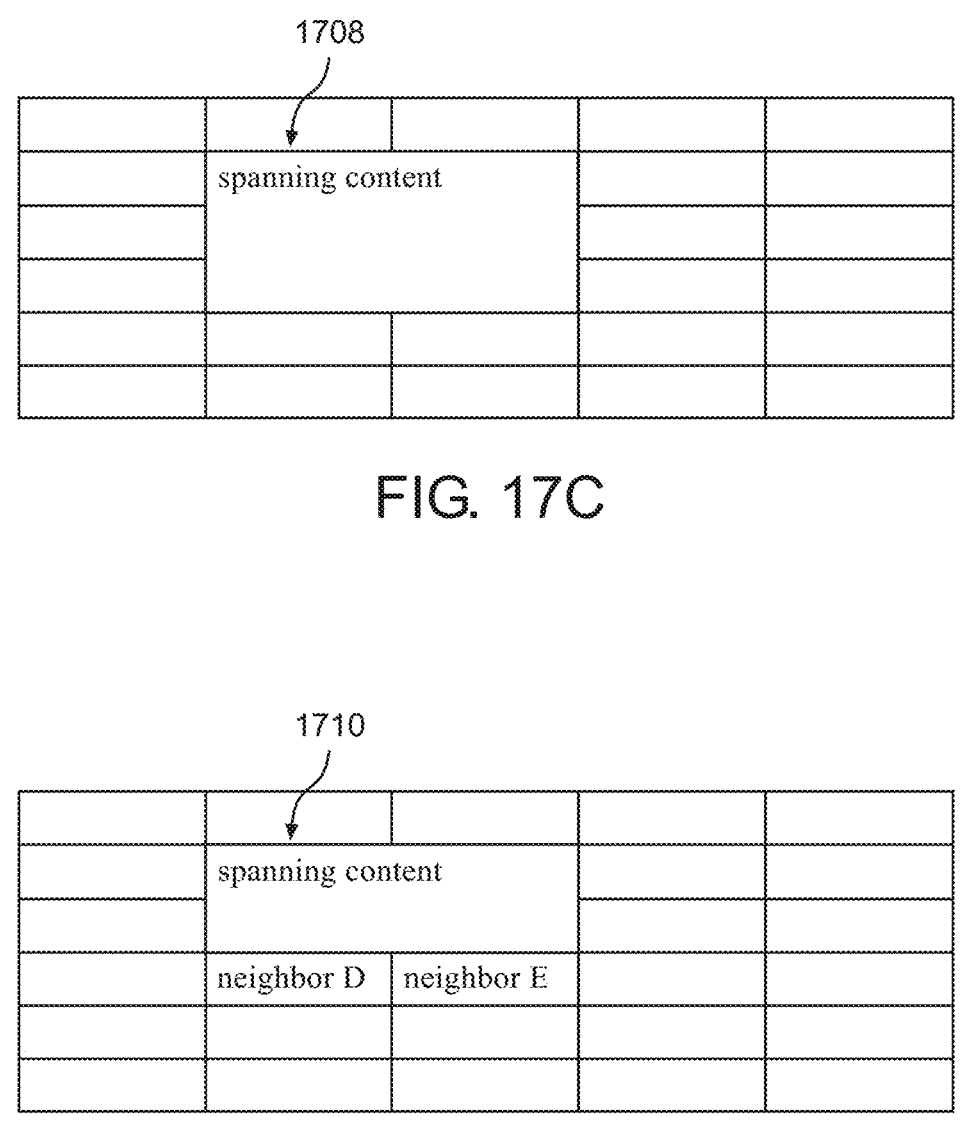

In this exemplary scenario, the user performs a drop at this point, e.g., by releasing the left mouse button. FIG. 17C illustrates the result in accordance with one embodiment. The cell's span has been updated and the cell is displayed covering an area equal to the intersection of two columns and three rows. In the exemplary scenario of FIG. 17C, the cell 1708 is displayed above the other cells in the grid to provide visual feedback of the updated span.

Following a drop command (e.g., releasing the left mouse button) a new span value is calculated based on the position of the mouse pointer with respect to the grid lines. In the exemplary scenario of FIG. 17C, the calculated span is the smallest span that includes the position of the mouse pointer at the time of the drop.

Many other approaches are possible. FIG. 17D illustrates the result of performing the same drag and drop operation in accordance with another embodiment. Here, the new span value of the cell 1710 is determined to be two columns by two rows. In the exemplary scenario of FIG. 17D, the span value is calculated based on the proximity of the position of the mouse pointer to the grid lines at the time of the drop. At the time of the drop (FIG. 17B), the mouse pointer was horizontally closer to the right edge of the third column, and vertically closer to the top edge of the fourth row. As a result, the span is updated accordingly. In the exemplary scenario of FIG. 17D, the cell 1710 is displayed above the other cells in the grid to provide visual feedback of the updated span.

In various embodiments, a cell's size as displayed on a graphical user interface may not match its span parameters. Displaying a cell with dimensions that do not match its span may be referred to as overriding the cell's span.

Figure 17E:
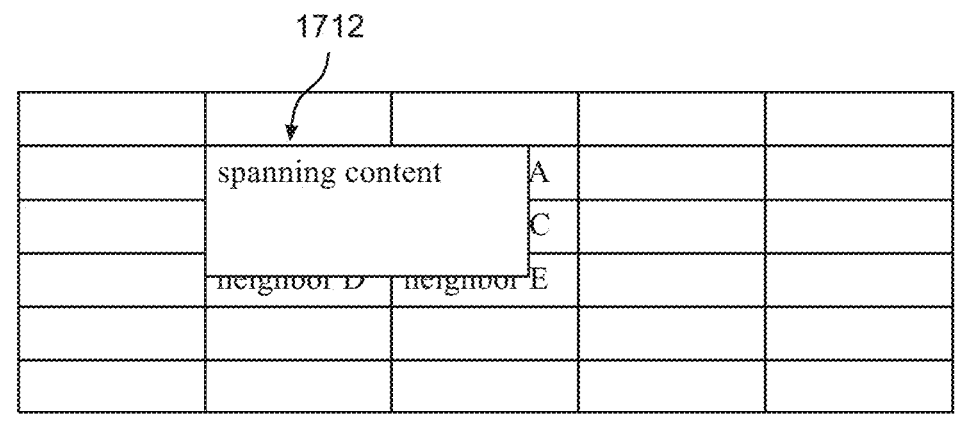

FIG. 17E illustrates an exemplary scenario in accordance with one embodiment. The user has performed a drag and drop operation as described in connection with FIGS. 17A, B. However, at the time of the drop, the user has instructed the system to display the cell 1712 with current dimensions at the time of the drop, thereby overriding the cell's span in computing the dimensions of the cell 1712 for display. As a result, the cell 1712 is displayed with dimensions that do not match its span parameters. The cell's boundary is drawn in solid lines to indicate that the drag process has been completed. In the exemplary scenario of FIG. 17E, the cell 1712 is displayed above the other cells in the grid.

In one embodiment, overriding a cell's span may cause the cell to be displayed above the others, as long as the override is in effect. The user may instruct the system at a later time to display the cell in accordance with its span parameters. In one embodiment, once the cell's span is no longer being overridden, the cell is displayed in the proper z-order, as described in connection with FIG. 14 above.

In various embodiments, the command to override a cell's span may be issued by pressing a specially designated key on the keyboard at the time of the drop. Alternatively, the system may be placed in a special state or mode of operation, via a menu or other command, prior to the drag and drop operation. In one embodiment, the user is prompted at the time of the drop to select among the various means of computing a new span, via a dialog box. Many other alternatives are possible and will readily suggest themselves to such skilled persons having the benefit of this disclosure, in light of what is known in the relevant arts.

Span—Resize—Multiple Cells in Same Column—FIG. 18

Figures 18A, 18B:
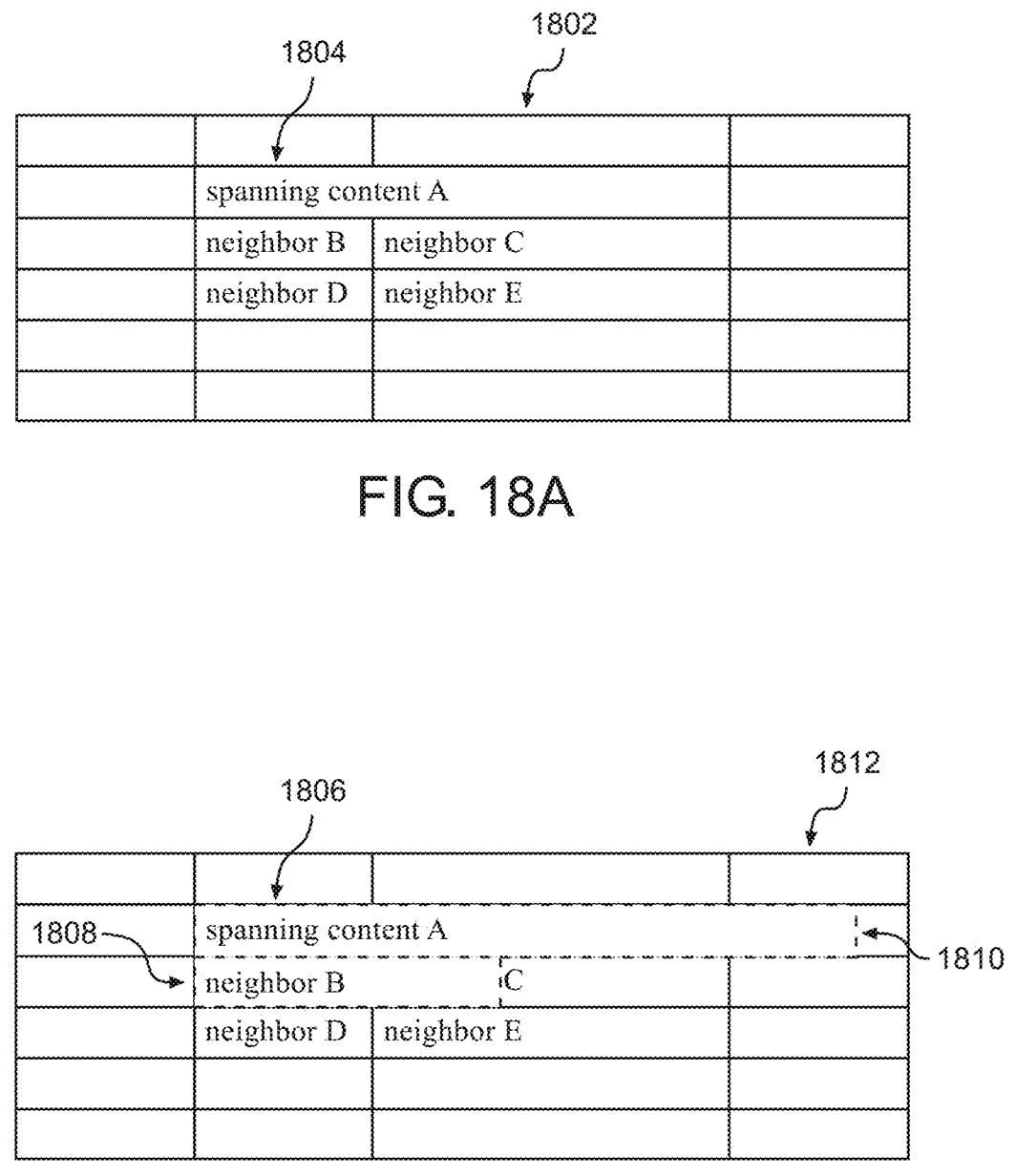

In various embodiments, spans of multiple cells may be updated simultaneously. FIG. 18A illustrates an exemplary scenario in accordance with one embodiment. A column 1802 has been resized, and is now wider than the other columns. A cell 1804 spans two columns. The other cells have a default span of one column by one row.

FIG. 18B illustrates a continuation of the exemplary scenario of FIG. 18A. A user has selected two cells 1806, 1808 and has dragged the right edge 1810 of one of them. In the illustrative embodiment of FIG. 18B, the two cells 1806, 1808 are displayed with dashed borders to highlight the fact that a drag operation is in progress.

Both cells 1806, 1808 are extended horizontally by the same amount, equal to the horizontal distance between the position of the mouse pointer at the beginning of the drag operation and the position of the mouse pointer at this point in the drag operation. However, due to the difference between column widths 1802, 1812, one of the cells has been extended past the midpoint of a column 1812, while the other cell 1808 has not yet been extended to the midpoint of a column 1802 (FIG. 18A). At this point, the user performs a drop operation, e.g., by releasing the left mouse button.

Figures 18C, 18D:
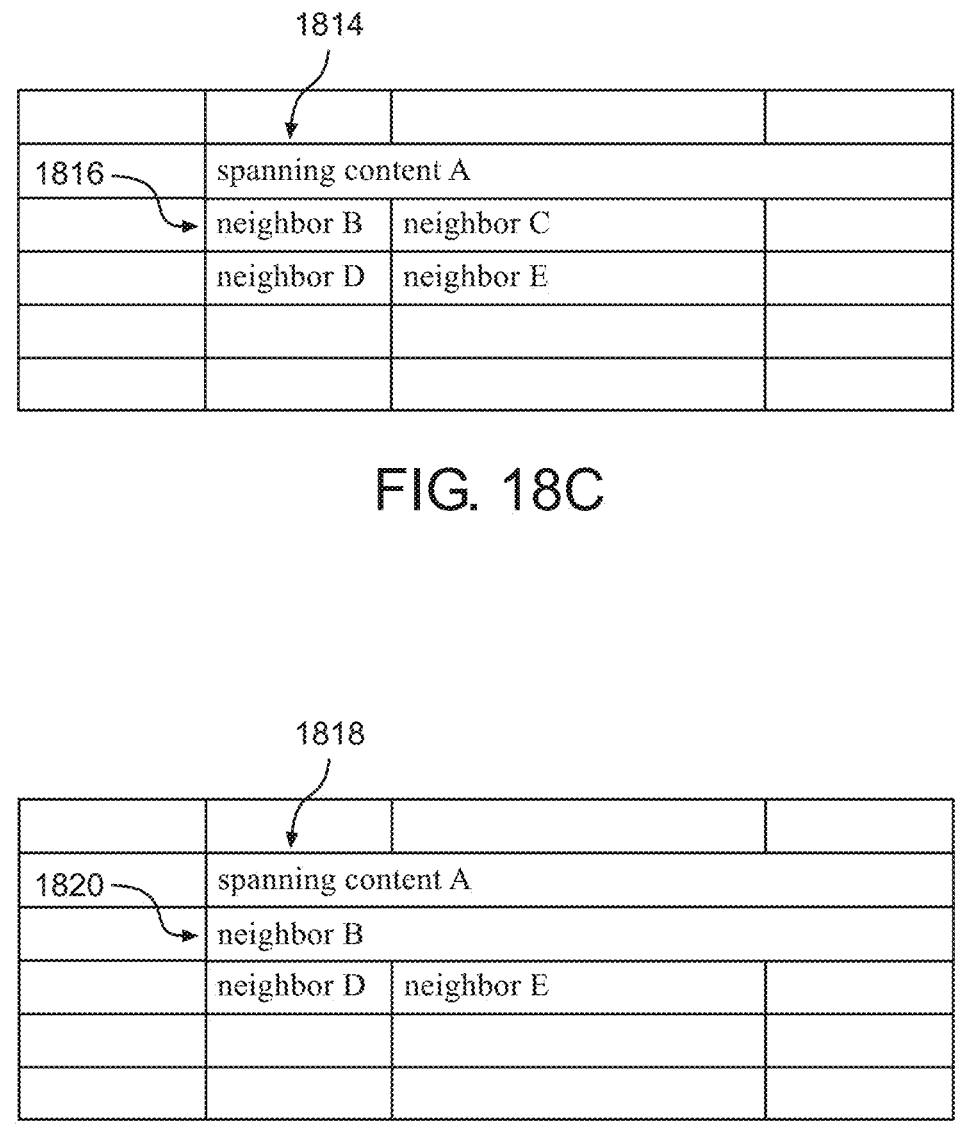

FIG. 18C illustrates the result in accordance with one embodiment. In response to the drop, new span values are computed for each of the selected cells 1806, 1808 separately. One cell 1806 had been extended beyond the halfway point of a column 1812, so its span is updated to include that column 1814. The other cell 1808 had not been extended beyond the halfway point of a column 1802 (FIG. 18A), so its span is updated to exclude that column 1816.

It is to be understood that the computation of the spans in connection with FIG. 18C is illustrative only and is not to be construed as limiting the scope of this application in any way. Many other approaches to computing a single span, or multiple spans, are possible in the same, or other embodiments.

FIG. 18D illustrates an alternative approach to computing multiple spans in accordance with one embodiment. The user has performed a drop operation in accordance with the illustrative scenario of FIG. 18B. In response, a new span is computed for the cell 1806 whose right edge 1810 was being dragged. This new value is then assigned to all of the selected cells. In the exemplary embodiment of FIG. 18D, the cells 1818, 1820 are displayed above the other cells to provide visual feedback.

Span—Resize—Multiple Cells in Same Row—FIG. 19

Figure 19A:
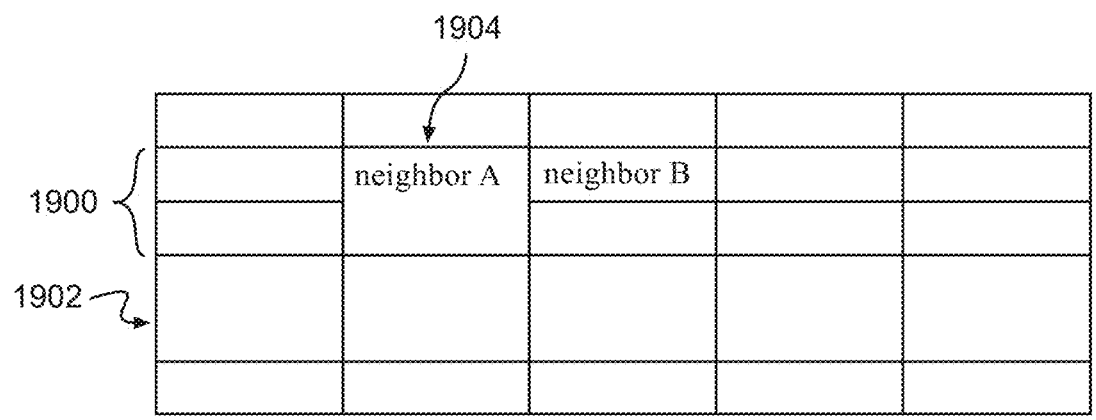
FIG. 19A-FIG. 19D illustrate scenarios wherein the span of multiple cells in the same row may be adjusted via user interface operations.

FIG. 19A illustrates an exemplary scenario in accordance with one embodiment. A row 1902 has been resized. A cell 1904 spans two rows 1900. The other cells have the default span of one column by one row.

Figure 19B:
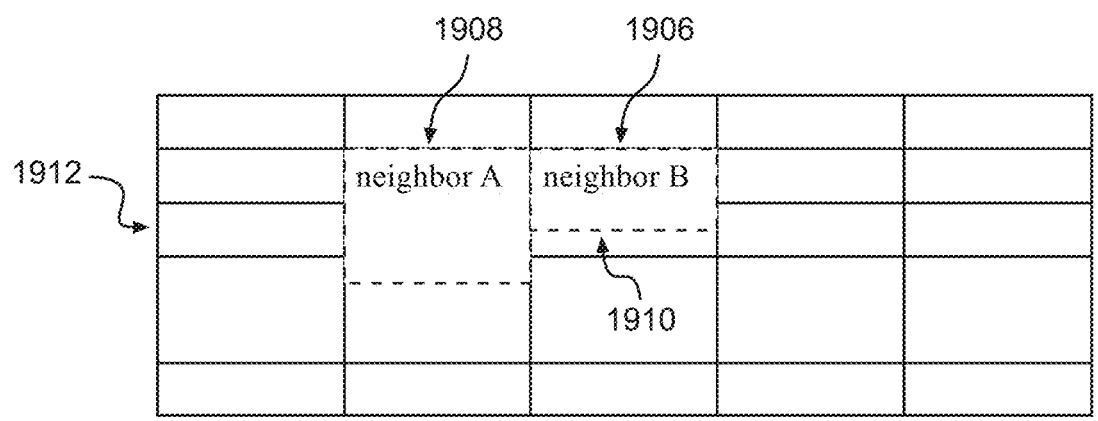

FIG. 19B illustrates a continuation of the exemplary scenario of FIG. 19A. A user has selected two cells 1906, 1908 and has dragged the bottom edge 1910 of one of them. In the illustrative embodiment of FIG. 19B, the two cells 1906, 1908 are displayed with dashed borders to highlight the fact that a drag operation is in progress.

Both cells 1906, 1908 are extended vertically by the same amount, equal to the vertical distance between the position of the mouse pointer at the beginning of the drag operation and the position of the mouse pointer at this point in the drag operation. However, due to the difference between row heights 1902, 1912, one of the cells has been extended past the midpoint of a row 1912, while the other cell 1908 has not yet been extended to the midpoint of a row 1902. At this point, the user performs a drop operation, e.g., by releasing the left mouse button.

Figure 19C:
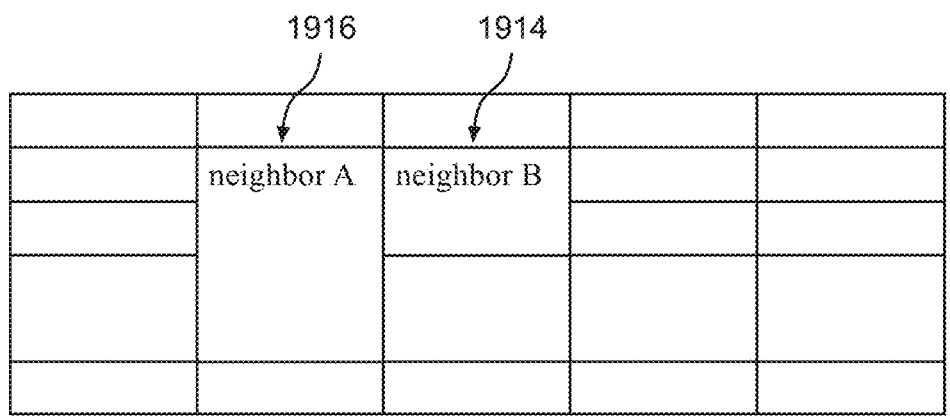

FIG. 19C illustrates the result in accordance with one embodiment. In response to the drop, new span values are computed for each of the selected cells 1906, 1908 separately. In the illustrative embodiment of FIG. 19C, if a cell has extended into another row, regardless of how far it has extended into the row, the new span is computed to include that row. One cell 1906 had been extended into the row 1912 immediately below it (FIG. 19B), so its span is updated 1914 (FIG. 19C) to include that row 1912. The other cell 1908 had been extended into the row 1902 (FIG. 19A) immediately below it, so its span is updated 1916 to include that row 1902.

It is to be understood that the computation of the spans in connection with FIG. 19C is illustrative only and is not to be construed as limiting the scope of this application in any way. Many other approaches to computing a single span, or multiple spans, are possible in the same, or other embodiments. Some of these alternative approaches have been described in relation to columns, in connection with FIGS. 18A-C. Span computation in relation to rows and columns are analogous.

Figure 19D:
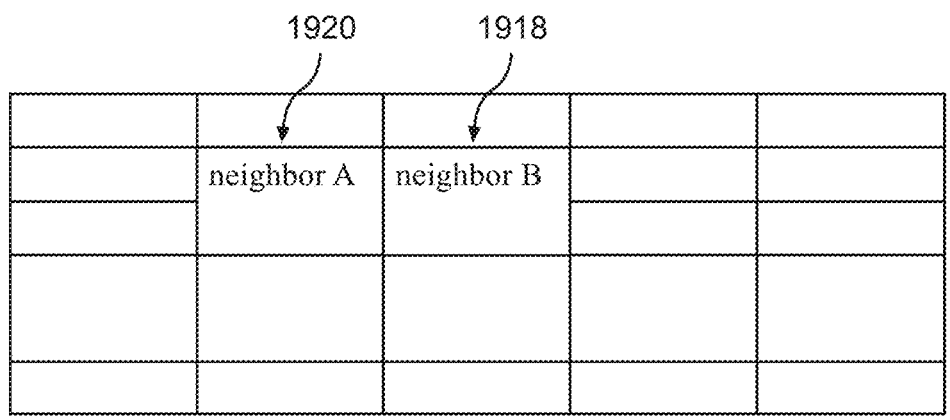

FIG. 19D illustrates an alternative approach to computing spans in accordance with one embodiment. The user has performed a drop operation in accordance with the illustrative scenario of FIG. 19B. In response, a new span is computed for the cell 1906 whose bottom edge 1910 was being dragged. This new value is then assigned to all of the selected cells 1918, 1920.

Edit and Span Edit

In various embodiments a user may edit the content of a cell by activating an editor. In one embodiment, the user may activate an editor for a cell by double clicking on it. In response, the cell is placed in edit mode and a boundary or other visual feedback is displayed to alert the user to that fact. In various embodiments, a cell's editor may be resized via user interface commands such as dragging one or more of its edges. The ability to resize an editor may improve the editing experience for the user.

A means for resizing an editor may be provided in a variety of embodiments, and is not limited to only those embodiments that also support the notion of spans. In one embodiment, there is no notion of span and no means of changing the size of a cell, except via adjusting the width of the column or the height of the row where the cell appears. In particular, there is no means of assigning a span to a cell, and every cell occupies exactly one cellular box or area on the graphical user interface consisting of the area of intersection between one row and one column.

In various other embodiments, both the concept of spans and the ability to resize an editor are supported. In still other embodiments, the concept of a span is supported, but an editor may not be resized.

In various embodiments, the initial or default size of an editor is determined by the span of the cell being edited. For example, if the cell has a span of 2 columns by 3 rows, the editor for the cell will also span 2 columns and 3 rows by default.

In various embodiments an editor may be resized by dragging one or more of its edges, or its corners. In one embodiment, resizing an editor may result in a cell's span being updated as well. In this way, a user may change the content of a cell by entering textual or other information directly into the editor, while also easily changing the span of the cell by resizing the editor on the display.

In one embodiment, means are provided for a user to control whether or not resizing an editor causes the edited cell's span to be updated as well. In this way a user is given the option of resizing the editor simply for a more convenient edit experience, or for updating the edited cell's span as well.

In various embodiments, resizing an editor to update a cell's span may proceed in a manner analogous to updating a cell's span by dragging the cell's boundary, as described in connection with FIGS. 17 A-E.

In various embodiments, dragging an edge or a corner of an editor results in the dragged edge or edges of the editor to snap to the grid, so that the editor ends up with dimensions corresponding to a valid span.

In one embodiment, means are provided to override a cell's span, so that the cell and/or its editor do not snap to the grid. A user may later cancel the override, causing the cell or its editor to snap to the grid and take on dimensions corresponding to the cell's span.

Span—Miscellaneous

FIGS. 14-19 illustrate exemplary embodiments comprising a flat grid. It is to be understood that this is in no way meant to be limiting as to the scope of the inventions presented herein. Other scenarios are possible. An embodiment may provide a means for a cell to span a plurality of columns and rows in a hierarchical grid. A structured document may comprise hierarchical rows, hierarchical columns, or both.

References are made in the above to specific ways of specifying a span, including a column span of −2 or −n. It is to be understood that such references are for clarity of exposition only and embodiments are not restricted to using those representations for describing spans.

In the interest of clarity, FIGS. 14-19 display grid lines, while other figures representing structured documents herein do not. It is to be understood that various approaches to displaying a structured document are possible and embodiments may or may not display grid lines. In one embodiment a user may enable/disable the display of grid lines via a menu item.

Spanning cells may be implemented in a variety of ways. In one embodiment, a spanning cell may be represented by a user interface object such as a pane, panel or figure of appropriate size and position on the grid. The z-order of the user interface objects corresponding to spanning cells may determine which object (i.e., cell) occludes the others in accordance with conventional ways practiced in the relevant user interface arts.

In various embodiments, various combinations of the above-described methods, apparatus and means, may be provided together and may include none, or a plurality of other methods, apparatus and means described elsewhere in this disclosure and in the patent application Ser. No. 14/492,034. Many other combinations are possible and will readily suggest themselves to such skilled persons having the benefit of this disclosure, in light of what is known in the relevant arts.

Cells—Swap—FIG. 20

In the course of editing a structured document, a situation may arise wherein the position of two or more cells on a grid must be swapped. To swap a first cell and a second cell, a user may proceed as follows: (1) move the first cell to a third position; (2) move the second cell to the position previously occupied by the first cell; and (3) move the first cell from the third position to the position previously occupied by the second cell. Alternatively, embodiments may provide more efficient means to accomplish the swap.

Figure 20A:
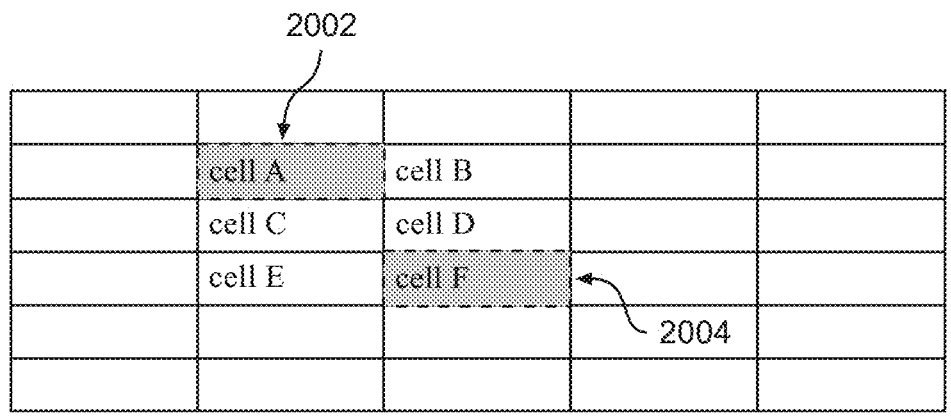
FIG. 20A and FIG. 20B illustrate a scenario wherein two cells are swapped via a single edit operation.
Figure 20B:
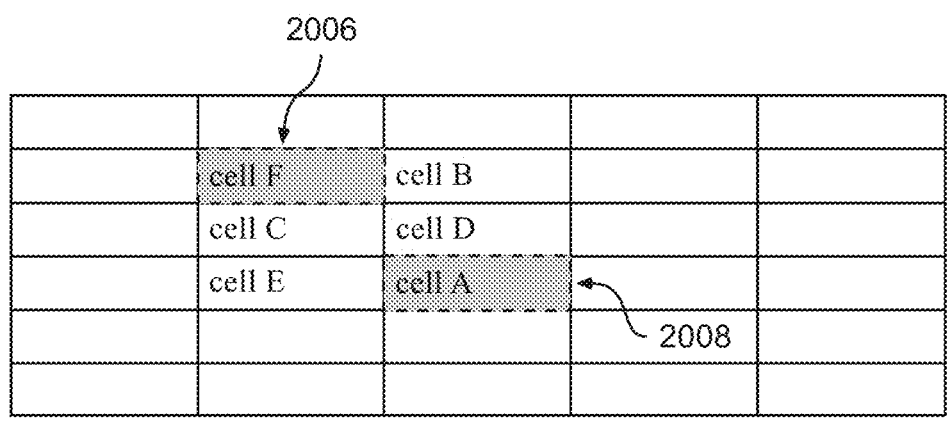

FIG. 20A illustrates an exemplary scenario in accordance with one embodiment. A user has selected two cells 2002, 2004, which are to be swapped. In response to the selection, the visual representations of the cells 2002, 2004 have been modified to indicate their selected status. The user then proceeds to drag one of the selected cells 2002, 2004 and drop it on the other. FIG. 20B illustrates the result. In response to the drop, the cells 2002, 2004 have been swapped 2006, 2008.

In various embodiments, a swapping of cells swaps all content and attributes of the cells, including any data, formatting, span, etc. In various embodiments, a swapping of cells swaps only part of their content, e.g., the data and formatting only.

The cells to be swapped may be on the same row, or on the same column, or on different rows and columns. In various embodiments, non-adjacent cells may be selected by clicking on them, one after the other, while simultaneously pressing one or more keys on a keyboard. Adjacent cells may be selected more efficiently by a drag of a mouse or other pointing device.

In various embodiments, once the cells have been selected, the command to actually perform the swap may be in the form of a drag and drop operation as described in connection with FIGS. 20A,B, or may be in the form of pressing a button or a key on the keyboard, or a selection from a menu, or other means of user input.

In one embodiment the cells that are to be swapped do not have to be selected first; to swap a first cell and a second cell, a user may simply drag the first cell and drop it on the second cell. In various embodiments, means may be provided to distinguish a swap operation from a move operation; for example, pressing a specially designated key on a keyboard at the time of the drop may indicate that a swap, and not a move, is desired.

Cells—Swap—Multiple Cells—FIGS. 21, 22

In various embodiments, multiple cells may be swapped at the same time. FIG. 21A illustrates an exemplary scenario in accordance with one embodiment. Multiple cells have been selected 2102 and are to be swapped with multiple other cells that have also been selected 2104. A user drags one group of selected cells and drops it on the other group of selected cells. FIG. 21B illustrates the result. In the illustrative embodiment of FIG. 21B, each of the selected cells 2102, 2104 has been swapped with its corresponding cell 2106, 2108.

Various embodiments may provide means to swap cells residing in different rows in an analogous manner. FIG. 22A is an exemplary scenario in accordance with one embodiment. Multiple cells have been selected 2202 and are to be swapped with multiple other cells that have also been selected 2204. A user drags one group of selected cells and drops it on the other group of selected cells. FIG. 22B illustrates the result. In the illustrative embodiment of FIG. 22B, each of the selected cells 2202, 2204 has been swapped with its corresponding cell 2206, 2208.

Cells—Swap—Mismatch—FIG. 23

In various embodiments, two groups of selected cells need not be similar in order to swap their cells. The two selections may include different numbers of cells, may start and end on different columns or rows, may be oriented differently (e.g., one horizontally and the other vertically), etc.

Figures 23A, 23B:
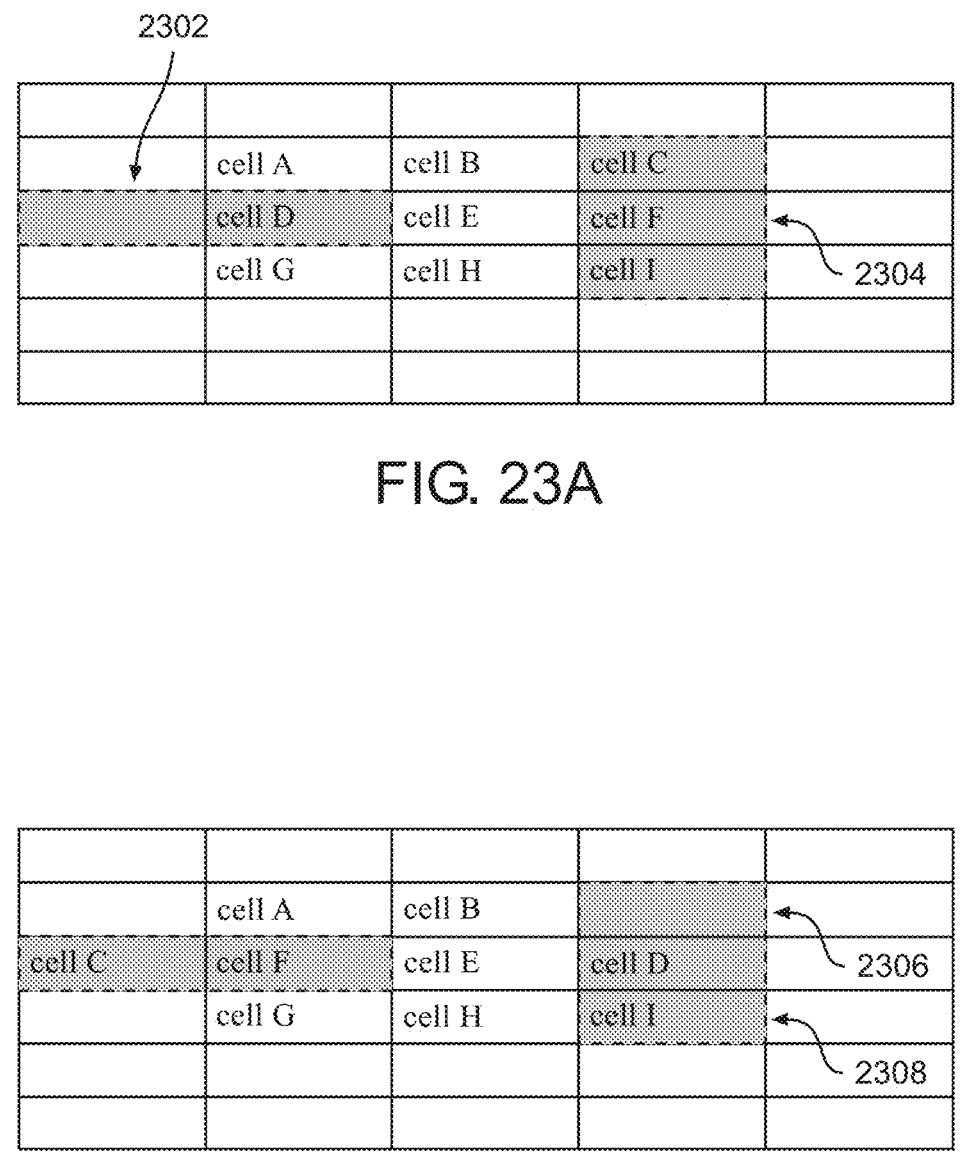

FIG. 23A illustrates an exemplary scenario in accordance with one embodiment. One group of selected cells 2302 is oriented horizontally and comprises two cells, one of which is empty. The other group of selected cells 2304 comprises three cells, and is oriented vertically. A user drags one group of selected cells and drops it on the other group of selected cells.

FIG. 23B illustrates the result. In the illustrative embodiment of FIG. 23B, each of the selected cells 2302, 2304 has been swapped with its corresponding cell, if a corresponding selected cell exists. If a corresponding selected cell does not exist, the cell is not swapped. In the exemplary scenario of FIG. 23B, the first cell in the first selected group 2302 has been swapped with the first cell in the second selected group 2304. Prior to the swap, the first cell in the first selected group 2302 was empty, so after the swap, the first cell in the second selected group 2304 is empty 2306. The first selected group 2302 has two cells, while the second selected group 2304 has three cells. As a result, the third cell in the second selected group 2304 does not have a corresponding cell in the first selected group 2302, and is therefore left unchanged 2308.

In the exemplary embodiment of FIG. 23B, correspondence between cells is determined by row-major traversal of each of the selected groups or regions. Many other approaches are possible, including column-major traversal, and readily suggest themselves to those practiced in the relevant arts.

In one embodiment, when two selected groups of cells have differing characteristics, e.g., are oriented differently or have different numbers of cells, the user is warned of the discrepancy, and is prompted to clarify intentions. This may take the form of a dialog box where the user is asked to confirm the desire to proceed with the swap.

Cells—Swap—Contiguous Selection—FIGS. 24, 25

In various embodiments, a user may make a single selection to specify which cells are to be swapped. This method may make it easier to select the cells that are to be swapped.

Figure 24A:
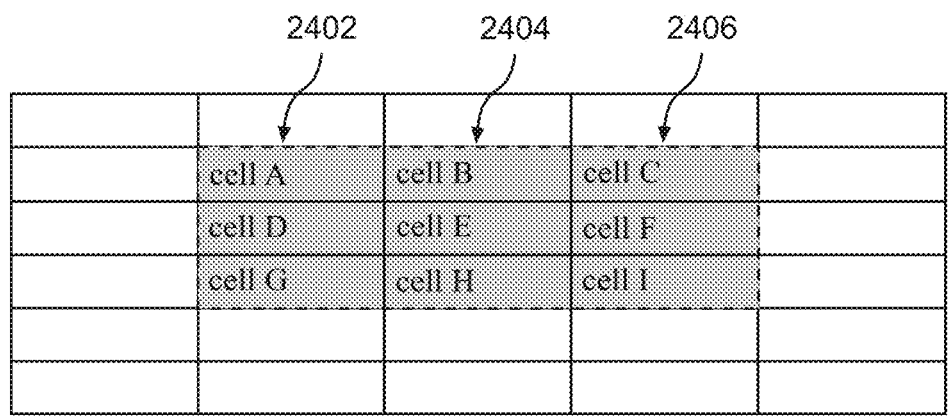
FIG. 24A and FIG. 24B illustrate a scenario wherein multiple cells in two columns are swapped using a single contiguous selection.

FIG. 24A illustrates an exemplary scenario in accordance with one embodiment. Two groups of cells, each comprising three cells, are to be swapped 2402, 2406. A user makes one selection, e.g., by dragging a mouse, to include the cells that are to be swapped 2402, 2406. If the cells to be swapped are not adjacent, the selection further includes all the cells 2404 in between the cells that are to be swapped 2402, 2406. In the exemplary scenario of FIG. 24A, three cells 2404 are sandwiched between the two groups of cells that are to be swapped 2402, 2406. The user then drags one of the selected cells in the leftmost selected column and drops it on a selected cell in the rightmost selected column.

Figure 24B:
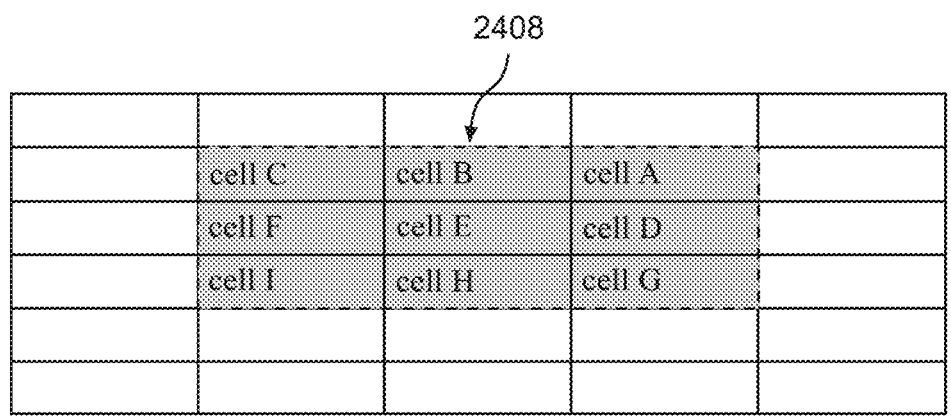

FIG. 24B illustrates the result in accordance with one embodiment. Each of the selected cells in the leftmost column of the selection is swapped with the corresponding cell in the rightmost column of the selection. All of the other cells in the selection, i.e., cells that are not in the leftmost or the rightmost columns of the selection, are left unchanged 2408.

In the exemplary embodiment of FIG. 24B, this method of swapping cells is not limited to swapping multiple pairs of cells. It may be used to swap two cells residing on the same row. A user simply selects both cells to be swapped, as well as any cells in between them, and then drags the leftmost cell in the selection and drops it on the rightmost cell in the selection. In response, the leftmost and the rightmost cells are swapped, leaving the middle cells, if any, unchanged.

FIG. 25A illustrates an exemplary scenario in accordance with one embodiment. Two groups of cells, each comprising three cells, are to be swapped 2502, 2504. A user makes one selection (e.g., by dragging a mouse) to include the cells that are to be swapped 2502, 2504. If the cells that are to be swapped are not adjacent, the selection further includes all the cells in between the cells that are to be swapped. In the exemplary scenario of FIG. 25A, six cells in two rows are sandwiched between the two groups of cells that are to be swapped 2502, 2504. The user then drags one of the selected cells in the topmost selected row and drops it on a selected cell in the bottommost selected row.

FIG. 25B illustrates the result in accordance with one embodiment. Each of the selected cells in the topmost row of the selection is swapped with the corresponding cell in the bottommost row of the selection 2506, 2508. All of the other cells in the selection, i.e., the six selected cells sandwiched between the topmost and the bottommost rows of the selection, are left unchanged.

In the exemplary embodiment of FIG. 25B, this method of swapping cells is not limited to swapping multiple pairs of cells. It may be used to swap two cells residing on the same column. A user selects both cells to be swapped, as well as any cells in between them, and then drags the topmost cell in the selection and drops it on the bottommost cell in the selection. In response, the topmost and the bottommost cells are swapped, leaving the middle cells, if any, unchanged.

In the exemplary scenarios of FIGS. 24, 25, the middle cells in the selections are left unchanged. This is not the only possibility. In various embodiments, the middle cells may also be swapped in response to a swap command.

Cells—Swap—Variations

FIGS. 20-25 illustrate exemplary embodiments comprising a flat grid. It is to be understood that this is in no way meant to be limiting as to the scope of the inventions presented herein. Other scenarios are possible. An embodiment may provide a means for swapping two or more cells in a hierarchical grid. A structured document may comprise hierarchical rows, hierarchical columns, or both.

In the interest of clarity, FIGS. 20-25 display grid lines, while other figures representing structured documents herein do not. It is to be understood that various approaches to displaying a structured document are possible and embodiments may or may not display grid lines. In one embodiment a user may enable/disable the display of grid lines via a menu item.

In the illustrative scenarios of FIGS. 20-25, selected cells are displayed with shaded background and dashed borders, whereas elsewhere in the present disclosure, selected cells or rows are displayed differently. It is to be understood that this is for clarity of exposition only and is not to be construed as limiting the scope of the present inventions in any way. In various embodiments, cells, rows and columns may be displayed differently according to whether or not they are selected.

In the discussion in connection with FIGS. 20-25, references are made to swapping cells by means of specific user interface operations such as drag and drop. It is to be understood that these references are made in the interest of clarity and are not to be construed a limiting the scope of the present inventions in any way. Many other user interface operations or commands may be used to carry out a swap or other operations. Such user interface operations or commands may include selecting from a menu, pressing a user interface button, or pressing one or more keys on a keyboard or other user input device.

In the discussion in connection with FIGS. 20-25, references are made to dragging one cell and dropping it on another cell, such as dragging a cell in a leftmost selected column or a topmost selected row and dropping it on a cell in a rightmost selected column or a bottommost selected row, respectively. It is to be understood that such references are made in the interest of clarity only, and are not to be construed as limiting in any way. In various embodiments, a user may drag a cell from a rightmost selected column and drop it on a selected cell in a leftmost selected column. Similarly, in various embodiments, a user may drag a cell from a bottommost selected row and drop it on a selected cell in a topmost selected row.

In the exemplary embodiments of FIGS. 20-25, a user first selects two or more cells to swap, and then proceeds to swap them via drag and drop operations. It is to be understood that selection, or a particular type of selection such as rectangular, or contiguous, or otherwise, may not be necessary in every embodiment. Many other approaches are possible. Embodiments may require the selection to be contiguous, or only containing the cells that are to be swapped, or may not require a selection at all. Other embodiments will readily suggest themselves to such skilled persons having the benefit of this disclosure, in light of what is known in the relevant arts.

Selection—Generalization

In various embodiments, selecting two or more cells enables a portion of a grid to respond in a special manner to subsequent operations such as drag and drop. For example, in one operation, a user may select a group of cells and then drag the selection to another location on the grid in order to move the selected cells from one location to another. In another operation, a user may select a group of cells and then perform a drag and drop operation from one region in the selection to another region in the selection in order to swap two or more cells. The same user interface operation of drag and drop results in different edit operations depending on whether the drag and drop is carried out entirely within a selected region on the grid, or involves unselected cells as well.

In various embodiments, selection may act as a blanket that temporarily modifies the meaning of user interface operations in a region of a grid. In the exemplary embodiments of FIGS. 20-25, drag and drop operations within selected regions resulted in the swapping of two or more cells. This technique however is not limited to swap operations. In various embodiments, selection may be used in a variety of ways to specify or modify user interface operations.

In one embodiment, a user may first select one or more cells in a grid prior to issuing a paste command (e.g., as part of a cut/paste operation). In response, the paste operation may overwrite the content of the selected cells only, leaving the unselected cells unchanged. In this way, a user may avoid unintentionally pasting over existing data in the grid. Only the portion of the grid explicitly selected to host the pasted data is affected.

In one embodiment, if the paste operation requires more cells than are selected, new rows and columns are inserted to accommodate the data to be pasted. In another embodiment, if a paste operation requires more cells than are selected, the paste operation is clipped at the boundary of the selection, i.e., only the data corresponding to the available selected region will be pasted, and any data extending beyond the available selected region will be ignored and will not be pasted.

Pop Ups—FIGS. 26, 27

In various embodiments, hovering a mouse pointer over a cell may result in the display of a pop up view. A pop up view may be similar to a conventional tool tip commonly found in graphical user interfaces, wherein, in response to a mouse pointer hovering over an area on the graphical user interface, a view is displayed showing additional or supporting information in connection with the object or area under the mouse pointer.

In various embodiments of the present invention, a pop up view may present the content of a cell in various alternative ways, or display various aspects of the data residing in a cell. Pop up views may provide a convenient means for a quick glimpse into information that would otherwise require more elaborate user interface interactions to view or modify.

FIG. 26A illustrates an exemplary structured document in accordance with one embodiment. In the exemplary scenario of FIG. 26A, all rows are collapsed.

FIG. 26B illustrates the structured document of FIG. 26A, wherein the first row has been fully expanded 2602 to expose the subtree rooted at the first row. In the exemplary scenario of FIG. 26B, the first row has three child rows, one of which is blank 2604. Each of the other two child rows has a child row itself.

In the exemplary scenario of FIG. 26B, one cell contains textual information that is too large to fit into the display area of the cell 2608. The textual information is clipped at the right edge of the cell and an ellipsis is added 2608 to indicate the existence of textual information that extends beyond the available area of the cell on the display. Another cell 2606 contains a non-textual object, represented by an icon and a string of text representing the object's name, title, or short description. The object may be any of various available types of information, such as a structured document, a text block, a grid, an image, a diagram, a link, etc.

In the exemplary embodiment of FIG. 26B, a user may hover a mouse pointer over a cell to view a pop up containing additional information about the data in the cell. A hover action may be accomplished via a mouse or other pointing device, or via touch or other means.

Figure 26C:
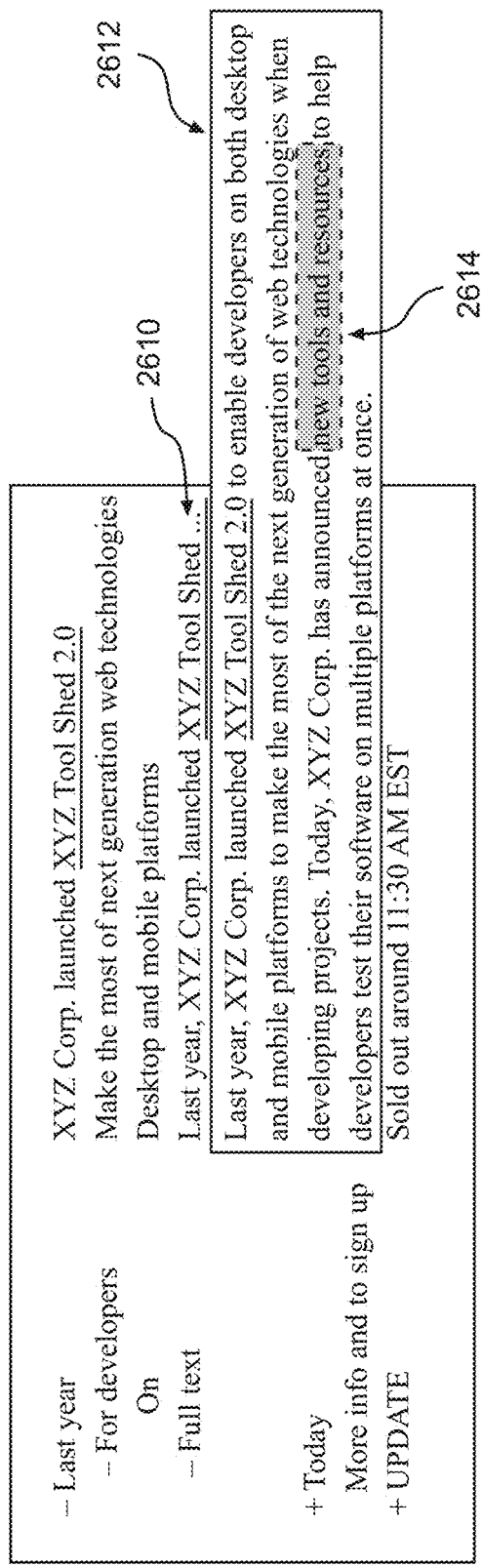

FIG. 26C illustrates the result of hovering over a cell 2610 in accordance with one embodiment. In response to the hover, a pop up view 2612 is displayed showing the textual information of the cell 2610 in its entirety. In the exemplary embodiment of FIG. 26C, the pop up view 2612 is lined up underneath the cell 2610 for a cleaner look.

In various embodiments, a pop up view may be dismissed (i.e., removed from the display) by pressing a specially designated key such as ESC on a keyboard, or by simply moving the mouse pointer out of the cell's area on the display.

In the exemplary embodiment of FIG. 26C, moving the mouse pointer out of the cell's area 2610 and over the pop up view 2612 does not result in the dismissal of the pop up view. Rather, a user may interact with the pop up view and its content. For example, a user may edit the content of the pop up view directly on the pop up view, or drag and drop content out of the pop up view, or perform other editing operations such as cut and paste. In the exemplary scenario of FIG. 26C, a user has selected 2614 a portion of the text in the pop up view 2612. The user may then drag the selected text 2614 to another area on the graphical user interface to perform some edit operation.

Figure 26D:
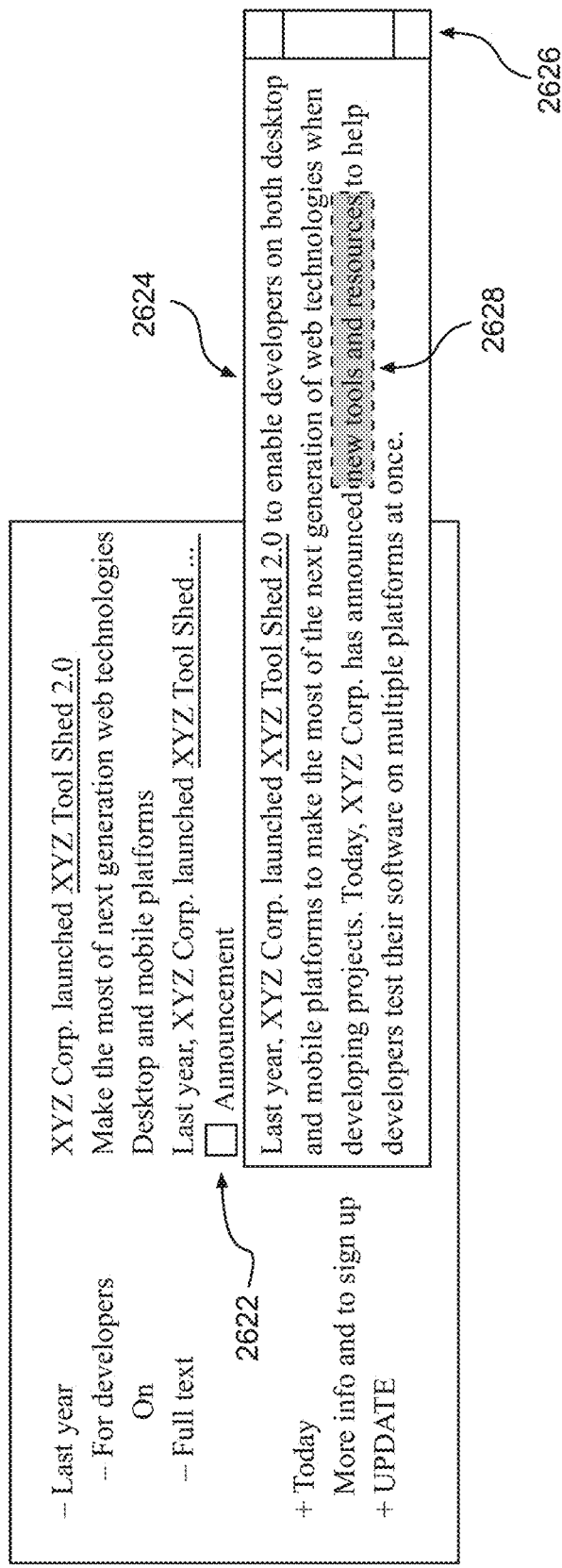

FIG. 26D illustrates an exemplary scenario in accordance with one embodiment. A user has hovered (e.g. with a mouse or other pointing device) over a cell 2622 containing a non-textual object. In the exemplary scenario of FIG. 26D, the object 2622 represents a text block comprising a full article, such as the exemplary article in FIG. 1. In response to the hover, a pop up view 2624 is displayed showing the content of the text block 2622. However, since the content of the text block 2622 is too large to be displayed in the available area 2624, a scroll bar 2626 is provided to enable the user to bring other parts of the information into view. In the exemplary scenario of FIG. 26D, a portion of the content has been selected 2628 in preparation for some edit operation such as drag and drop.

Figure 26E:
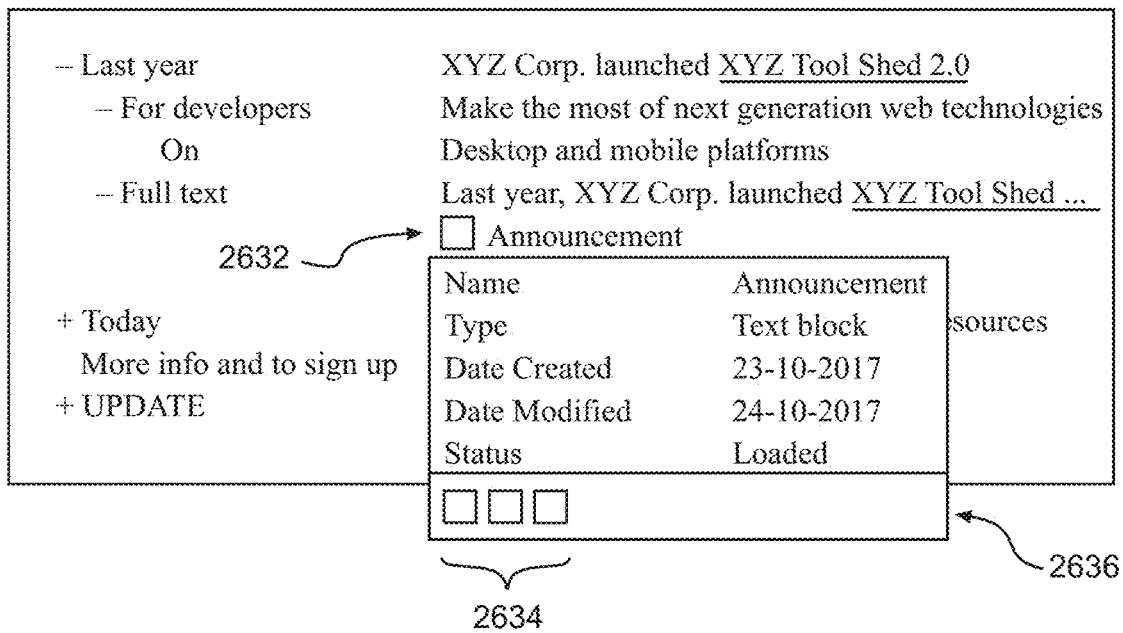

FIG. 26E illustrates an alternative scenario in accordance with one embodiment. A user has hovered over a cell 2632 containing a non-textual object. In the exemplary scenario of FIG. 26E, in response to the hover, a pop up view is displayed, showing other aspects of the object 2632 rather than its textual content. The pop up view includes a title bar 2636 containing several icons or buttons 2634. In the exemplary embodiment of FIG. 26E, the pop up view may be moved by dragging its title bar 2636, or resized by dragging one of the edges of its border frame. The buttons 2634 may provide the user with the option of selecting different views or aspects of the object 2632 for display. For example, the user may select between a view showing header or general or meta information about the object 2632 (FIG. 26E), and a view showing the content of the object (FIG. 26D).

In various embodiments, the object 2632 may be a reference to a data object residing in a remote location such as a database or document server, such as in the exemplary system described in connection with FIG. 5. In one embodiment, when a structured document containing a reference to a remote object 2632 is opened in a view or editor, the local system connects to the remote server and downloads the header information for the object. The header information is then available for display in a cell 2632, or a pop up view. A user may instruct the system to download the body or main content of the object 2632 by pressing a button, such as one of the buttons 2634 provided on the pop up view. In response, the system downloads the content or body of the object 2632, which is then available for display, for example in a pop up view (FIG. 26D).

Figure 27A:
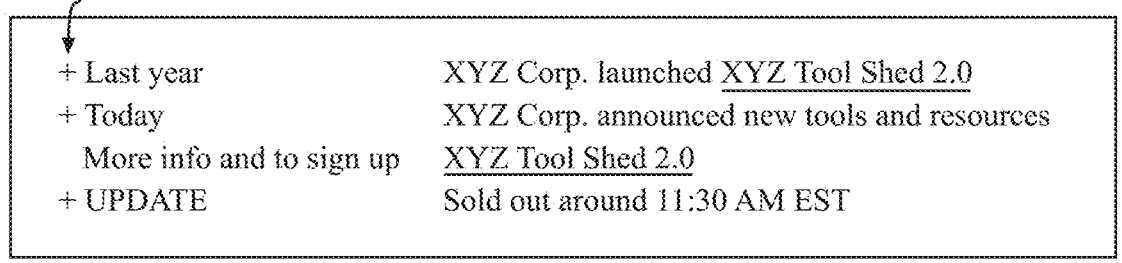
FIG. 27A-FIG. 27C illustrate a scenario wherein pop up views provide a peek through a collapsed row.

FIG. 27A illustrates an exemplary structured document in accordance with one embodiment. To peek through to the subtree rooted at a parent row, a user may hover over a specially designated area of the row, such as the row's expand/collapse icon 2702.

Figure 27B:
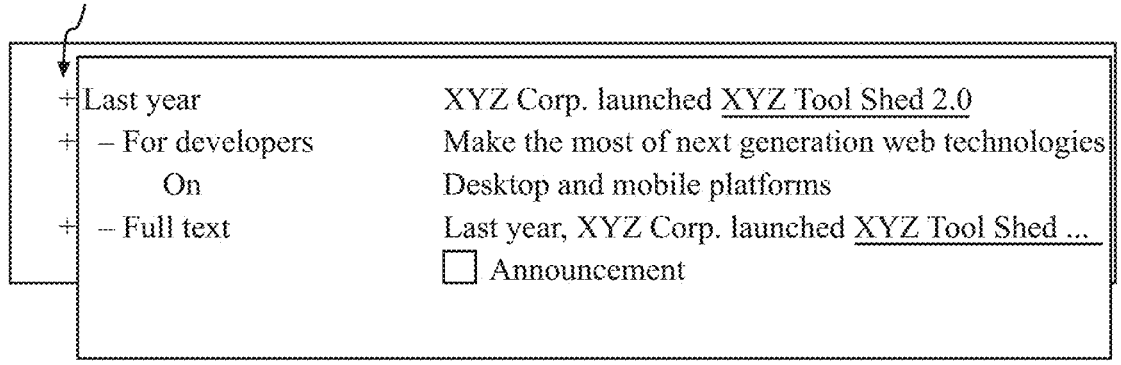

FIG. 27B illustrates the result in accordance with one embodiment. In response to the hover, a pop up view 2706 is displayed showing the subtree rooted at the parent row fully expanded. The parent row is still in a collapsed state 2704 and the expand/collapse icon to its left illustrates that fact. The pop up view is positioned on the screen in such a way so as to match the parent row's position precisely. The pop up view does not cover the expand/collapse icon however, in order to provide feedback to the user.

Figure 27C:
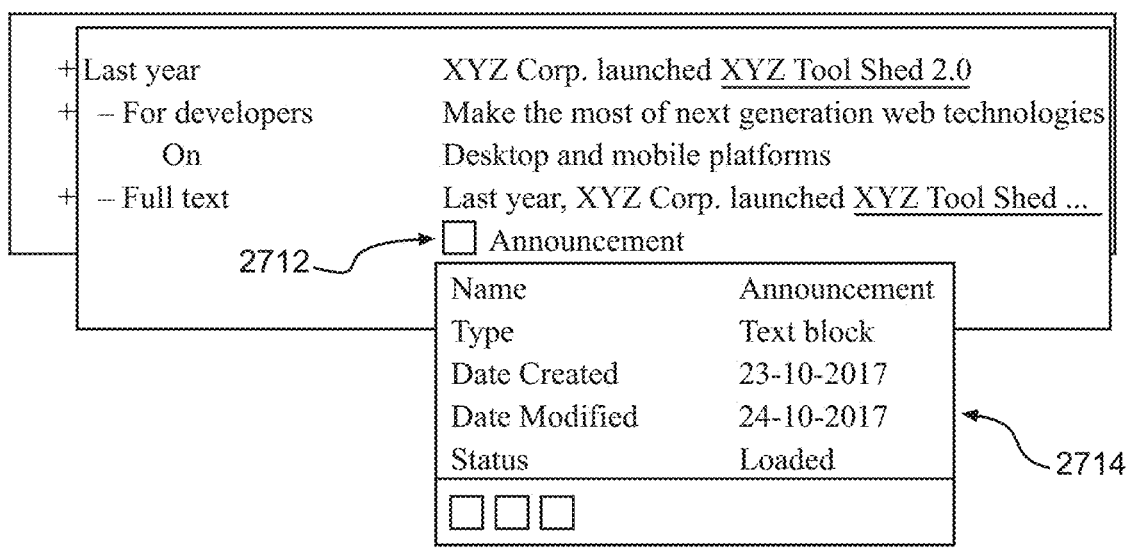

FIG. 27C illustrates a continuation of the exemplary scenario of FIG. 27B in accordance with one embodiment. A user has hovered, in the pop up view, over a cell 2712 containing a non-textual object. In response, another, nested, pop up view is displayed 2714 showing some aspect of the object 2712.

In various embodiments, means are provided for a display of pop up views of an indefinite number of nesting levels. In various other embodiments, nesting of pop up views is supported only up to a certain number of levels, such as only one or two levels. In still other embodiments, such nesting is not supported at all.

Cells/Text Move—Row/Column Insertion—FIGS. 28-30

Figure 28A:
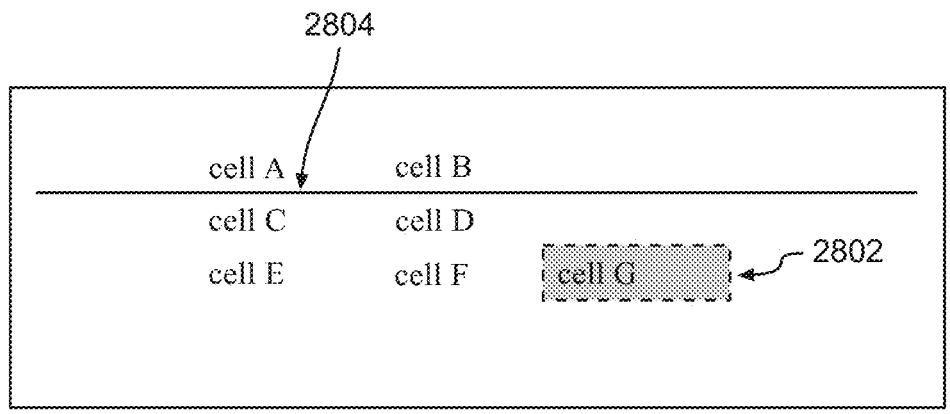
FIG. 28A and FIG. 28B illustrate a scenario wherein a row is inserted in response to dragging a cell.
Figure 28B:
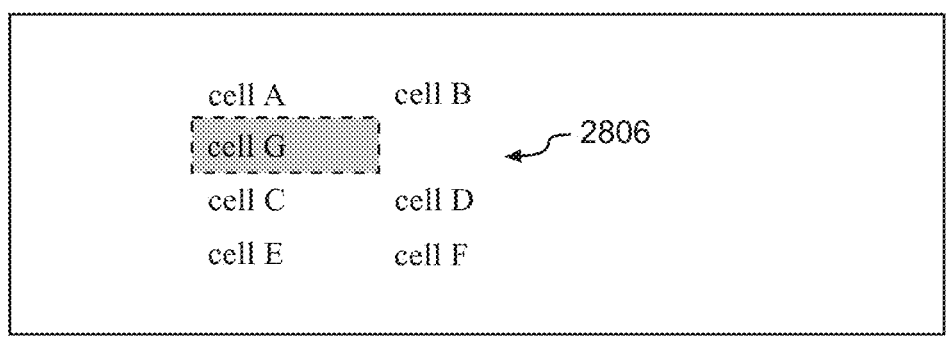

FIG. 28A illustrates an exemplary scenario in accordance with one embodiment. A cell 2802 has been selected and is dragged to a position 2804 within a certain threshold distance of the boundary between two rows. A horizontal line 2804 is displayed on the user interface to provide feedback that the mouse pointer is within a threshold distance of the boundary between the two rows. In the exemplary scenario of FIG. 28A, the user performs a drop operation at this point, e.g., by releasing the left mouse button. FIG. 28B illustrates the result. In response to the drop operation, a new row 2806 has been inserted and the cell 2802 has been moved to a position on the new row.

Figure 29A:
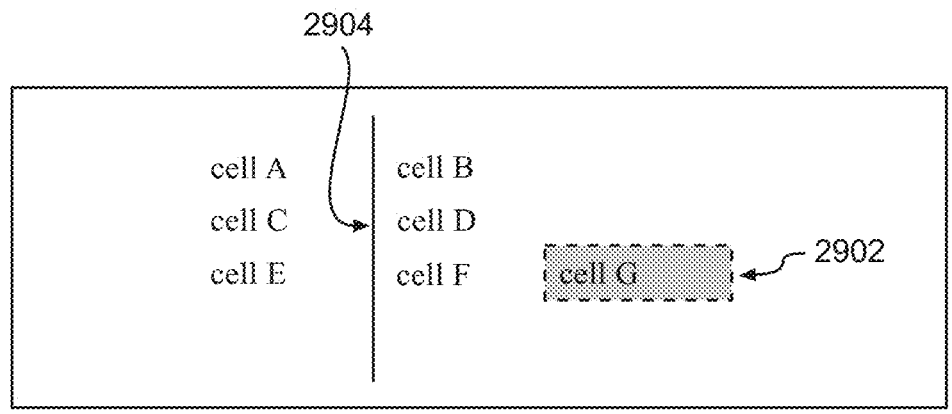
FIG. 29A and FIG. 29B illustrate a scenario wherein a column is inserted in response to dragging a cell.
Figure 29B:
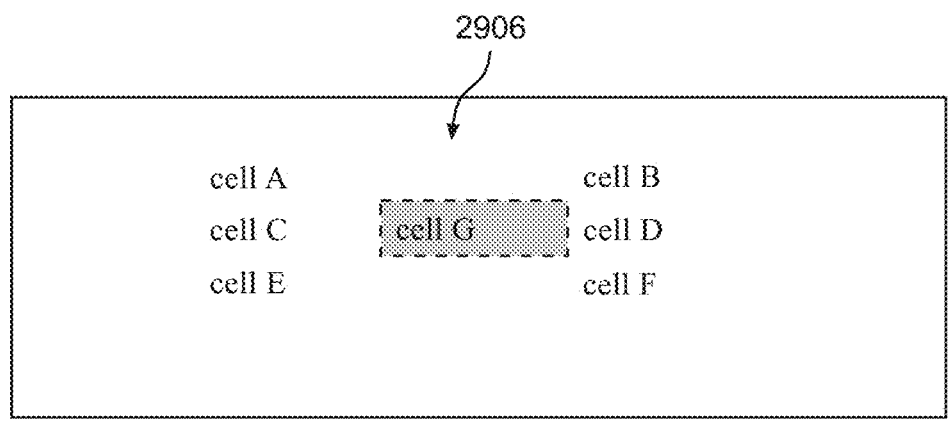

Edit operations with respect to columns are analogous. FIG. 29A illustrates an exemplary scenario in accordance with one embodiment. A cell 2902 has been selected and is dragged to a position 2904 within a certain threshold distance of the boundary between two columns. A vertical line 2904 is displayed on the user interface to provide feedback that the mouse pointer is within a threshold distance of the boundary between the two columns. In the exemplary scenario of FIG. 29A, the user performs a drop operation at this point, e.g., by releasing the left mouse button. FIG. 29B illustrates the result. In response to the drop operation, a new column 2906 has been inserted and the cell 2902 has been moved to a position on the new column.

Figure 30A:
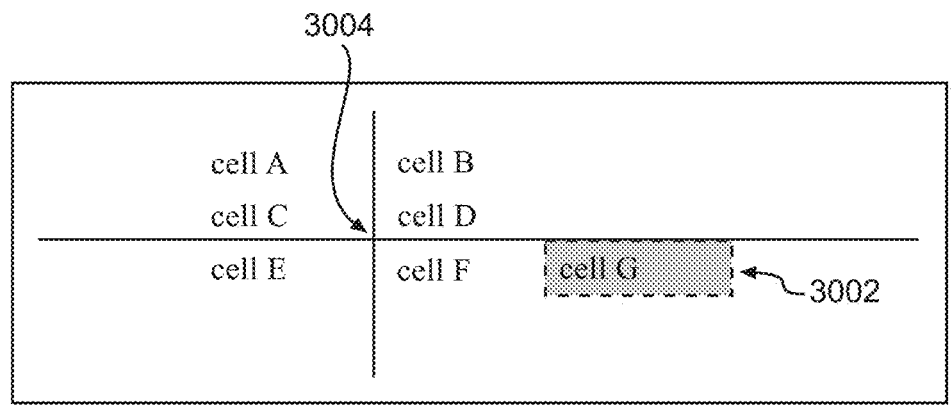
FIG. 30A and FIG. 30B illustrate a scenario wherein a row and a column are inserted in response to dragging a cell.
Figure 30B:
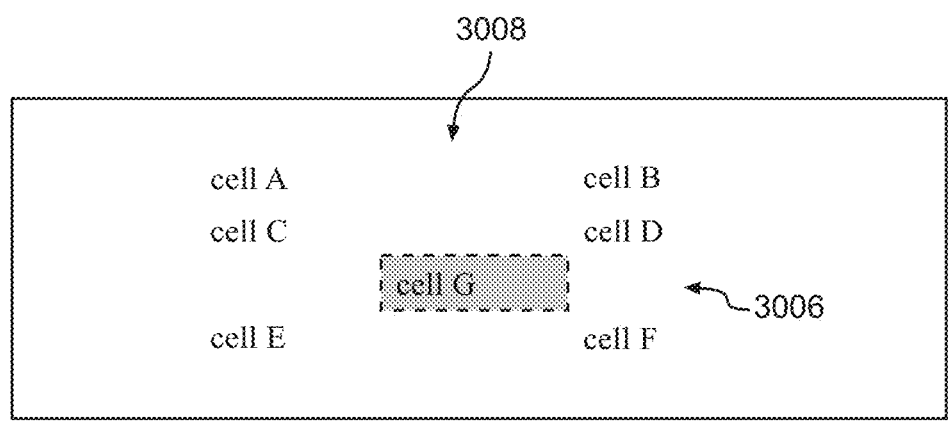

In various embodiments, edit operations are provided with respect to both rows and columns. FIG. 30A illustrates an exemplary scenario in accordance with one embodiment. A cell 3002 has been selected and is dragged to a position 3004 within a certain threshold distance of the boundaries between two rows and two columns. A horizontal line and a vertical line are displayed on the user interface to provide feedback that the mouse pointer is within a certain threshold distance of the boundaries between the two rows and the two columns. In the exemplary scenario of FIG. 30A, the user performs a drop operation at this point, e.g., by releasing the left mouse button. FIG. 30B illustrates the result. In response to the drop operation, a new row 3006 and a new column 3008 have been inserted and the cell 3002 has been moved to the position at the intersection of the new row and the new column.

In the illustrative scenarios of FIGS. 28-30, a cell is moved from one location to another. Analogous operations may be provided for moving snippets of text from one location to another. In various embodiments, snippets of text may be selected from the text in a cell, or from another source, and dragged to and dropped within a threshold distance from the boundary between two rows and/or two columns, resulting in the insertion of a row and/or column. Such operations are described in detail in connection with rows in the patent application Ser. No. 14/492,034.

Figure 31:
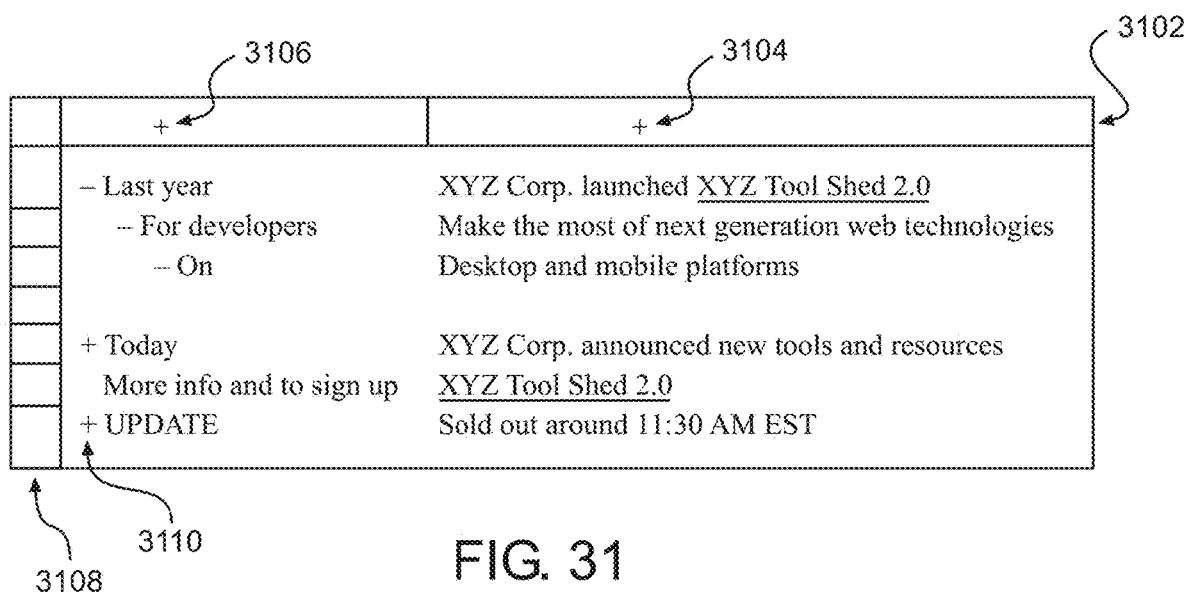
FIG. 31 illustrates row and column headers in accordance with one embodiment.

Row/Column Headers—FIG. 31

In various embodiments, rows and columns may be manipulated via specially designated row and column handle areas on the graphical user interface. In various embodiments, row and column headers may be used as row or column handle areas for the purposes of manipulating rows and columns. In various embodiments, rows and columns may be manipulated by dragging a selected area, e.g., by first selecting a plurality of rows or columns via mouse or keyboard operations, and then dragging the selected region from one location to another on the graphical user interface. In one embodiment, rows or columns may be manipulated in a variety of ways, including dragging row and column headers, as well as dragging non-header regions such as a selected region on the display.

FIG. 31 illustrates an exemplary structured document display area in accordance with one embodiment. The display area comprises a column header area 3102 that may be manipulated to resize or reorder columns, or restructure one or more column hierarchies. The display area further comprises a row header area 3108 that may be manipulated to resize or reorder rows, or restructure one or more row hierarchies. In the exemplary embodiment of FIG. 31, the column header area 3102 comprises expand/collapse icons 3104, 3106 for the columns, whereas the expand collapse icons for rows 3110 are displayed outside of the row header area.

Text—JSON and XML—FIG. 32

Figure 32A:
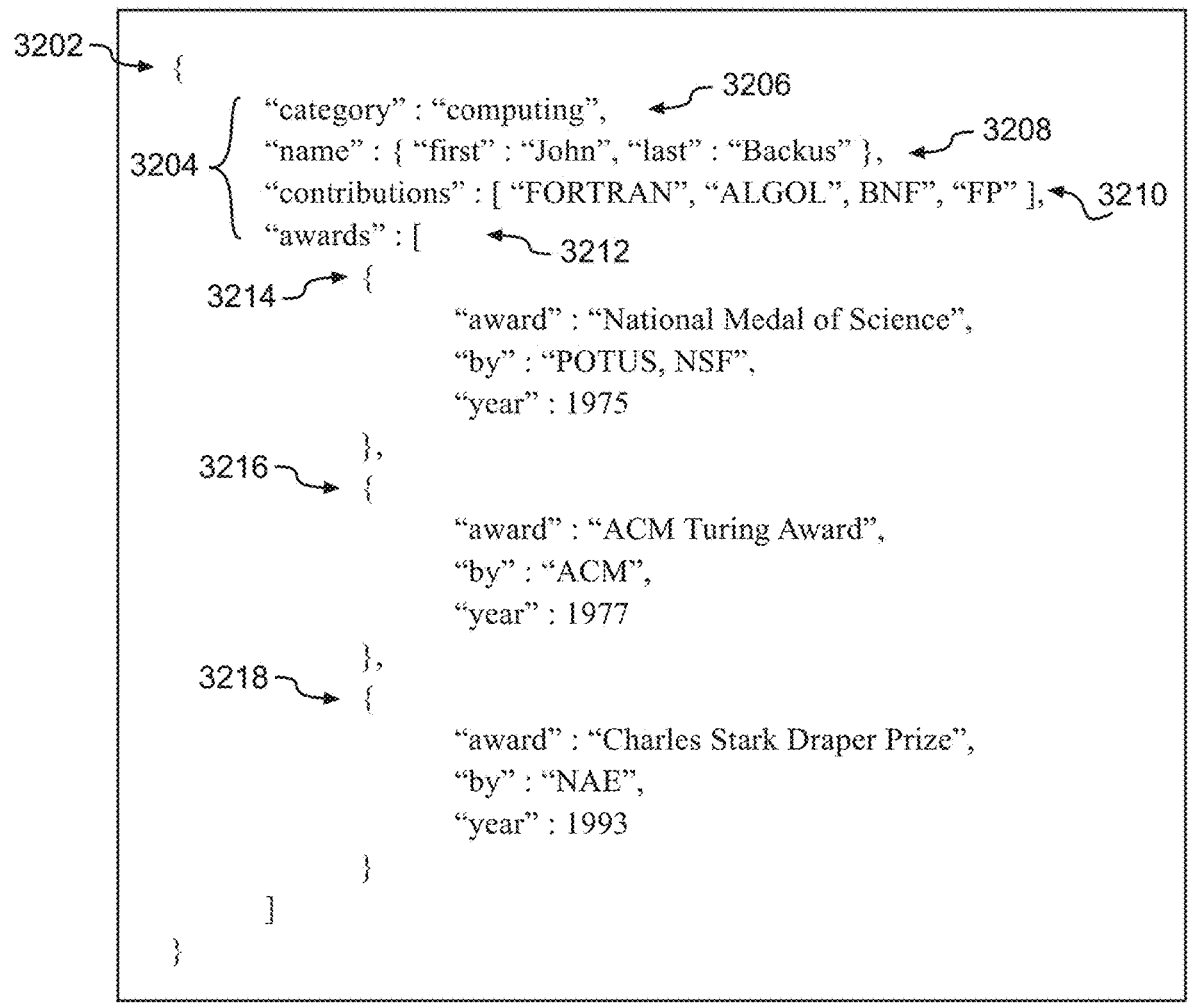
FIG. 32A illustrates an exemplary JSON document.

FIG. 32A illustrates an exemplary JSON document 3202 consisting of four name-value pairs 3204. The values include a string of text 3206, a JSON document 3208 consisting of two name-value pairs, an array of textual values 3210 and an array 3212 of JSON documents 3214, 3216, 3218 each containing three name-value pairs.

The conventional approach to manually creating or editing a JSON, XML or other hierarchical document involves the use of a conventional text editor and a tedious process of typing and keeping track of lexical elements such as braces, quotation marks, colons, etc. in order to properly describe the structure of the document.

Figure 32B:
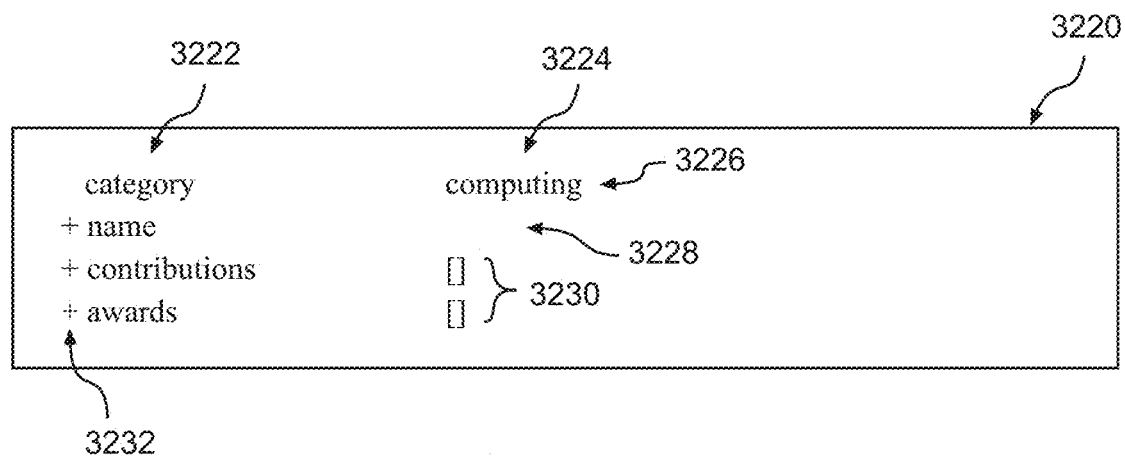
FIG. 32B-FIG. 32E illustrate the document of FIG. 32A expressed in a hierarchical grid format.

FIG. 32B illustrates the JSON document of FIG. 32A expressed as a structured text document. In the exemplary embodiment of FIG. 32B, the display area 3220 contains two columns 3222, 3224. An icon 3232 on an item, node, line, or row denotes whether the row has any children. In the exemplary embodiment of FIG. 32B, clicking on the icon 3232 with a mouse or other pointing device would alternately expand and collapse the row to show or hide its children, respectively.

In the exemplary embodiment of FIG. 32B, each row represents a name-value pair. The names are displayed in the first column 3222, while the values are represented in the second column 3224. For each name in the first column 3222, if the corresponding value is of a basic type such as text or number, the value appears in the corresponding cell 3226 in the second column. If the value is an array, the corresponding cell in the second column displays square brackets 3230. If the value is another JSON document, the corresponding cell in the second column is left blank 3228.

Figure 32C:
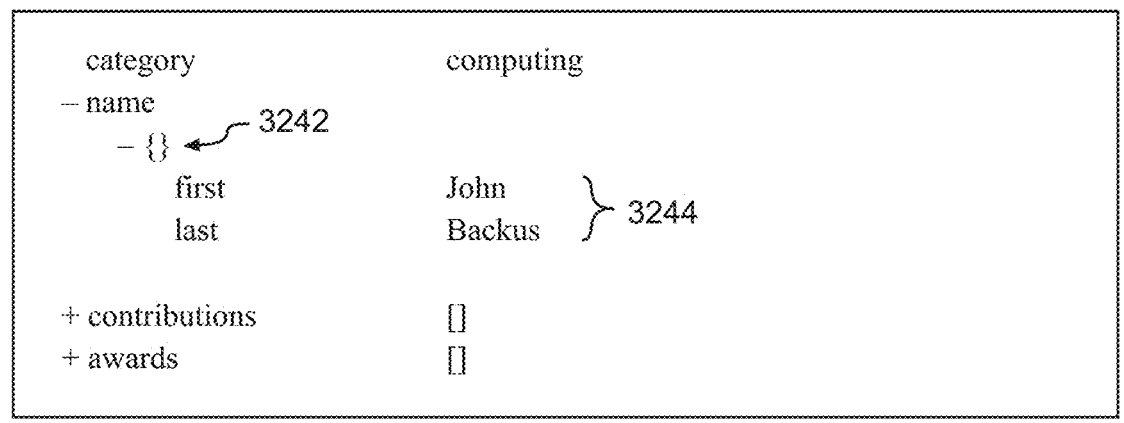

FIG. 32C illustrates the exemplary structured text document in accordance with one embodiment. One of the rows has been fully expanded. In the exemplary scenario of FIG. 32C, the expanded row corresponds to a name-value pair wherein the value is a JSON document 3242 containing two name-value pairs 3244. The name-value pairs 3244 are expressed as child rows of a row 3242 representing the JSON document. A pair of braces on the row 3242 indicates that the row represents a JSON document.

Figure 32D:
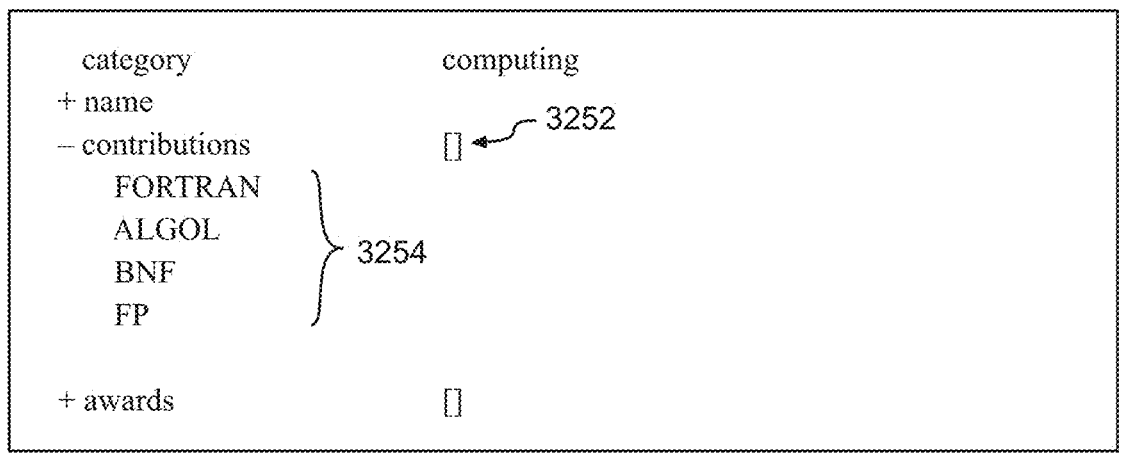

FIG. 32D illustrates the exemplary structured text document in accordance with one embodiment. Another of the rows has been expanded. In the exemplary scenario of FIG. 32D, the expanded row corresponds to a name-value pair wherein the value is an array 3252 of textual values 3254.

Figure 32E:
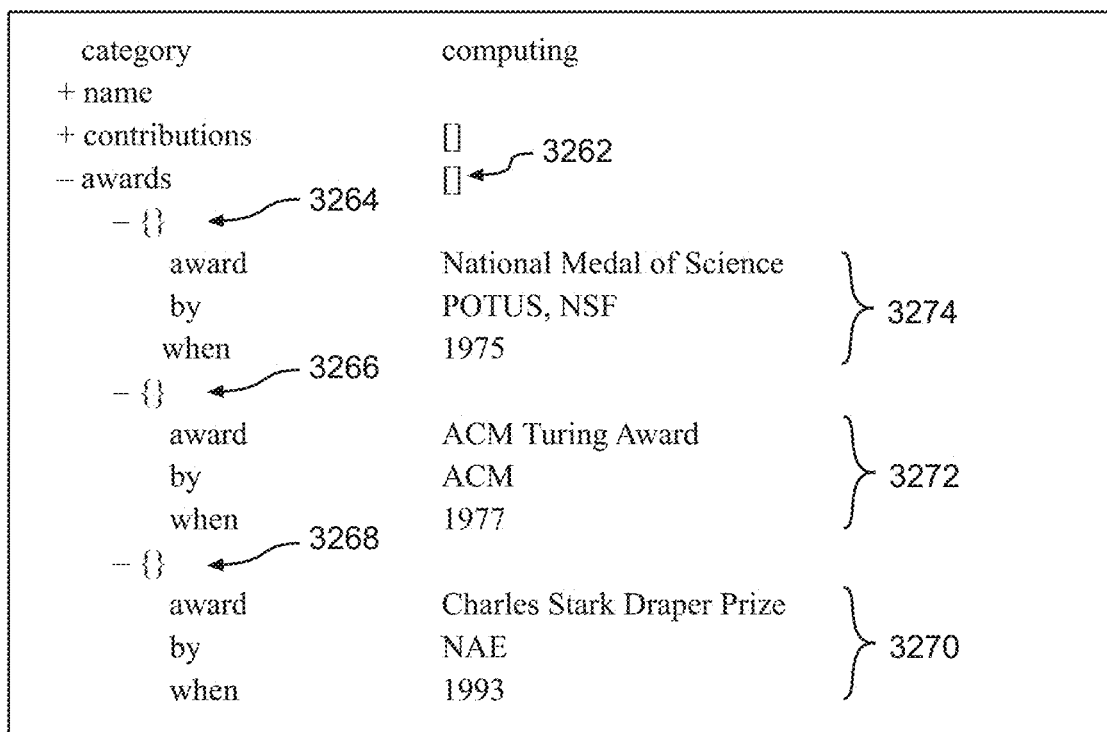

FIG. 32E illustrates the exemplary structured text document in accordance with one embodiment. Another of the rows has been fully expanded. The expanded row corresponds to a name-value pair wherein the value is an array 3262 of three JSON documents 3264, 3266, 3268, each containing three name-value pairs 3274, 3272, 3270.

The presence of a square bracket or array icon in the second column may help distinguish certain cases from one another. For example, in the exemplary embodiment of FIG. 32B, a name-value pair 3228 comprises a JSON document 3242 as value (FIG. 32C). To change the value from a JSON document to an array consisting of a single JSON document, a user may place an array icon in the second column of the row 3228.

In various embodiments of the present invention, editing hierarchical information such as a JSON, XML, or other hierarchical document may proceed without the need for conventional lexical elements such as braces, quotation marks, etc. Much of the editing beyond entering data may proceed via drag-and-drop manipulations of rows, columns and cells in a manner analogous to the exemplary embodiments described elsewhere in the present disclosure, as well as the embodiments described in the patent application Ser. No. 14/492,034.

In the exemplary embodiments of FIGS. 32B-E, icons in the form of square brackets 3230 and braces 3242 denote the type of the values being represented. In some cases the icons may be redundant 3242, 3252, 3262, 3264, 3266, 3268, and may be employed to help a human reader make sense of the information more easily. Where the relevant information can be deduced by an examination of the structured document, embodiments may fill in such icons automatically to simplify the editing process and make the resulting structure more readable.

In one embodiment, a structured document representing JSON, XML or other hierarchical data may have more than two columns and may allow data, including textual and numerical information, to be placed in cells in any column or row for easy manipulation during editing. The embodiment may provide feedback to the user as to whether or not the information represented in the structured document represents a valid JSON, XML or other format.

In various embodiments, a structured text document such as the exemplary documents of FIGS. 32B-E may be automatically generated from a conventional JSON document such as the exemplary document of FIG. 32A. Conversely, in various embodiments, a conventional JSON document such as the exemplary document of FIG. 32A may be generated automatically from a structured text document such as the exemplary document of FIGS. 32B-E. The parsing of a JSON document to generate a structured text version or the generation of a JSON document from a structured text version may be implemented using conventional techniques that readily suggest themselves to such skilled persons having the benefit of this disclosure, in light of what is known in the relevant arts.

The discussion in connection with FIGS. 32A-E has been in terms of JSON data and documents. This is not to be construed as limiting in any way. Many other types of data, including other types of hierarchical information (e.g., XML, HTML, JavaScript, structured programming languages such as C, C++, and Java, etc.), may be represented and edited in a manner analogous to the exemplary scenarios above.

In various embodiments, the present invention comprises a combination of the above-described methods, apparatus and means, together with none, or a plurality of other methods, apparatus and means described elsewhere in this disclosure and in the patent application Ser. No. 14/492,034. Other combinations are possible and readily suggest themselves to such skilled persons having the benefit of this disclosure, in light of what is known in the relevant arts.

Text—Range Structural Element—FIG. 33

In various embodiments, one or more types of structural elements or structural units may be added to an otherwise conventional block of textual information such as the exemplary block of text in FIG. 1.

Figure 33A:
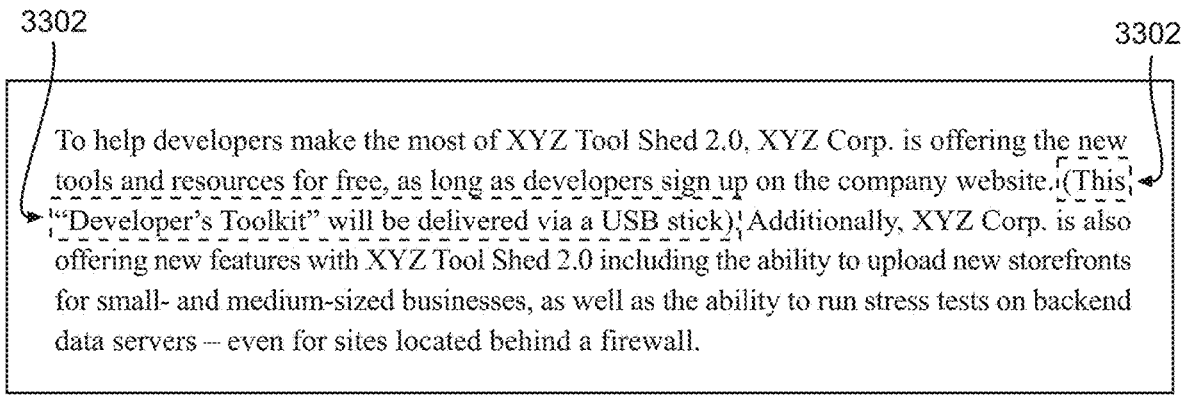
FIG. 33A and FIG. 33B illustrate a scenario wherein a range structural element is added to a conventional block of textual information.

FIG. 33A illustrates an exemplary scenario in accordance with one embodiment. A block of textual information is being displayed on a graphical user interface, and a portion of the text has been selected 3302. A user issues a command (e.g., by selecting an appropriate menu item) instructing the system to turn the selected text into a structural unit.

Figure 33B:
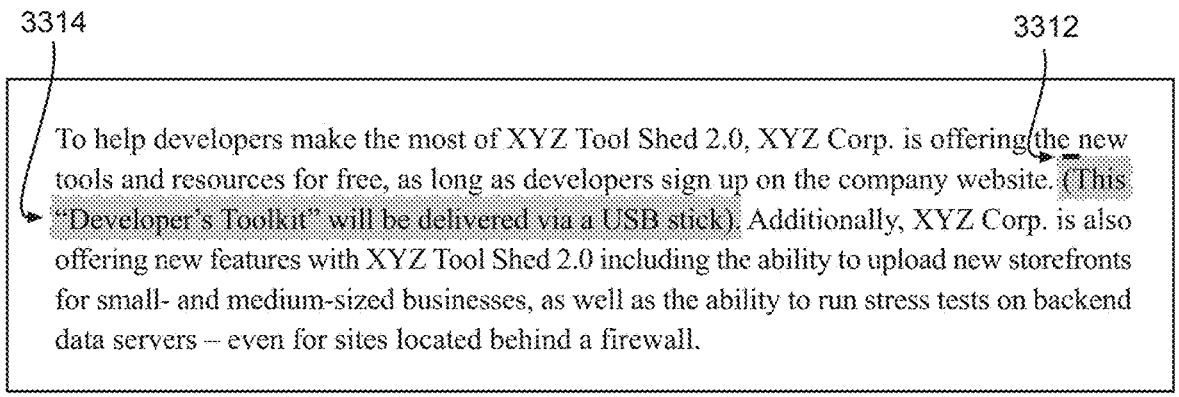

FIG. 33B illustrates the result. In response to the user command, the selected text 3302 is converted to a range structural element or range structural unit, and is visually shaded 3314 to indicate the range or scope of the structural unit. An icon 3312 associated with the structural unit indicates that the unit is in an expanded state. In the exemplary embodiment of FIG. 33B, clicking on the icon 3312 with a mouse or other pointing device would cause the structural unit 3314 to collapse/expand alternately.

Figure 33C:
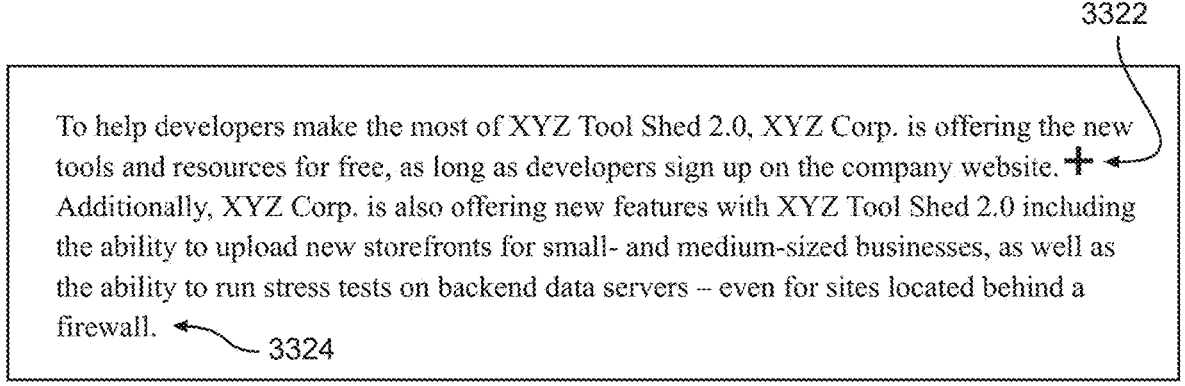
FIG. 33C and FIG. 33D illustrate a scenario, in accordance with alternative embodiments, wherein a range structural element is collapsed.

FIG. 33C illustrates the result of collapsing the structural unit 3314 in accordance with one embodiment. In response to clicking on the expand/collapse icon 3312, the structural unit has been collapsed, hiding its textual content. The expand/collapse icon has changed shape 3322 to provide visual notification of the existence of hidden content. In the illustrative embodiment of FIG. 33C, collapsing a structural unit causes the text of the structural unit to be removed from the display, possibly resulting in a shifting of the subsequent textual information on the display 3324.

Figure 33D:
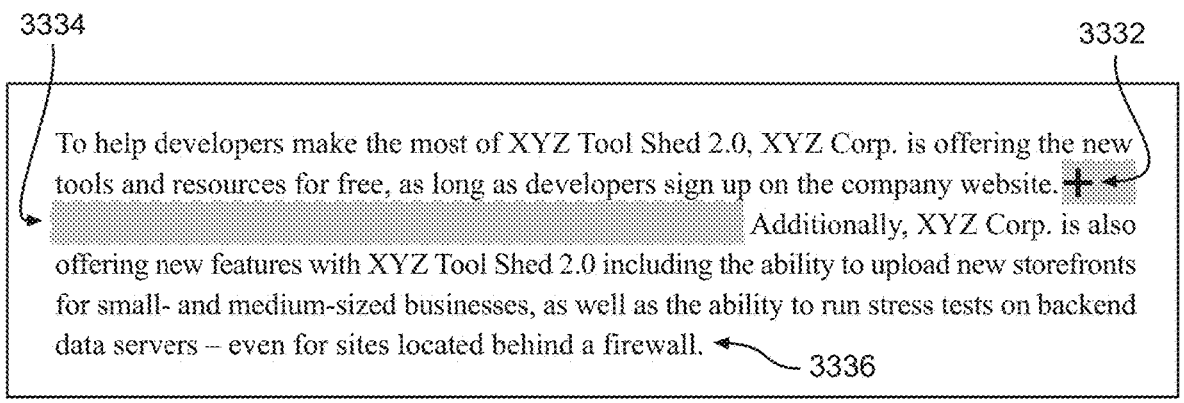

FIG. 33D illustrates an alternative approach in accordance with one embodiment. In response to clicking on the expand/collapse icon 3312 (FIG. 33B), the structural unit has been collapsed 3332, hiding its textual content. In the exemplary scenario of FIG. 33D, collapsing a structural unit only removes the textual content of the structural unit. The structural unit still takes up the same amount of space on the display 3334. As a result, the subsequent textual information on the display is not shifted 3336.

In various embodiments, hovering a mouse pointer over the icon associated with a structural unit 3322 (FIG. 33C) may result in the display of the content of the structural unit in a pop up view. In one embodiment, a pop up view may be the primary, or only, means of viewing, or otherwise gaining access to, the textual content of a structural unit. In various embodiments, pop up views may provide a convenient means for a quick glimpse into information that would otherwise require more elaborate user interface interactions to view or modify.

Figure 33E:
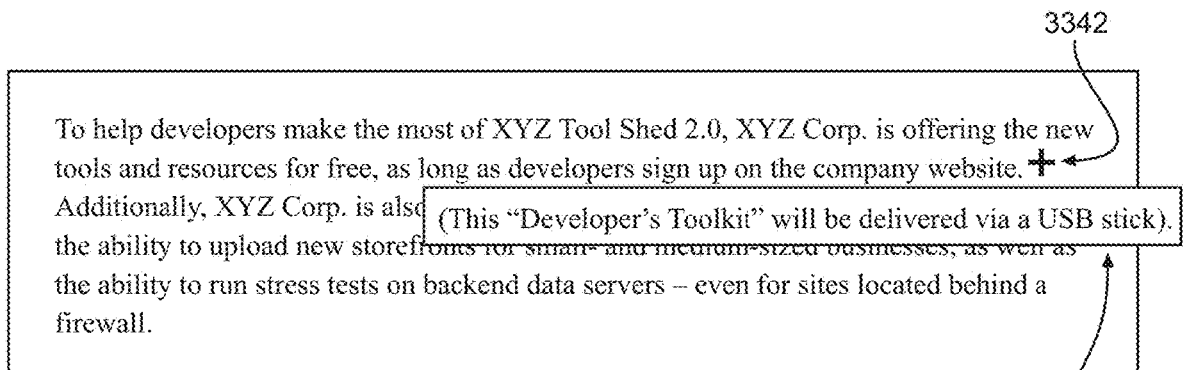
FIG. 33E and FIG. 33F illustrate pop up views in connection with range structural elements.

FIG. 33E illustrates an exemplary scenario in accordance with one embodiment. Here, hovering over a structural unit while in a collapsed state 3342 (e.g., hovering the mouse pointer over its expand/collapse icon) has resulted in the display of a pop up view 3344 providing a quick view of the content of the structural unit.

In various embodiments, the content in a pop up view may be edited directly in a manner analogous to the exemplary embodiments described in connection with FIGS. 26C, D. In various embodiments, a pop up view 3344 may be resized, e.g., by dragging one or more of its edges, or by dragging one or more of the edges of an editor operable to edit its content. A resized pop up view may be subsequently displayed with the new, user-specified, dimensions.

Figure 33F:
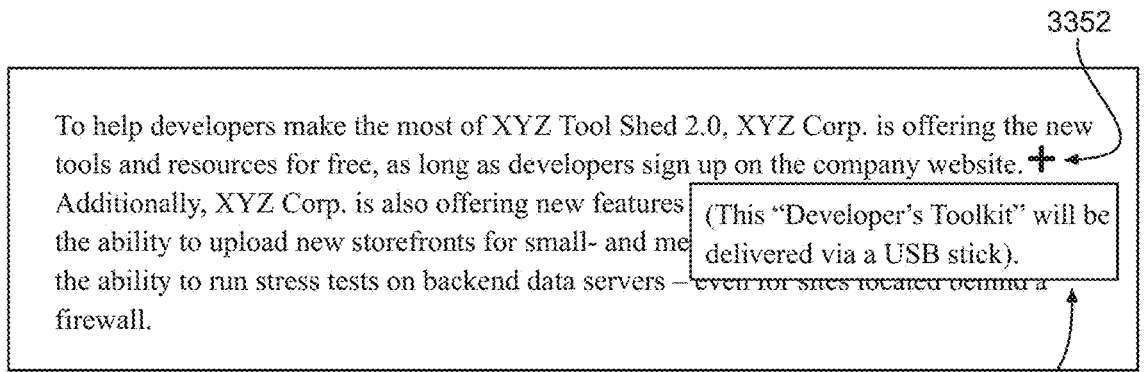

FIG. 33F illustrates an exemplary scenario in accordance with one embodiment. A pop up view 3344 for a structured unit 3342 has been modified by a user both in size and in position 3354 by dragging one or more of its edges.

Text—Range Structural Hierarchy—FIG. 33

In various embodiments, range structural units may be nested to form hierarchies. A hierarchy of range structural units may be referred to as a range structural hierarchy.

Returning to the exemplary scenario of FIG. 33C, the user selects a portion of the content on the graphical user interface, including the structural unit 3322 and a portion of the text surrounding it, and instructs the system to form a structural unit from the selected content (e.g., by selecting an appropriate menu item).

Figure 33G:
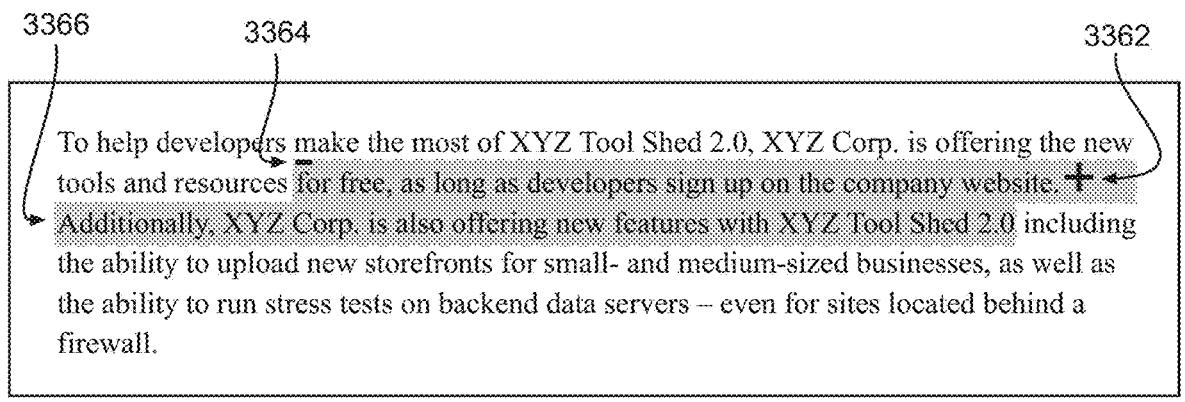
FIG. 33G and FIG. 33H illustrate a scenario involving a range structural hierarchy.
Figure 33H:
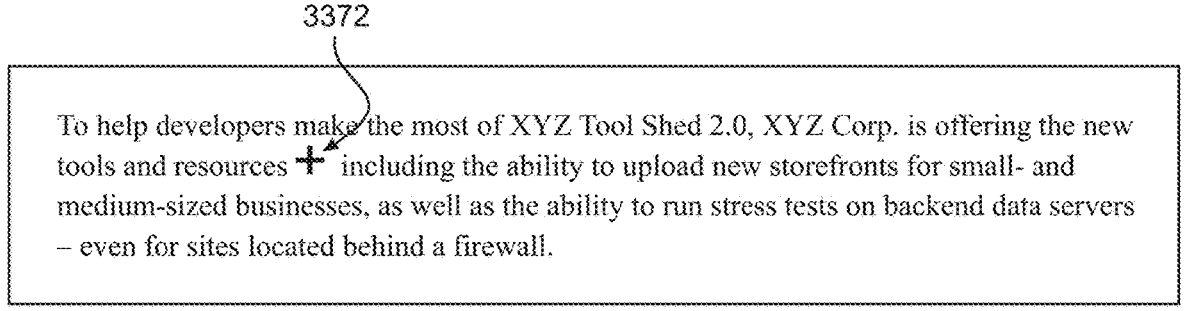

FIG. 33G illustrates the result in accordance with one embodiment. In the illustrative scenario of FIG. 33G, the new structural unit 3366 is shaded to provide visual feedback as to its range or extent. The structural unit 3366 includes another structural unit that is currently in a collapsed state 3362. An icon 3364 associated with the new structural unit 3366 indicates that the new structural unit is in an expanded state. Clicking on this icon 3364 would cause the new structural unit 3366 to collapse 3372 (FIG. 33H), hiding its contents.

In this exemplary scenario, a portion of the textual content surrounding an existing structural unit 3322 (FIG. 33C) was selected and converted to a new structural unit 3366 (FIG. 33G). As a result, the original structural unit 3322 became a child unit in a nested structure, and the new structural unit became the parent unit. Alternatively, in various embodiments, a subset of the content of an existing structural unit may be selected and converted to a new structural unit. As a result, the existing structural unit would become the parent unit in a nested structure, and the new structural unit would become the child unit.

Figure 33J:
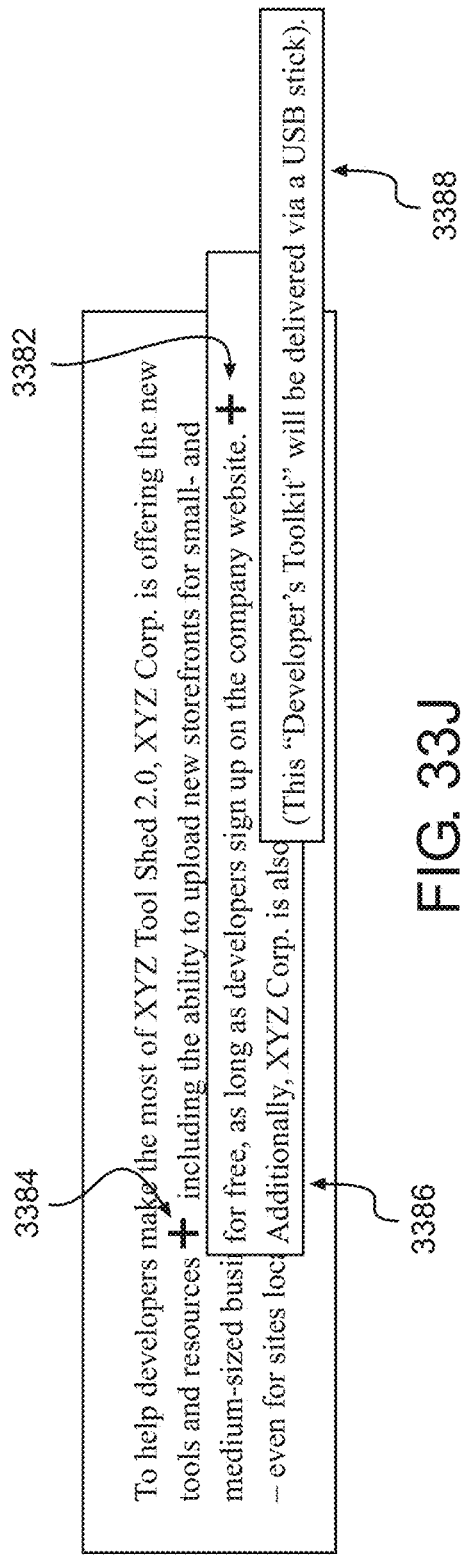
FIG. 33J illustrates nested pop up views in connection with a range structural hierarchy.

In various embodiments, a user may peek into the content of nested structural units in a manner analogous to the scenarios described in connection with FIG. 27C. FIG. 33J illustrates nested pop up views in accordance with one embodiment. In the exemplary scenario of FIG. 33J, a user has hovered a mouse pointer over the expand/collapse icon 3384 of a parent structural unit. In response, a pop up view 3386 is displayed showing the content of the collapsed parent structural unit 3384. In the exemplary scenario of FIG. 33J, the parent structural unit contains a child structural unit 3382. The user has subsequently hovered the mouse pointer over the expand/collapse icon 3382 of the child structural unit. In response, a second, nested, pop up view 3388 is displayed, showing the content of the collapsed child structural unit 3382.

Text—Range Structural Element—Paragraphs—FIG. 34

FIG. 34A illustrates an exemplary scenario in accordance with one embodiment. The user has selected a portion of the textual content in two paragraphs and has instructed the system (e.g., via the selection of an appropriate menu item) to turn the selection into a structural unit. In response, the selected text has been converted into one structural unit 3404 spanning textual content in two paragraphs. The structural unit is shaded to provide visual feedback to the user. An icon 3402 associated with the structural unit 3404 is operable to collapse/expand the structural unit.

FIG. 34B is a continuation of the exemplary scenario of FIG. 34A. The user has selected the expand/collapse icon 3402 associated with the structural unit 3404 (e.g., by clicking on it). In response, the structural unit 3404 has been collapsed (FIG. 34B). The expand/collapse icon 3402 has changed shape 3412 as a visual indication of the existence of hidden content.

In the exemplary scenario of FIGS. 34A, B, collapsing the structural unit 3404 results in the two paragraphs being blended together and displayed as one paragraph (FIG. 34B). In this exemplary scenario, the resulting paragraph may represent a summary of the information in the original two paragraphs.

In various scenarios, it may be desirable to keep the original paragraphs separate. FIG. 34C illustrates an exemplary scenario in accordance with one embodiment. Again, the user has selected a portion of the textual content in two paragraphs and has instructed the system to turn the selection into structural units (e.g., via the selection of an appropriate menu item). In response, the selected text has been converted into two structural units 3428, 3426, respecting the paragraph boundaries of the original selected text.

The structural units are shaded to provide visual feedback to the user. An icon 3422, 3424 associated with each of the structural units 3428, 3426 is operable individually to collapse/expand its associated structural unit.

FIG. 34D is a continuation of the exemplary scenario of FIG. 34C. The user has selected the expand/collapse icons 3422, 3424 associated with the structural units 3428, 3426 in turn (e.g., via clicking on the icons in turn). In response, the structural units 3428, 3426 have been collapsed (FIG. 34D). The expand/collapse icons 3422, 3424 have changed shape 3432, 3434 to indicate the existence of hidden content.

In the exemplary scenario of FIGS. 34C, D, paragraph boundaries are respected and structural units do not extend beyond a single paragraph. Even though a user may select a region of text that includes textual content from more than one paragraph, and may then issue a command to turn the selection into structural units, the operation is treated as a shortcut for selecting the appropriate text in each paragraph separately and converting that selection into a separate structural unit.

Text—Block Structural Element—FIG. 35

In the exemplary embodiments of FIGS. 33A, B, a structural unit is somewhat analogous to a formatted or styled range or region of text in a conventional word processor. In both cases, the user selects a portion of the textual content in a paragraph, and then applies styling to the selected region (e.g. by selecting an appropriate menu item). In a conventional word processor, such styling may include setting a different text color, or underlining the text in the selected region. In the exemplary embodiment of FIG. 33B, such styling involves creating a range structural unit. In both cases, editing the text in a styled region may extend or shrink the extent of the styled region to accommodate the edits or changes to the text.

In contrast to styling regions of text, such as text color or underlining, conventional word processors may provide means to add formatting to entire paragraphs. Examples of such styling include indentation and bullet points. Similarly, in contrast to range structural elements, embodiments may provide structural elements to add structure to entire paragraphs. The latter type of structural elements may be referred to as block structural elements or block structural units.

FIG. 35A illustrates an exemplary scenario in accordance with one embodiment. The user has placed a text-input cursor somewhere in the second paragraph, and has instructed the system to convert the paragraph into a block structural element or a block structural unit (e.g., by selecting an appropriate menu item). In response, the second paragraph has been converted to a block structural unit. An icon 3502 is associated with the new structural unit. In the exemplary embodiment of FIG. 35A, since the entire paragraph is converted to a structural unit, the paragraph is not shaded. Rather, the location of the expand/collapse icon 3502 serves as an indicator that the entire paragraph is a structural unit. The expand/collapse icon 3502 is operable to show/hide respectively the content of the structural unit.

FIG. 35B illustrates a continuation of the exemplary scenario of FIG. 35A in accordance with one embodiment. The user has issued a command to hide the structural unit (e.g., by clicking on its associated expand/collapse icon 3502). In response, the structural unit is collapsed, hiding most of the paragraph. The first line of the paragraph however remains visible, ending with a special icon or marker such as an ellipsis 3514 to provide additional visual indication that the rest of the paragraph is hidden. The expand/collapse icon 3502 associated with the structural unit has changed shape 3512 to indicate the current state of the structural unit.

In the illustrative embodiment of FIG. 35B, a collapsed structural unit 3512 continues to display the first line of the paragraph to provide a hint, reminder, or summary, as to the content of the hidden paragraph. In various scenarios, it may be useful to display more information than just the first line.

FIG. 35C illustrates an exemplary scenario in accordance with one embodiment. In the exemplary embodiment of FIG. 35C, the user is provided with the ability to define one or more specially designated regions of text 3522, 3524. In the illustrative scenario of FIG. 35C, the user has selected two regions of text 3522, 3524 one after another and has instructed the system to treat those regions as specially designated (e.g., by selecting an appropriate menu item). In response, the specially designated regions are shaded 3522, 3524 to indicate their special status.

FIG. 35D illustrates the result of collapsing the structural unit of FIG. 35C in accordance with one embodiment. The structural unit has been collapsed as indicated by its expand/collapse icon 3532. The first line of the paragraph is displayed, followed by an ellipsis 3536 to indicate the existence of hidden text. Below the first line, the contents of the specially designated regions of text 3522, 3524 are displayed 3534. The addition of the specially designated content 3534 may provide a more detailed, or more useful, summary of the hidden paragraph when the structural unit is in a collapsed state.

Text—Block Structural Hierarchy—FIG. 35

In various embodiments, block structural units such as described in connection with FIGS. 35A, B may be indented or shifted to the right or left on the graphical user interface in a manner analogous to paragraph and bullet indentation in a conventional word processor. Such indentations may be employed to alter the visual appearance of the text on a page or graphical user interface, thereby suggesting certain relationships between the indented paragraph and the paragraphs surrounding it.

In various embodiments, means are provided to establish parent-child relationships between two or more block structural units to form hierarchies. A hierarchy of block structural units may be referred to as a block structural hierarchy.

Continuing with the exemplary scenario of FIG. 35 B, a user selects a portion of the text in the two paragraphs (e.g., via a continuous drag of a mouse from one paragraph to the next). The user then instructs the system to convert the paragraphs containing the selected text into a structural hierarchy.

FIG. 35E illustrates the result in accordance with one embodiment. The first paragraph is converted to a structural unit as indicated by an expand/collapse icon 3542 associated with it. The second paragraph, which had already been converted to a structural unit prior to this operation 3512 (FIG. 35B), is now a child structural unit 3544 of the first paragraph's structural unit 3542. The second paragraph or child structural unit is shifted to the right 3544 to provide visual indication of its parent-child relationship with the paragraph 3542 above it.

The parent structural unit may be collapsed/expanded to hide/show respectively its textual content as well as any child structural units that it may contain. Continuing with the illustrative scenario of FIG. 35E, the user clicks on the expand/collapse icon 3542 to hide the content and the children of the parent structural unit. FIG. 35F illustrates the result in accordance with one embodiment. The parent structural unit 3542 has been collapsed, hiding its content.

In the exemplary scenario of FIGS. 35A, B, E, F, one paragraph was already converted to a structural unit 3502 prior to the operation to create a structural hierarchy involving two paragraphs 3542, 3544.

In one embodiment, it is possible to select two paragraphs, neither of which has yet been converted to a structural unit, and create a first structural unit containing both paragraphs. A user may then select one of the paragraphs in the first structural unit and convert the paragraph to a second structural unit. As a result, the second structural unit becomes a child of the first structural unit.

In one embodiment, selecting two paragraphs, neither of which has yet been converted to a structural unit, and instructing the system to create structural units from them would result in the creation of two independent structural units, one for each paragraph. No explicit parent-child relationship is created as a result of this operation.

In various embodiments, creating structural hierarchies as described in connection with FIGS. 35A, B, E, F would result in the topmost included paragraph becoming the parent structural unit and the remaining included paragraphs becoming children of the parent unit, regardless of whether the topmost included paragraph is a structural unit prior to the operation. Other embodiments are possible and will readily suggest themselves to such skilled persons having the benefit of this disclosure, in light of what is known in the relevant arts.

Text—Miscellaneous

The various structural elements described herein and elsewhere in this disclosure and in the disclosure of the patent application Ser. No. 14/492,034 may be combined. In one embodiment, a block structural unit such as the exemplary parent block structural unit of FIG. 35E may contain one or more range structural units such as the exemplary range structural units of FIGS. 33B, 33G. In one embodiment, a cell in a grid such as the exemplary grid of FIG. 26C may contain one or more range structural units and/or block structural units such as the exemplary structural units of FIGS. 33-35. In one embodiment, a cell on a canvas may contain one or more range structural units and/or block structural units.

In the exemplary embodiments of FIGS. 33-35, structural elements were added to a block of conventional text in a manner analogous to adding styling to text in conventional word processors. The ability to easily add and remove structural elements to and from a block of text respectively (e.g., via simple select and click operations) may make it easier to edit textual information by making it possible to hide/show various parts of the text selectively. The ability to hide/show various parts of the text may also make it easier to read the text by enabling the reader to focus on the primary information embedded in the text, together with the ability to drill down to more detailed information as needed.

A structured block of text destined for static media (e.g., to be printed on paper) may be fully expanded prior to the output or export operation (e.g., prior to printing). A structured block of text destined for dynamic media (e.g., to be displayed as part of a dynamic web page or other electronic media), may include means for expanding/collapsing its various structural elements in its output or exported form.

In one embodiment, a default expand/collapse state may be specified for each of the structural elements prior to the output or export operation. In this way, an author may specify a preferred or recommended display format for the document. In various embodiments, the expansion state of individual structural elements may be persisted across sessions, so that an author or reader of the document may pick up where they left off at the end of the last session, i.e., with the structural elements in the same expand/collapse state as the end of the previous reading session.

Conclusion, Ramifications, and Scope

Accordingly the reader will see that structured documents of various embodiments may be used to organize information in a form that is a more transparent representation of ideas and reduces the wall-of-text problem, that relies less on parsing long blocks of text and more on the visual organization of information, that may be easier to edit and more organized than diagrams, that may be used to model abstract knowledge, that is informal, flexible and easy to use. Other advantages of one or more aspects include: to provide a method of organizing information that makes it easier to organize, manipulate, express and explore ideas, that enables the editing and manipulation of ideas like physical game pieces on a game board, that allows for extensive editing easily, that reduces visual clutter by enabling the user to show or hide various pieces of information on command.

Although the description above contains many specificities, these should not be construed as limitations on the scope, but rather as illustrations of several embodiments thereof. Many other variations are possible. For example, the display area 410 (FIG. 4) may comprise a window in a graphical user interface (GUI) environment, a GUI pane, a physical surface such as a computer screen, a wall or a table, etc.; what is displayed may be in the form of spatial or holographic images, projections on a surface such as a wall or a table, or projections in a virtual- or augmented-reality device and/or headset, or directly on the retina, or via electromagnetic signals delivered to the brain or the nervous system through an interface, including an artificial interface. Touch, gestures, head/body orientation, eye tracking, sound, voice and other means, including electronic interface with the brain or nervous system, may be used to complement, or instead of, mouse or keyboard operations.

A structured document may be represented in 2- or 3-dimensional, or other formats. A structured document may contain a table rather than a tree, or a plurality of tables and trees, or may be a canvas that provides more freedom in the placement of information and/or that may be folded locally to hide and show information; the structure of the document may be represented in graph format rather than trees, etc. A cell in a grid or on a canvas may show none, one, or a plurality of lines of text and/or other information on the display. In one embodiment, a structured document may be represented as a multi-field bullet list, with the hierarchical structure of rows represented as indented bullet points and the cells on a row separated visually via whitespace characters such as the tab character. In one embodiment, a structured document may be represented as a conventional block of text with structural elements embedded in it.

Though various aspects and operations are described with reference to specific user actions and editing outcomes, it is to be understood, however, that the various aspects and operations are not limited to the specific details provided, and numerous other variations may be provided by embodiments. Accordingly, the scope should be determined not by the embodiments illustrated, but by the appended abstract and the appended claims and their legal equivalents.

The steps of a method or algorithm or the functions of a module, unit or block described in connection with the embodiments disclosed herein can be embodied directly in hardware, in a software module executed by a processor, or in a combination of the two. Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

Various illustrative embodiments have been described. However, one of ordinary skill in the art will see that additional embodiments are also possible and within the scope of those embodiments. For example, while the embodiments described above refer to particular features, the scope of this invention also includes embodiments having different types of features, embodiments having different combinations of features and embodiments that do not include all of the described features. Accordingly, the present invention is not limited to only those embodiments described above.

Figure 36:
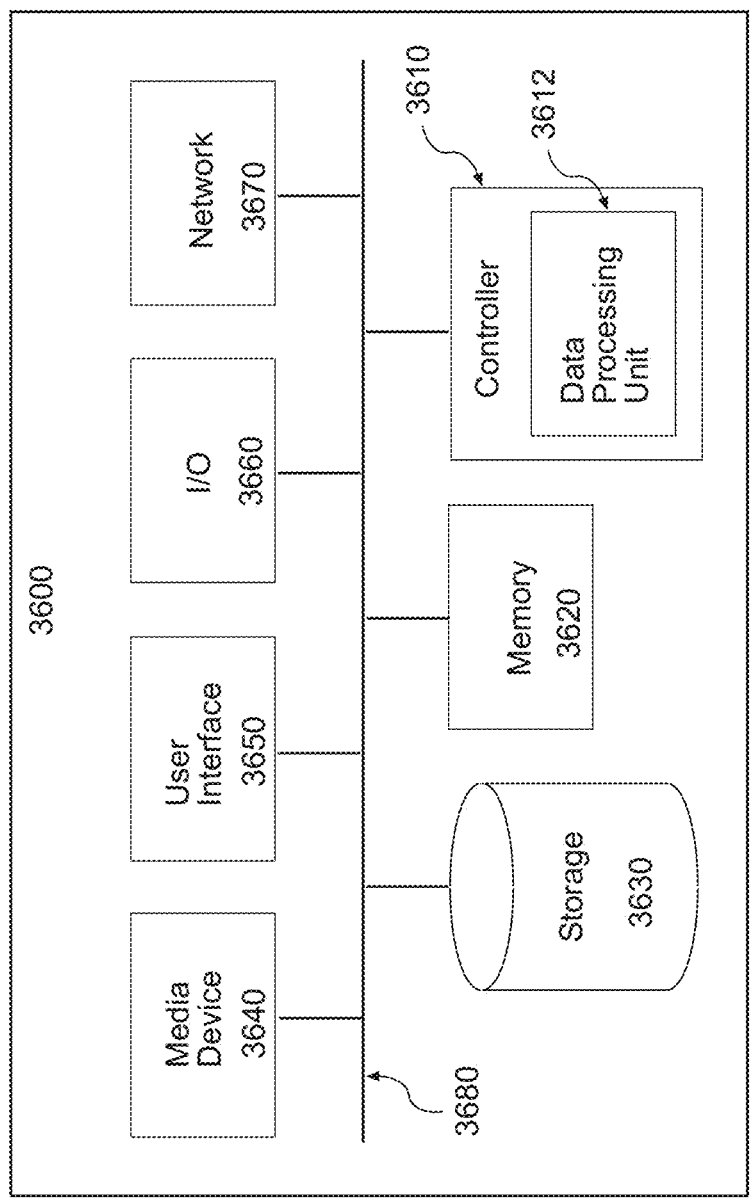
FIG. 36 shows a block diagram of one embodiment of a computer system upon which one or more aspect of the embodiments may be implemented.

Computing System—FIG. 36

Various embodiments are realized in electronic hardware, computer software, or combinations of these technologies. The various components of the embodiments may be located at one or more devices. The various modules and components may be combined, rearranged, or their functionality broken out into other modules and components in numerous different ways as appropriate to a particular embodiment.

FIG. 36 shows a block diagram of one embodiment of a computer system 3600 upon which embodiments of the present invention may be implemented and carried out. The computer system 3600 is configured to be suitable for practicing the embodiments by providing a data processing unit 3612 that allows the user to create, edit, and maintain structured documents in a GUI environment.

The computer system 3600 includes a controller 3610, a memory 3620, storage 3630, a media device 3640, a user interface 3650, an input/output (I/O) interface 3660, and a network interface 3670. These components are interconnected by a common bus 3680. Alternatively, different connection configurations can be used, such as a star pattern with the controller at the center.

The controller 3610 is a programmable processor and controls the operation of the computer system 3600 and its components. The controller 3610 loads instructions from a computer-readable storage medium such as the memory 3620 or an embedded controller memory (not shown) and executes these instructions to control the system. In its execution, the controller 3610 provides an integrated document editor as a software system. Alternatively, this service can be implemented as separate components in the controller 3610 or the computer system 3600.

Memory 3620 stores data temporarily for use by the other components of the computer system 3600, such as for storing document structure information. In one embodiment, memory 3620 is implemented as RAM. In one embodiment, memory 3620 also includes long-term or permanent memory, such as flash memory and/or ROM.

Storage 3630 stores data temporarily or long term for use by the other components of the computer system 3600. In one embodiment, storage 3630 is a hard disk drive. Storage 3630 stores information for use by the data processing unit 3612, such as document content or document structure information. Storage 3630 also stores data generated by the data processing unit.

The media device 3640 receives removable media and reads and/or writes data to the inserted media. In one embodiment, the media device 3640 is an optical disc drive.

The user interface 3650 includes components for accepting user input from a user of the computer system 3600 and presenting information to the user. In one embodiment, the user interface 3650 includes a keyboard, a mouse, audio speakers, and a display. The controller 3610 uses input from the user to adjust the operation of the computer system 3600.

The I/O interface 3660 includes one or more I/O ports to connect to corresponding I/O devices, such as external storage or supplemental devices (e.g., a printer or a PDA). In one embodiment, the ports of the I/O interface 3660 include ports such as: USB ports, PCMCIA ports, serial ports, and/or parallel ports. In another embodiment, the I/O interface 3660 includes a wireless interface for communication with external devices wirelessly.

The network interface 3670 includes a wired and/or wireless network connection, such as an RJ-45 or "Wi-Fi" interface (802.11) supporting an Ethernet connection.

The computer system 3600 includes additional hardware and software typical of computer systems (e.g., power, cooling, operating system), though these components are not specifically shown in FIG. 36 for simplicity. In other embodiments, different configurations of the computer system can be used (e.g., different bus or storage configurations or a multi-processor configuration).

Exemplary embodiments have been described with reference to specific configurations. The foregoing description of specific embodiments and examples have been presented for the purpose of illustration and description only, and although the invention has been illustrated by certain of the preceding examples, it is not to be construed as being limited thereby.

What is claimed is:

1. A method of structured text processing by a graphical user interface generated by a computer system, the method comprising:

storing within a memory a data structure representing a grid including five or more rows, one or more columns and a plurality of cells, each row having a plurality of cells of the plurality of cells and each column having multiple cells of the plurality of cells, some cells of the plurality of cells each containing a sequence of characters of human-readable text, each cell being associated with a position in the grid in one of the one or more columns and one of the five or more rows, wherein the rows are visibly represented on the graphical user interface as a sequence of one or more visual cells, one or more cells displaying the sequences of human-readable text, wherein the five or more rows represented within the data structure include a parent row, a first child row, a second child row, a first row and a second row; and changing the memory to modify the data structure by dragging a visual representation of the parent row from one location to another on the graphical user interface, wherein, immediately prior to the dragging, (a) the data structure includes a digital representation of a parent-child association from the parent row to the first child row, and a digital representation of a parent-child association from the parent row to the second child row; and (b) a visual representation of the first row is displayed adjacent to a visual representation of the second row on the graphical user interface; and wherein, in response to the dragging, (a) the visual representations of the first row and the second row are no longer adjacent on the graphical user interface, and are separated from one another by a visual representation of at least the parent row or the first child row; and (b) the parent-child association from the parent row to the first child row is maintained, and the parent-child association from the parent row to the second child row is not maintained.

2. The method of claim 1, wherein the five or more rows comprise at least seven rows, including a third row and a fourth row; and wherein, prior to the changing, a visual representation of the third row and a visual representation of the fourth row on the graphical user interface are separated by at least a visual representation of the parent row; and wherein, in response to the dragging, the visual representations of the third row and the fourth row are separated by only a visual representation of the second child row.

3. The method of claim 1, the method further comprising:
storing a block of textual data of human-readable characters organized in a linear thread;
transforming the linear thread of the block of textual data into separate cellular information units, each comprising a subsequence of characters of human-readable text from the block of textual data;
wherein, the grid includes multiple columns, some cells of the plurality of cells each containing a cellular information unit of the cellular information units, each cell containing a cellular information unit associated with a position in relation to at least one other cell containing a cellular information unit according to a relationship between the content of the cellular information units of the cell and the at least one other cell, wherein the rows are visibly represented on the graphical user interface as a sequence of one or more visual cells, one or more cells displaying the cellular information units.

4. The method of claim 3, the method further comprising:
changing the memory to modify the data structure by:
dragging a first visual representation of a first subsequence of characters from one location to another on the graphical user interface, the first subsequence of characters being selected from a first source sequence of characters; and
performing a first operation selected from the group consisting of (i) changing a first cellular information unit of a first target cell having the first cellular information unit, wherein the first subsequence of characters is selected from a source other than the first target cell; and (ii) creating a first new cell in the grid; and wherein the performing a first operation is in response to the dragging a first visual representation.

5. The method of claim 4, the method further comprising:
changing the memory to modify the data structure by:
dragging a second visual representation of a second source cell from one location to another on the graphical user interface; and
performing a second operation selected from the group consisting of (i) creating a second new cell in the grid; (ii) changing a second cellular information unit of a second target cell having the second cellular information unit; and (iii) changing the position of a third target cell in the grid; and
wherein the performing a second operation is in response to the dragging a second visual representation.

6. The method of claim 5, wherein prior to the dragging a second visual representation of a second source cell, the plurality of cells includes a fifth cell and a fourth cell associated with adjacent positions in the grid; and
wherein, after the creating a second new cell or the changing the position of a third target cell, the fifth cell and the fourth cell are no longer associated with adjacent positions in the grid, and the position of the third target cell or the second new cell is in between the positions of the fifth cell and the fourth cell.

7. The method of claim 3, the method further comprising:
changing the memory to modify the data structure by:
dragging a second visual representation of a second source cell from one location to another on the graphical user interface; and
performing a second operation selected from the group consisting of (i) creating a second new cell in the grid; (ii) changing a second cellular information unit of a second target cell having the second cellular information unit; and (iii) changing the position of a third target cell in the grid; and
wherein the performing a second operation is in response to the dragging a second visual representation.

8. A method of structured text processing by a graphical user interface generated by a computer system, the method comprising:
storing within a memory a data structure representing a grid including three or more rows, one or more columns and a plurality of cells, each row having a plurality of cells of the plurality of cells and each column having multiple cells of the plurality of cells, some cells of the plurality of cells each containing a sequence of characters of human-readable text, each cell being associated with a position in the grid in one of the one or more columns and one of the three or more rows, wherein the rows are visibly represented on the graphical user interface as a sequence of one or more visual cells, one or more cells displaying the sequences of characters of human-readable text,
wherein the three or more rows represented within the data structure include a parent row, a first child row, and a second child row; and
displaying on the graphical user interface a user-selectable visual element adjacent to a visual representation of the parent row, in response to a first selecting the user-selectable visual element, expanding the parent row and displaying visual representations of the first child row and the second child row, wherein the visual representation of the first child row is displayed adjacent to the visual representation of the parent row on the graphical user interface, and wherein, immediately prior to the first selecting the user-selectable visual element, the parent row is not expanded, the visual representation of the first child row is not displayed on the graphical user interface, the visual representation of the second child row is displayed adjacent to the visual representation of the parent row on the graphical user interface, the data structure includes a digital representation of a parent-child association from the parent row to the first child row; and a digital representation of a parent-child association from the parent row to the second child row.

9. The method of claim 8, wherein the three or more rows comprise at least four rows, including a third child row;
wherein, immediately prior to the first selecting the user-selectable visual element, the data structure includes a digital representation of a parent-child association from the parent row to the third child row, a visual representation of the third child row being displayed on the graphical user interface; and
wherein, in response to the first selecting the user-selectable visual element, the visual representation of the third child row is no longer displayed on the graphical user interface.

10. The method of claim 8, the method further comprising:
storing a block of textual data of human-readable characters organized in a linear thread;
transforming the linear thread of the block of textual data into separate cellular information units, each comprising a subsequence of characters of human-readable text from the block of textual data;
wherein, the grid includes multiple columns, some cells of the plurality of cells each containing a cellular information unit of the cellular information units, each cell containing a cellular information unit associated with a position in relation to at least one other cell containing a cellular information unit according to a relationship between the content of the cellular information units of the cell and the at least one other cell, wherein the rows are visibly represented on the graphical user interface as a sequence of one or more visual cells, one or more cells displaying the cellular information units.

11. The method of claim 10, the method further comprising: changing the memory to modify the data structure by:
dragging a first visual representation of a first subsequence of characters from one location to another on the graphical user interface, the first subsequence of characters being selected from a first source sequence of characters; and
performing a first operation selected from the group consisting of (i) changing a first cellular information unit of a first target cell having the first cellular information unit, wherein the first subsequence of characters is selected from a source other than the first target cell; and (ii) creating a first new cell in the grid; and
wherein the performing a first operation is in response to the dragging a first visual representation.

12. The method of claim 11, the method further comprising: changing the memory to modify the data structure by:
dragging a second visual representation of a second source cell from one location to another on the graphical user interface; and
performing a second operation selected from the group consisting of (i) creating a second new cell in the grid; (ii) changing a second cellular information unit of a second target cell having the second cellular information unit; and (iii) changing the position of a third target cell in the grid; and
wherein the performing a second operation is in response to the dragging a second visual representation.

13. The method of claim 12, wherein prior to the dragging a second visual representation of a second source cell, the plurality of cells includes a fifth cell and a fourth cell associated with adjacent positions in the grid; and
wherein, after the creating a second new cell or the changing the position of a third target cell, the fifth cell and the fourth cell are no longer associated with adjacent positions in the grid, and the position of the third target cell or the second new cell is in between the positions of the fifth cell and the fourth cell.

14. The method of claim 10, the method further comprising: changing the memory to modify the data structure by:
dragging a second visual representation of a second source cell from one location to another on the graphical user interface; and
performing a second operation selected from the group consisting of (i) creating a second new cell in the grid; (ii) changing a second cellular information unit of a second target cell having the second cellular information unit; and (iii) changing the position of a third target cell in the grid; and
wherein the performing a second operation is in response to the dragging a second visual representation.

15. A method of structured text processing by a graphical user interface generated by a computer system, the method comprising:
storing within a memory a data structure representing a grid including four or more rows, two or more columns and a plurality of cells, each row having two or more cells of the plurality of cells and each column having two or more cells of the plurality of cells, some cells of the plurality of cells each containing a sequence of characters of human-readable text,
wherein the rows are visibly represented on the graphical user interface as a sequence of visual cells, one or more cells displaying the sequences of characters of human-readable text; and
wherein the four or more rows include a first row, a second row, a third row and a source row, the source row having a source cell and a second cell of the plurality of cells, and the two or more columns include a source column having the source cell and a third cell of the plurality of cells; and
wherein the source cell and each of the second cell and the third cell has a visual representation on the graphical user interface, each visual representation having a size on the graphical user interface; and
changing the memory to perform a first modification of the data structure by:
dragging a first visual element associated with the visual representation of the source cell from one location to another on the graphical user interface, wherein, in response to the dragging a first visual element, the size of the visual representation of the source cell is changed from a first size to a second size while, wherein the sizes of the visual representations of the second cell and the third cell are not changed; and
changing the memory to perform a second modification of the data structure by:

dragging a second visual representation of a row of the four or more rows from one location to another on the graphical user interface, wherein, immediately prior to the dragging the second visual representation, a visual representation of the first row is displayed adjacent to a visual representation of the second row on the graphical user interface, a visual representation of the source row includes a visual representation of the source cell having the second size as a result of the first modification, and the data structure includes a digital representation of a parent-child association between the third row and the source row; and wherein, in response to the dragging the second visual representation, the visual representations of the first row and the second row are no longer adjacent on the graphical user interface, and are separated from one another by a visual representation of at least the third row or the source row, while the parent-child association between the third row and the source row is maintained.

16. The method of claim 15, wherein the first visual element is a portion of a visual border associated with a visual representation of the source cell on the graphical user interface.

17. The method of claim 15, wherein after the changing the memory to perform a first modification, a visual representation of the source cell partially overlaps a visual representation of at least one other cell.

18. The method of claim 15, wherein after the changing the memory to perform a first modification, a visual representation of the source cell fully covers a visual representation of at least one other cell.

19. The method of claim 15, wherein the four or more rows include at least five rows; and wherein the at least five rows represented within the data structure include a fourth row; and wherein, immediately prior to the dragging a second visual representation, the data structure includes a digital representation of a parent-child association from the source row to the third row, and a digital representation of a parent-child association from the source row to the fourth row; and wherein, in response to the dragging a second visual representation, the parent-child association from the source row to the fourth row is not maintained.

20. The method of claim 15, wherein the parent-child association between the third row and the source row is a parent-child association from the third row to the source row; and wherein the method further comprises: changing the memory to modify the data structure by collapsing the third row, wherein, in response to the collapsing, the source row is no longer displayed on the graphical user interface.

* * * * *